United States Patent [19]
Aoki et al.

[11] Patent Number: 5,817,724
[45] Date of Patent: Oct. 6, 1998

[54] OLEFIN POLYMERIZATION METHOD USING A HIGHLY ACTIVE CATALYST HAVING A MULTIDENTATE LIGAND

[75] Inventors: Toshiya Aoki; Tokitaka Kaneshima, both of Kurashiki, Japan

[73] Assignee: Asahi Kasei Kogyo Kabushiki Kaisha, Osaka, Japan

[21] Appl. No.: 786,657

[22] Filed: Jan. 21, 1997

Related U.S. Application Data

[62] Division of Ser. No. 216,555, Mar. 23, 1994, abandoned.

[30] Foreign Application Priority Data

Mar. 23, 1993 [JP] Japan .................................. 5-086833
Jul. 9, 1993 [JP] Japan .................................. 5-170194

[51] Int. Cl.$^6$ ...................................................... C08F 4/64
[52] U.S. Cl. ...................... 526/127; 526/132; 526/134; 526/160; 526/161; 526/169.1; 526/348.4; 526/348.5; 526/351; 526/352
[58] Field of Search ................................... 526/127, 132, 526/134, 161, 169.1, 348.4, 348.5, 351, 352, 160; 502/103, 117; 356/8

[56] References Cited

U.S. PATENT DOCUMENTS

| | | | |
|---|---|---|---|
| 4,870,042 | 9/1989 | Kohara et al. ...................... | 502/114 |
| 5,055,438 | 10/1991 | Canich . | |
| 5,237,069 | 8/1993 | Newman ............................ | 548/110 |
| 5,312,794 | 5/1994 | Kelsey . | |
| 5,459,213 | 10/1995 | Kelsey ............................... | 526/133 |
| 5,519,099 | 5/1996 | Wang et al. . | |

FOREIGN PATENT DOCUMENTS

| | | |
|---|---|---|
| 416815 | 3/1991 | European Pat. Off. . |
| 0482934 | 4/1992 | European Pat. Off. . |
| 0574794 | 12/1993 | European Pat. Off. . |
| WO9113074 | 9/1991 | WIPO . |

OTHER PUBLICATIONS

Francois Nief et al,, *Journal of Organometallic Chemistry*, vol. 384, pp. 271–278, 1990.
P. Meunier et al,, *Journal of Organometallic Chemistry*, vol. 193, pp. C13–C16, 1980.
*Organometallics*, vol. 7, No. 4, 921 (1988), Francois Nief et al.
*Inorganic Chemistry*, vol. 21, No. 2, 840 (1982), D. L. Reger et al.
*Journal of Chemical Society, Dalton Transactions*, 603 (1991), Roman A. Kresinski et al.
*Inorganic Chemistry*, vol. 25, No. 12, 2046 (1986), Daniel L. Reger et al.
*Inorganic Chemistry*, vol. 22, No. 7, 1064 (1983) D. L. Reger et al.
*Journal of Organometallic Chemistry*, vol. 102, 167 (1975), Leo E. Manzer.
*Experimental Chemistry*, vol. 18, pp. 26, 4th Ed., edited by The Chemical Society of Japan, Maruzen Co., Ltd. (Japan).
*Organometallics*, vol. 9, No. 3, 867 (1990), Pamela J. Shapiro et al.
*Inorganic Chemistry*, vol. 25, No. 16, 2699 (1986), Samuel O. Grim et al.
*Organometallics*, vol. 11, No. 1, 459 (1992), Michael L. Sierra et al.

*Primary Examiner*—David W. Wu
*Attorney, Agent, or Firm*—Birch, Stewart, Kolasch & Birch, LLP

[57] ABSTRACT

Disclosed is an olefin polymerization method using a highly active catalyst comprising a transition metal selected from metals of Groups IIIA including the lanthanide series, IVA, VA, VIA, VIIA and VIII of the Periodic Table of the Elements, and ligands $L^1$ and $L^2$ bonded thereto, wherein a combination of $L^1$ and $L^2$ is (1) a combination of ligand $L^1$ which is a group containing at least one phosphorus-containing group and ligand $L^2$ which is a ligand having a σ-bond, or a ligand having a σ-bond and a bond selected from at least one π-bond and at least one lone electron pair donative bond; (2) a combination of ligand $L^1$ which is a 5-membered heterocyclic pentadentate ligand having one or more heteroatoms and ligand $L^2$ which is a ligand having a σ-bond, or a ligand having a σ-bond and a bond selected from at least one π-bond and at least one lone electron pair donative bond, provided that when the pentadentate ligand contains only one heteroatom, $L^2$ is a ligand having a σ-bond, or a ligand having a σ-bond and at least one lone electron pair donative bond; and (3) a combination of ligand $L^1$ which is a trispyrazolyl tridentate ligand and ligand $L^2$ which is an alkapolyenyl ligand, and wherein each $L^1$ contains an element of Group VB or Group VIB. By the method of the present invention, a desired olefin polymer can be produced efficiently with a high productivity per unit by weight of the catalyst.

12 Claims, No Drawings

OLEFIN POLYMERIZATION METHOD USING A HIGHLY ACTIVE CATALYST HAVING A MULTIDENTATE LIGAND

This application is a divisional of application Ser. No. 08/216,555, filed on Mar. 23, 1994, now abandoned the entire contents of which are hereby incorporated by reference.

BACKGROUND OF THE INVENTION

1. Field of The Invention

The present invention relates to an olefin polymerization catalyst having a multidentate ligand. More particularly, the present invention is concerned with an olefin polymerization catalyst comprising at least one transition metal compound selected from compounds of formulae I and II:

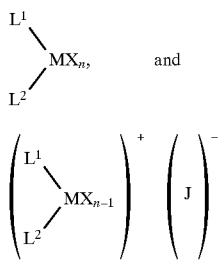

wherein M is a transition metal selected from the group consisting of metals of Groups IIIA including the lanthanide series, IVA, VA, VIA, VIIA and VIII of the Periodic Table of the Elements; X is an anionic ligand; n is an integer represented by formula G-2 in which G is the Group number of the Group of the Periodic Table to which the transition metal belongs; J is a non-coordinating anion; and $L^1$ and $L^2$ are ligands, a combination of which is at least one combination selected from the group consisting of the following three combinations (1), (2) and (3): (1) a combination of ligand $L^1$ which is a group containing at least one phosphorus-containing group and ligand $L^2$ which is selected from a ligand having a σ-bond and a ligand having a σ-bond and a bond selected from at least one π-bond and at least one lone electron pair donative bond; (2) a combination of ligand $L^1$ which is a 5-membered heterocyclic pentadentate ligand having one or more heteroatoms and ligand $L^2$ which is selected from a ligand having a σ-bond and a ligand having a σ-bond and a bond selected from at least one π-bond and at least one lone electron pair donative bond, with the proviso that when the 5-membered heterocyclic pentadentate ligand contains only one heteroatom, $L^2$ is a ligand having a σ-bond, or a ligand having a σ-bond and at least one lone electron pair donative bond; and (3) a combination of ligand $L^1$ which is a trispyrazolyl tridentate ligand and ligand $L^2$ which is an alkapolyenyl ligand having a σ-bond and two or more π-bonds, wherein each $L^1$ contains an element of Group VB or Group VIB of the Periodic Table of the Elements. The catalyst of the present invention has extremely high catalytic activity for an olefin polymerization reaction as compared to conventional olefin polymerization catalysts. Therefore, by the use of the catalyst of the present invention, a desired olefin polymer can be produced efficiently with a high productivity per unit weight of the catalyst. The olefin polymerization catalyst of the present invention is also advantageous in that it has high heat stability, that the olefin polymer produced has high molecular weight, high bulk density and improved powder characteristics, and that the molecular weight of the olefin polymer can be controlled and the amount of an auxiliary catalyst which is optionally employed can be reduced.

2. Discussion of Related Art

In the polymerization of an olefin, it is known to employ as a catalyst a compound having a monodentate ligand comprised of nitrogen as a heteroatom and having a single alkadienyl ligand. For example, Journal "Organometallics" 9, 867 (1990) discloses the polymerization of an olefin in which use is made of a catalyst comprised of a metal of Group IIIA of the Periodic Table in which the catalyst has a heteroatom monodentate ligand and, bridge-bonded thereto, an alkadienyl ligand. Unexamined Japanese Patent Application Laid-Open Specification No. H3-163088 (corresponding to European Patent Application Publication No. 416815) discloses the polymerization of an olefin in which use is made of a catalyst comprised of a transition metal in which the catalyst has a ligand containing no π-bond and, bridge-bonded thereto, a single ligand having at least one delocalized π-bond, and a formula shown in this Japanese patent document indicates that the ligand containing no π bond is a monodentate ligand. Further, Unexamined Japanese Patent Application Laid-Open Specification No. H3-188092 (corresponding to European Patent Application Publication No. 420436 and U.S. Pat. No. 5,055,438) discloses the polymerization of an olefin in which use is made of a catalyst comprised of a metal of Group IVA of the Periodic Table in which the catalyst has a heteroatom ligand and a cyclopentadienyl ligand, and a formula shown in this Japanese patent document indicates that the heteroatom ligand is a monodentate ligand. However, the catalytic activities of these conventional catalysts are extremely low. The catalyst disclosed in the above-mentioned Unexamined Japanese Patent Application Laid-Open Specification No. H3-163088 exhibits a relatively high catalytic activity, but even in the case of this catalyst, the catalytic activity is still unsatisfactory. Illustratively stated, in Working Example 1 of Unexamined Japanese Patent Application Laid-Open Specification No. H3-163088, an olefin polymerization reaction is performed using a catalyst having a monodentate nitrogen ligand and, bridge-bonded thereto, a cyclopentadienyl ligand in order to produce an atactic polypropylene, but the yield of the polymer produced is as small as less than 100 g/g of the metal of the catalyst per hour.

Unexamined Japanese Patent Application Laid-Open Specification No. H1-95110 (corresponding to U.S. Pat. No. 4,870,042) discloses the polymerization of an olefin, using as a catalyst a reaction product between an alkali metal salt of pyrazolyl borate (containing nitrogen as a heteroatom) and a halide of titanium or zirconium, and aluminoxane as an auxiliary catalyst. In Working Example 3 of the above-mentioned unexamined Japanese patent document No. H1-95110, polyethylene is produced using as a catalyst a reaction product between potassium hydrotrispyrazolyl borate and titanium chloride, but the catalyst is extremely low in catalytic activity, so that the yield of the polyethylene produced under a 1 atm. ethylene pressure is as small as less than 200 g/g of the metal of the catalyst per hour. Unexamined Japanese Patent Application Laid-Open Specification No. H4-305585 (corresponding to European Patent Application Publication No. 482934 and U.S. Pat. No. 5,237,069) discloses a catalyst comprised of an organometallic compound having a hydrotris(pyrazolyl)borate ligand (containing nitrogen as a heteroatom) and an anionic ligand, and describes that examples of ligands do not include a functional cyclopentadienyl ligand. The catalyst of the above-mentioned unexamined Japanese patent document No. H4-305585 is improved in catalytic activity to some extent, but the yield of polystyrene produced using this catalyst is still as small as less than 4 kg/g of the metal of the catalyst per hour.

Further, due to the low catalytic activity of the conventional catalysts which have a monodentate ligand containing nitrogen as a heteroatom or a tridentate ligand containing nitrogen as a heteroatom, such as a trispyrazole borate ligand, the conventional catalysts need to be used in a large amount, so that additional cumbersome operations are needed, such as deashing of an olefin polymer produced (i.e., removal of a catalyst from the olefin polymer produced).

Therefore, the conventional olefin polymerization catalysts are unsatisfactory for use in commercially producing olefin polymers.

SUMMARY OF THE INVENTION

The present inventors have made extensive and intensive studies with a view toward developing a novel olefin polymerization catalyst which is free from the above-mentioned problems inevitably accompanying the conventional olefin polymerization catalysts which have a monodentate ligand containing nitrogen as a heteroatom or a tridentate ligand containing nitrogen as a heteroatom, such as a trispyrazolyl borate ligand. As a result, it has unexpectedly been found that a novel olefin polymerization catalyst comprising a transition metal selected from the group consisting of metals of Groups IIIA including the lanthanide series, IVA, VA, VIA, VIIA and VIII of the Periodic Table of the Elements, and ligands $L^1$ and $L^2$ bonded thereto, wherein the ligand $L^1$ is a trispyrazolyl borate tridentate ligand containing nitrogen as a heteroatom and the ligand $L^2$ is a ligand having a σ-bond and at least two π-bonds, such as a cyclopentadienyl ligand, exhibits extremely high catalytic activity for olefin polymerization. Further, it has also unexpectedly been found that an extremely high catalytic activity can also be exhibited when the ligand $L^1$ is a 5-membered heterocyclic pentadentate ligand containing at least two elements of Group VB of the Periodic Table as heteroatoms or the ligand $L^1$ is a tridentate ligand (such as a phospholyl ligand) containing as a heteroatom an element of Group VIB of the Periodic Table, such as phosphorus or oxygen, and the ligand $L^2$ is a multidentate ligand, such as an alkapolyenyl alkyl group ligand or a monodentate ligand, such as a halogen ligand.

That is, the above-mentioned novel olefin polymerization catalyst having a specific multidentate ligand exhibits an extremely high catalytic activity for olefin polymerization, as compared to the conventional olefin polymerization catalysts which have a monodentate nitrogen ligand as a heteroatom or a tridentate ligand containing nitrogen as a heteroatom (such as a trispyrazolyl borate ligand) but have no alkapolyenyl ligand (such as a cyclopentadienyl ligand). Further, as compared to the conventional olefin polymerization catalysts, the above-mentioned novel catalyst of the present invention is also advantageous in that it has high heat stability, that an olefin polymer produced has a high molecular weight, high bulk density and improved powder characteristics, that the molecular weight of the olefin polymer can be controlled simply by adding hydrogen and that the amount of alkylaluminoxane as an auxiliary catalyst which may be optionally employed can be reduced. Furthermore, by virtue of the high catalytic activity of the above-mentioned novel catalyst, the amount of a catalyst to be used for an olefin polymerization can be largely reduced, so that there is no need for additional cumbersome operations, such as deashing of a produced olefin polymer (i.e., removal of a catalyst from the polymer).

Based on these novel findings, the present invention has been completed.

Accordingly, it is a primary object of the present invention to provide a novel olefin polymerization catalyst which is not only extremely high in catalytic activity but also renders it possible to produce an olefin polymer having a desired molecular weight and excellent properties.

The foregoing and other objects, features and advantages of the present invention will become apparent to those skilled in the art from the following detailed description and appended claims.

DETAILED DESCRIPTION OF THE INVENTION

According to the present invention, there is provided an olefin polymerization catalyst comprising at least one transition metal compound selected from compounds of formulae I and II:

wherein:
M is a transition metal selected from the group consisting of metals of Groups IIIA including the lanthanide series, IVA, VA, VIA, VIIA and VIII of the Periodic Table of the Elements, X is an anionic ligand, n is an integer represented by formula G-2 in which G is the Group number of the Group of the Periodic Table to which the transition metal belongs, and $L^1$ and $L^2$ are ligands, a combination of which is at least one combination selected from the group consisting of combinations (1), (2) and (3) defined below, wherein a bridge bond is optionally formed between $L^1$ and $L^2$; and

wherein:
M, X, n, $L^1$ and $L^2$ are as defined for formula (I), and
J is a non-coordinating anion.

The combination (1) is a combination of:
ligand $L^1$ which is a group, containing at least one phosphorus-containing group, represented by formula III:

wherein:
A is a carbon atom, or a boron atom substituted with a substituent selected from the group consisting of:
a hydrogen atom,
a saturated or unsaturated $C_1$–$C_{20}$ aliphatic hydrocarbon group which is unsubstituted or substituted with at least one $C_6$–$C_{14}$ aromatic hydrocarbon group or at least one halogen atom,
a $C_6$–$C_{20}$ aromatic hydrocarbon group which is unsubstituted or substituted with at least one $C_1$–$C_{10}$ alkyl group or at least one halogen atom,
an oxy group which is substituted with a saturated or unsaturated $C_1$–$C_{20}$ aliphatic hydrocarbon group unsubstituted or substituted with at least one $C_6$–$C_{14}$ aromatic hydrocarbon group, or which is substituted with a $C_6$–$C_{20}$ aromatic hydrocarbon group unsubstituted or substituted with at least one $C_1$–$C_{10}$ alkyl group, a thio group which is substituted with a saturated or unsaturated $C_1$–$C_{20}$ aliphatic hydrocarbon group unsubstituted or substituted with at least one $C_6$–$C_{14}$ aromatic hydrocarbon group, or which is substituted with a $C_6$–$C_{20}$ aromatic hydrocarbon group unsubstituted or substituted with at least one $C_1$–$C_{10}$ alkyl group, a silyl group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom, a siloxy group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom, an amino group which is N,N-disubstituted with a saturated or unsaturated $C_1$–$C_{20}$ aliphatic hydrocarbon group or a $C_6$–$C_{20}$ aromatic hydrocarbon group, and a phosphino group which is P,P-disubstituted with a saturated or unsaturated $C_1$–$C_{20}$ aliphatic hydrocarbon group or a $C_6$–$C_{20}$ aromatic hydrocarbon group;

$\{R^1R^2(Q=)P\}$ represents a phosphorus-containing group, in which:

P is a trivalent or pentavalent phosphorus atom, each of $R^1$ and $R^2$ is monovalent and independently represents a saturated or unsaturated $C_1$–$C_{20}$ aliphatic hydrocarbon which is unsubstituted or substituted with at least one $C_6$–$C_{14}$ aromatic hydrocarbon group or at least one halogen atom, or a $C_6$–$C_{20}$ aromatic hydrocarbon which is unsubstituted or substituted with at least one $C_1$–$C_{10}$ alkyl group or at least one halogen atom, and Q is divalent and represents a divalent atom of O, S or Se, or a lone electron pair; and each of $Z^1$ and $Z^2$ independently represents a phosphorus-containing group of formula $\{R^1R^2(Q=)P\}$ as defined above, or a pyrazolyl group represented by formula IV:

(IV)

wherein:

each of $R^3$, $R^4$ and $R^5$ independently represents:
a hydrogen atom,
a saturated or unsaturated $C_1$–$C_{20}$ aliphatic hydrocarbon group which is unsubstituted or substituted with at least one $C_6$–$C_{14}$ aromatic hydrocarbon group or at least one halogen atom,
a $C_6$–$C_{20}$ aromatic hydrocarbon group which is unsubstituted or substituted with at least one $C_1$–$C_{10}$ alkyl group or at least one halogen atom,
an oxy group which is substituted with a saturated or unsaturated $C_1$–$C_{20}$ aliphatic hydrocarbon group unsubstituted or substituted with at least one $C_6$–$C_{14}$ aromatic hydrocarbon group, or which is substituted with a $C_6$–$C_{20}$ aromatic hydrocarbon group unsubstituted or substituted with at least one $C_1$–$C_{10}$ alkyl group,
a thio group which is substituted with a saturated or unsaturated $C_1$–$C_{20}$ aliphatic hydrocarbon group unsubstituted or substituted with at least one $C_6$–$C_{14}$ aromatic hydrocarbon group, or which is substituted with a $C_6$–$C_{20}$ aromatic hydrocarbon group unsubstituted or substituted with at least one $C_1$–$C_{10}$ alkyl group,
a silyl group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom,
a siloxy group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom,
an amino group which is N,N-disubstituted with a saturated or unsaturated $C_1$–$C_{20}$ aliphatic hydrocarbon group or a $C_6$–$C_{20}$ aromatic hydrocarbon group, and a phosphino group which is P,P-disubstituted with a saturated or unsaturated $C_1$–$C_{20}$ aliphatic hydrocarbon group or a $C_6$–$C_{20}$ aromatic hydrocarbon group, wherein a bridge bond is optionally formed between $R^3$ and $R^4$ or between $R^3$ and $R^5$, and ligand $L^2$ which is selected from the group consisting of a ligand having a σ-bond and a ligand having a σ-bond and a bond selected from the group consisting of at least one π-bond and at least one lone electron pair donative bond.

The combination (2) is a combination of:

ligand $L^1$ which is a 5-membered heterocyclic ligand represented by formula V:

$\{E_m(CR^6)_{5-m}\}^-$ (V)

wherein:

each $R^6$ independently represents:
a hydrogen atom,
a saturated or unsaturated $C_1$–$C_{20}$ aliphatic hydrocarbon group which is unsubstituted or substituted with at least one $C_6$–$C_{14}$ aromatic hydrocarbon group or at least one halogen atom,
a $C_6$–$C_{20}$ aromatic hydrocarbon group which is unsubstituted or substituted with at least one $C_1$–$C_{10}$ alkyl group or at least one halogen atom,
an oxy group which is substituted with a saturated or unsaturated $C_1$–$C_{20}$ aliphatic hydrocarbon group unsubstituted or substituted with at least one $C_6$–$C_{14}$ aromatic hydrocarbon group, or which is substituted with a $C_6$–$C_{20}$ aromatic hydrocarbon group unsubstituted or substituted with at least one $C_1$–$C_{10}$ alkyl group,
a thio group which is substituted with a saturated or unsaturated $C_1$–$C_{20}$ aliphatic hydrocarbon group unsubstituted or substituted with at least one $C_6$–$C_{14}$ aromatic hydrocarbon group, or which is substituted with a $C_6$–$C_{20}$ aromatic hydrocarbon group unsubstituted or substituted with at least one $C_1$–$C_{10}$ alkyl group, a silyl group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom, a siloxy group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom, an amino group which is N,N-disubstituted with a saturated or unsaturated $C_1$–$C_{20}$ aliphatic hydrocarbon group or a $C_6$–$C_{20}$ aromatic hydrocarbon group, and a phosphino group which is P,P-disubstituted with a saturated or unsaturated $C_1$–$C_{20}$ aliphatic hydrocarbon group or a $C_6$–$C_{20}$ aromatic hydrocarbon group, m is an integer of from 1 to 5, each E independently represents a trivalent atom selected from nitrogen, phosphorus, arsenic, antimony and bismuth atoms, wherein a bridge bond is optionally formed between neighboring $R^6$ and $R^6$, and ligand $L^2$ which is selected from the group consisting of a ligand having a σ-bond and a ligand having a σ-bond and a bond selected from the group consisting of at least one π-bond and at least one lone electron pair donative bond, with the proviso that when m of formula V is 1, $L^2$ is a ligand having a σ-bond, or a ligand having a σ-bond and at least one lone electron pair donative bond.

The combination (3) is a combination of:

ligand $L^1$ which is a trispyrazolyl tridentate ligand represented by formula VI:

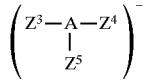

(VI)

wherein:
A is as defined above for formula III; and
each of $Z^3$, $Z^4$ and $Z^5$ independently represents a pyrazolyl group represented by formula IV as defined above, and ligand $L^2$ which is an alkapolyenyl ligand having a σ-bond and two or more π-bonds.

The "Periodic Table of the Elements" referred to herein is the Periodic Table of the Elements described in "Kagaku Binran (Chemistry Handbook)", the third revised edition, the fourth print, edited by the Chemical Society of Japan and published by Maruzen Co. Ltd., Japan. Accordingly, the "Groups" and "series" used herein are in accordance with the above-mentioned Periodic Table of the Elements.

Examples of anionic ligand X in formulae (I) and (II) include a hydrogen atom; a halogen atom, such as a fluorine atom, a chlorine atom, a bromine atom or an iodine atom; a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom; a $C_6$–$C_{20}$, more preferably $C_6$–$C_{14}$ aromatic hydrocarbon group which is unsubstituted or substituted with at least one $C_1$–$C_{10}$ alkyl group or at least one halogen atom; an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group; a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group; a silyl group which is unsubstituted or substituted with at least one saturated or unsaturated. $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom; a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom.

As illustrative examples of unsubstituted or substituted aliphatic and aromatic hydrocarbon groups employable as ligand X, there can be mentioned a methyl group, an ethyl group, a propyl group, a butyl group, an isobutyl group, a t-butyl group, a pentyl group, a cyclopentyl group, an isopentyl group, a neopentyl group, a hexyl group, a cyclohexyl group, a 2-ethylhexyl group, a nonyl group, a decyl group, a pentadecyl group, a cyclohexenyl group, a cyclohexenylmethyl group, a norbornenyl group, a phenyl group, a tolyl group, an ethylphenyl group, a xylyl group, an isopropylphenyl group, a naphthyl group, a methylnaphthyl group, a biphenyl group, an anthracyl group, a benzyl group, a phenethyl group, a phenylpropyl group, a naphthylmethyl group, a trichloromethyl group, a trifluoromethyl group, a pentafluoroethyl group, a hexafluorocyclohexyl group, a chlorophenyl group, a hexafluorophenyl group, a chloronaphthyl group, a bromonaphthyl group, a p-trichloromethylphenyl group, a p-fluorophenylmethyl group, and a pentachlorobenzyl group. Illustrative examples of substituted oxy groups include a methoxy group, an ethoxy group, a propoxy group, a butoxy group, a hexyloxy group, a cyclohexyloxy group, a decyloxy group, a phenoxy group, a naphthoxy group, a tolyloxy group, a methylnaphthoxy group, a benzyloxy group, and a phenethyloxy group. Illustrative examples of substituted thio groups include a methylthio group, an ethylthio group, a propylthio group, a butylthio group, a hexylthio group, a cyclohexylthio group, a decylthio group, a phenylthio group, a naphthylthio group, a tolylthio group, and a methylnaphthylthio group. Illustrative examples of substituted silyl groups include a trimethylsilyl group, a triethylsilyl group, and a phenyldimethylsilyl group. Illustrative examples of substituted siloxy groups include trimethylsiloxy group, a triethylsiloxy group, and a phenyldimethylsiloxy group.

Further examples of anionic ligand X in formulae (I) and (II) include an N,N-disubstituted amino group and a P,P-disubstituted phosphino group which are, respectively, represented by formulae (VII) and (VIII):

and

wherein each R is monovalent and independently represents a saturated or unsaturated $C_1$–$C_{20}$ aliphatic hydrocarbon group which is unsubstituted or substituted with at least one $C_6$–$C_{14}$ aromatic hydrocarbon group, or a $C_6$–$C_{20}$ aromatic hydrocarbon group which is unsubstituted or substituted with at least one $C_1$–$C_{10}$ alkyl group and wherein a bridge bond is optionally formed between the two Rs.

Illustrative examples of N,N-disubstituted amino groups include a dimethylamino group, a diethylamino group, an ethylmethylamino group, a diisopropylamino group, a di(t-butyl)amino group, a dicyclohexylamino group, a diphenylamino group, a ditolylamino group, a pyrrolyl group, a pyrazolyl group, and an imidazolyl group. Illustrative examples of P,P-disubstituted phosphino groups include a dimethylphosphino group, a diethylphosphino group, a dipropylphosphino group, a diisopropyl phosphino group, a dicyclohexylphosphino group, a diphenylphosphino group, a bis(p-fluorophenyl)phosphino group, a dibenzylphosphino group, a methylphenylphosphino group and an ethylphenylphosphino group.

With respect to the non-coordinating anion represented by [J]$^-$ in formula II, any anion can be employed as long as the anion is stable under reaction conditions and is incapable of or hardly capable of forming a coordinate bond with transition metal M in formula II. Examples of such anions include halogenates, such as chlorate, bromate, iodate, perchlorate, perbromate and periodate; tetra-substituted borate, such as tetrafluoroborate, tetraphenylborate, tetrakis (p-fluorophenyl)borate, tetrakis(p-chlorophenyl)borate, tetrakis(pentafluorenyl)borate, tetratolylborate and tetrakis (2,4-dimethylphenyl)borate; polyborates, such as octadecaborate, tridecahydride-7-carbaundecaborate, bis(7, 8-dicarbaundecaborate)cobaltate, bis(undecahydride-7,8-dicarbaundecaborate)nickelate and 1-carbadodecaborate; halide anions of Group VB of the Periodic Table, such as hexafluorophosphate and hexafluoroantim onate; tellurates, such as pentafluoroxotellurate; heteropoly anions, such as phosphotungstate and silicotungsate; a fullerene anion; and a methylenebistrifluorosulfonate. Of these, a tetra-substituted borate is especially preferred.

In combination (1) of ligands $L^1$ and $L^2$, ligand $L^1$ is a tridentate ligand, containing at least one phosphorus-containing group, represented by the following formula III:

In formula III, A is a carbon atom, or a boron atom substituted with a substituent selected from the group consisting of:

a hydrogen atom;

a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom;

a $C_6$–$C_{20}$, more preferably $C_6$–$C_{14}$ aromatic hydrocarbon group which is unsubstituted or substituted with at least one $C_1$–$C_{10}$ alkyl group or at least one halogen atom;

an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a silyl group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

an amino group which is N,N-disubstituted with a saturated or unsaturated $C_1$–$C_{20}$ aliphatic hydrocarbon group or a $C_6$–$C_{20}$ aromatic hydrocarbon group; and a phosphino group which is P,P-disubstituted with a saturated or unsaturated $C_1$–$C_{20}$ aliphatic hydrocarbon group or a $C_6$–$C_{20}$ aromatic hydrocarbon group.

In formula III, $\{R^1R^2(Q=)P\}$ represents a phosphorus-containing group, in which:

P is a trivalent or pentavalent phosphorus atom;

each of $R^1$ and $R^2$ is monovalent and independently represents a saturated or unsaturated $C_1$–$C_{20}$ aliphatic hydrocarbon group which is unsubstituted or substituted with at least one $C_6$–$C_{14}$ aromatic hydrocarbon group, or a $C_6$–$C_{20}$ aromatic hydrocarbon group which is unsubstituted or substituted with at least one $C_1$–$C_{10}$ alkyl group; and Q is divalent and represents a divalent atom of O, S or Se, or a lone electron pair.

In formula III, each of $Z^1$ and $Z^2$ independently represents a phosphorus-containing group of formula $\{R^1R^2(Q=)P\}$ as defined above, or a pyrazolyl group represented by formula IV:

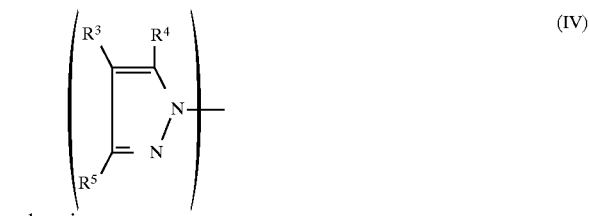

wherein:

each of $R^3$, $R^4$ and $R^5$ independently represents:

a hydrogen atom;

a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom;

a $C_6$–$C_{20}$, more preferably $C_6$–$C_{14}$ aromatic hydrocarbon group which is unsubstituted or substituted with at least one $C_1$–$C_{10}$ alkyl group or at least one halogen atom;

an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a silyl group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

an amino group which is N,N-disubstituted with a saturated or unsaturated $C_1$–$C_{20}$ aliphatic hydrocarbon group or a $C_6$–$C_{20}$ aromatic hydrocarbon group; and a phosphino group which is P,P-disubstituted with a saturated or unsaturated $C_1$–$C_{20}$ aliphatic hydrocarbon group or a $C_6$–$C_{20}$ aromatic hydrocarbon group.

In formula IV, a bridge bond is optionally formed between $R^3$ and $R^4$ or between $R^3$ and $R^5$.

Depending upon the types of $Z^1$ and $Z^2$ in formula III, tridentate ligands of formula III include the following three types of ligands, namely, a tridentate ligand having three phosphorus-containing groups, a tridentate ligand having two phosphorus-containing groups and one pyrazolyl group and a tridentate ligand having one phosphorus-containing group and two pyrazolyl groups. Of these, a tridentate ligand having three phosphorus-containing groups is especially preferred.

Examples of tridentate ligands having three phosphorus-containing groups include trisphosphino compounds, such as tris(dicyclohexylphosphino)methanide and tris(diphenylphosphino)methanide; trisoxophosphorus compounds, such as tris(dicyclohexyloxophosphoranyl)methanide and tris(diphenyloxophosphoranyl)methanide; tristhiophosphorus compounds, such as tris(dicyclohexylthiophosphoranyl)methanide and tris(diphenylthiophosphoranyl)methanide; trisselenophosphorus compounds, such as tris(dicyclohexylselenophosphoranyl)methanide and tris(diphenylselenophosphoranyl)methanide; compounds having two different phosphorus-containing groups, such as bis(diphenylphosphino)(diphenyloxophosphoranyl)methanide, bis(diphenyloxophosphoranyl)(diphenylphosphino)methanide, bis(diphenylphosphino)(diphenylthiophosphoranyl)methanide, bis(diphenylthiophosphoranyl)(diphenylphosphino)methanide, bis(diphenylphosphino)(diphenylselenophosphoranyl)methanide, bis(diphenylselenophosphoranyl)(diphenylphosphino)methanide, bis(diphenyloxophosphoranyl)(diphenylthiophosphoranyl)methanide, bis(diphenylthiophosphoranyl)(diphenyloxophosphoranyl)methanide, bis(diphenyloxophosphoranyl)(diphenylselenophosphoranyl)methanide, bis(diphenylselenophosphoranyl)(diphenyloxophosphoranyl)methanide, bis(diphenylthiophosphoranyl)(diphenylselenophosphoranyl)methanide, and bis(diphenylselenophosphoranyl)(diphenylthiophosphoranyl)methanide; compounds having three different phosphorus-containing groups, such as (diphenylphosphino)(diphenyloxophosphoranyl)(diphenylthiophosphoranyl)methanide, (diphenylphosphino)(diphenyloxophosphoranyl)(diphenylselenophosphoranyl)methanide, (diphenylphosphino)(diphenylthiophosphoranyl)(diphenylselenophosphoranyl)methanide, and (diphenyloxophosphoranyl)(diphenylthiophosphoranyl)(diphenylselenophosphoranyl)methanide.

In addition, there can be mentioned compounds having the same nomenclatures as those of the above compounds except that the term "methanide" is replaced with "hydroborate", or "$C_1$–$C_{10}$ alkyl group-substituted borate".

One example of ligand $L^2$ of combination (1) of $L^1$ and $L^2$ is a monodentate ligand having a σ-bond, which is selected from the group consisting of:

a hydrogen atom;

a halogen atom, such as a fluorine atom, a chlorine atom, a bromine atom or an iodine atom;

a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom;

a $C_6$–$C_{20}$, more preferably $C_6$–$C_{14}$ aromatic hydrocarbon group which is unsubstituted or substituted with at least one $C_1$–$C_{10}$ alkyl group or at least one halogen atom;

an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a silyl group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom; a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

an amino group which is N,N-disubstituted with a saturated or unsaturated $C_1$–$C_{20}$ aliphatic hydrocarbon group or a $C_6$–$C_{20}$ aromatic hydrocarbon group; and a phosphino group which is P,P-disubstituted with a saturated or unsaturated $C_1$–$C_{20}$ aliphatic hydrocarbon group or a $C_6$–$C_{20}$ aromatic hydrocarbon group.

As illustrative examples of unsubstituted or substituted aliphatic and aromatic hydrocarbon groups employable as ligand $L^2$ of combination (1), there can be mentioned a methyl group, an ethyl group, a propyl group, a butyl group, an isobutyl group, a t-butyl group, a pentyl group, a cyclopentyl group, an isopentyl group, a neopentyl group, a hexyl group, a cyclohexyl group, a 2-ethylhexyl group, a nonyl group, a decyl group, a pentadecyl group, a cyclohexenyl group, a cyclohexenyl methyl group, a norbornenyl group, a phenyl group, a tolyl group, an ethylphenyl group, a xylyl group, an isopropylphenyl group, a naphthyl group, a methylnaphthyl group, a biphenyl group, an anthracyl group, a benzyl group, a phenethyl group, a phenylpropyl group, a naphthylmethyl group, a trichloromethyl group, a trifluoromethyl group, a pentafluoromethyl group, a hexafluorocyclohexyl group, a chlorophenyl group, a hexafluorophenyl group, a chloronaphthyl group, a bromonaphthyl group, a p-trichloromethylphenyl group, a p-fluorophenylmethyl group, and a pentachlorobenzyl group. Illustrative examples of substituted oxy groups include a methoxy group, an ethoxy group, a propoxy group, a butoxy group, a hexyloxy group, a cyclohexyloxy group, a decyloxy group, a phenoxy group, a naphthoxy group, a tolyloxy group, a methylnaphthoxy group, a benzyloxy group, and a phenethyloxy group. Illustrative examples of substituted thio groups include a methylthio group, an ethylthio group, a propylthio group, a butylthio group, a hexylthio group, a cyclohexylthio group, a decylthio group, a phenylthio group, a naphthylthio group, a tolylthio group, and a methylnaphthylthio group. Illustrative examples of substituted silyl groups include a trimethylsilyl group, a triethylsilyl group, and a phenyldimethylsilyl group. Illustrative examples of substituted siloxy groups include trimethylsiloxy group, a triethylsiloxy group, and a phenyldimethylsiloxy group.

Further examples of ligand $L^2$ of combination (1) include an N,N-disubstituted amino group and a P,P-disubstituted phosphino group which are, respectively, represented by formulae VII and VIII:

$$—NR_2 \quad (VII),$$

and $$—PR_2 \quad (VIII)$$

wherein:
each R independently represents:
a saturated or unsaturated $C_1$–$C_{20}$ aliphatic hydrocarbon group which is unsubstituted or substituted with at least one $C_6$–$C_{14}$ aromatic hydrocarbon group; or a $C_6$–$C_{20}$ aromatic hydrocarbon group which is unsubstituted or substituted with at least one $C_1$–$C_{10}$ alkyl group.

In formulae VII and VIII, a bridge bond is optionally formed between two Rs.

Examples of the ligands represented by the above formulae VII or VIII include amino groups, such as a dimethylamino group, a diethylamino group, an ethylmethylamino group, a diisopropylamino group, a di(t-butyl)amino group, a dicyclohexylamino group, a diphenylamino group, a ditolylamino group, a pyrrolyl group, a pyrazolyl group and an indazolyl group; phosphino groups, such as a dimethylphosphino group, a diethylphosphino group, a dipropylphosphino group, a diisopropylphosphino group, a dicyclohexylphosphino group, a diphenylphosphino group, a bis(p-fluorophenyl)phosphino group, a dibenzylphosphino group, a methylphenylphosphino group, and an ethylphenylphosphino group.

Further examples of ligand $L^2$ of combination (1) include an N,N-disubstituted amino group and a P,P-disubstituted phosphino group which are, respectively, represented by formulae (IX) and (X):

$$—NR— \quad (IX),$$

and $$—PR— \quad (X),$$

wherein R is as defined above for formulae VII and VIII and N or P is bridge-bonded to $L^1$.

In combination (1) of $L^1$ and $L^2$, $L^2$ to be employed in combination with $L^1$ may be a multidentate ligand having a σ-bond and a bond selected from the group consisting of at least one π-bond and at least one lone electron pair donative bond. As examples of such multidentate ligand $L^2$ of combination (1), there can be mentioned alkamonoenyl ligands, such as an alkenyl ligand and a cycloalkenyl ligand; and alkapolyenyl ligands, such as an alkadienyl ligand, a cycloalkadienyl ligand, a cycloalkatrienyl ligand and an alkatrienyl ligand. Further examples of ligand $L^2$ include a tridentate ligand, containing at least one phosphorus-containing group, represented by the same formula as formula III, a 5-membered heterocyclic pentadentate ligand represented by the same formula as formula V and a trispyrazolyl tridentate ligand represented by the same formula as formula VI. An especially preferred example of multidentate ligand $L^2$ is a ligand having a monocyclic or polycyclic alkadienyl skeleton represented by the following formula XI:

$$C_5H_{5-x}R_x \quad (XI)$$

wherein:
H represents a hydrogen atom;
X represents an integer of from 0 to 5; and
each R independently represents:
a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom, a $C_6$–$C_{20}$, more preferably $C_6$–$C_{14}$ aromatic hydrocarbon group which is unsubstituted or substituted with at least one $C_1$–$C_{10}$ alkyl group or at least one halogen atom,
an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group,
a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group,
a silyl group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6C_{20}$, more preferably $C_6$–$C_{14}$, still more preferably $C_6$–$C_{10}$ aromatic hydrocarbon group, or at least one halogen atom,
a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom, an amino group which is N,N-disubstituted with a saturated or unsaturated $C_1$–$C_{20}$ aliphatic hydrocarbon group or a $C_6$–$C_{20}$ aromatic hydrocarbon group, or a phosphino group which is P,P-disubstituted with a saturated or unsaturated $C_1$–$C_{20}$ aliphatic hydrocarbon group or a $C_6$–$C_{20}$ aromatic hydrocarbon group.

Examples of ligands represented by formula XI include a cyclopentadienyl group, a methylcyclopentadienyl group, an ethylcyclopentadienyl group, an n-propylcyclopentadienyl group, an isopropylcyclopentadienyl group, an n-butylcyclopentadienyl group, a trimethylsilylcyclopentadienyl group, a trimethylgermylcyclopentadienyl group, a 1,2-dimethylcyclopentadienyl group and 1,3- or 1,4-substitution isomers thereof, a 1,2,3-trimethylcyclopentadienyl group and substitution isomers thereof, a 1,2,3,4-tetramethylcyclopentadienyl group and substitution isomers thereof, a tetramethylcyclopentadienyl group, an unsubstituted or substituted indenyl group, an unsubstituted or substituted terahydroindenyl group, an unsubstituted or substituted fluorenyl group, and an unsubstituted or substituted octahydrofluorenyl group. The above-mentioned ligands may be bridge-bonded to ligand $L^1$.

In combination (2) of $L^1$ and $L^2$, $L_1$ is a 5-membered heterocyclic pentadentate ligand represented by the following formula V:

$$\{E_m(CR^6)_{5-m}\}^- \qquad (V)$$

wherein:

each $R^6$ independently represents:
- a hydrogen atom,
- a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom,
- a $C_6$–$C_{20}$, more preferably $C_6$–$C_{14}$ aromatic hydrocarbon group which is unsubstituted or substituted with at least one $C_1$–$C_{10}$ alkyl group or at least one halogen atom,
- an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group,
- a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group,
- a silyl group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom,
- a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom,
- an amino group which is N,N-disubstituted with a saturated or unsaturated $C_1$–$C_{20}$ aliphatic hydrocarbon group or a $C_6$–$C_{20}$ aromatic hydrocarbon group, or
- a phosphino group which is P,P-disubstituted with a saturated or unsaturated $C_1$–$C_{20}$ aliphatic hydrocarbon group or a $C_6$–$C_{20}$ aromatic hydrocarbon group;

m is an integer of from 1 to 5; and each E independently represents a trivalent atom selected from nitrogen, phosphorus, arsenic, antimony and bismuth atoms.

In formula V, a bridge bond is optionally formed between neighboring $R^6$ and $R^6$.

When E in formula V is a nitrogen atom, examples of $L^1$ represented by formula V include a pyrrolyl group, and substituted pyrrolyl groups, such as a 2-methylpyrrolyl group, a 3-methylpyrrolyl group, a 2,3-dimethylpyrrolyl group, a 3,4-dimethylpyrrolyl group, a 2,5-dimethylpyrrolyl group, a 2,3,4-trimethylpyrrolyl group, a 2,3,5-trimethylpyrrolyl group, a 2,3,4,5-tetramethylpyrrolyl group, and substituted pyrrolyl groups having the same nomenclatures as those of the above groups except that the term "methyl" is replaced with a term "ethyl", "isopropyl", "t-butyl", "cyclohexyl", "phenyl", or "trimethylsilyl"; a pyrazolyl group, and substituted pyrazolyl groups, such as a 3-methylpyrazolyl group, a 4-methylpyrazolyl group, a 5-methylpyrazolyl group, a 3,4-dimethylpyrazolyl group, a 3,5-dimethylpyrazolyl group, a 3,4,5-trimethylpyrazolyl group, and substituted pyrazolyl groups having the same nomenclatures as those of the above groups except that the term "methyl" is replaced with a term "ethyl", "isopropyl", "t-butyl", "cyclohexyl", "phenyl", or "trimethylsilyl"; an imidazolyl group, and substituted imidazolyl groups, such as a 2-methylimidazolyl group, a 4-methylimidazolyl group, a 5-methylimidazolyl group, a 2,4-dimethylimidazolyl group, a 2,5-dimethylimidazolyl group, a 2,4,5-trimethylimidazolyl group, and substituted imidazolyl groups having the same nomenclatures as those of the above groups except that the term "methyl" is replaced with a term "ethyl", "isopropyl", "t-butyl", "cyclohexyl", "phenyl", or "trimethylsilyl"; a 1,2,3-triazolyl group, and substituted 1,2,3-triazolyl groups, such as a 4-methyl-1,2,3-triazolyl group, a 5-methyl-1,2,3-triazolyl group, a 4,5-dimethyl-1,2,3-triazolyl group, and substituted triazolyl groups having the same nomenclatures as those of the above groups except that the term "methyl" is replaced with a term "ethyl", "isopropyl", "t-butyl", "cyclohexyl", "phenol", or "trimethylsilyl"; a 1,3,5-triazolyl group and substituted 1,3,5-triazolyl groups, such as a 2-methyl-1,3,5-triazolyl group, a 3,4-dimethyl-1,3,5-triazolyl group, and substituted 1,3,5-triazolyl groups having the same nomenclatures as those of the above groups except that the term "methyl" is replaced with a term "ethyl", "isopropyl", "t-butyl", "cyclohexyl", "phenyl", or "trimethylsilyl"; a tetrazolyl group, and substituted tetrazolyl groups, such as a 5-methyltetrazolyl group, and substituted tetrazolyl groups having the same nomenclatures as those of the above groups except that the term "methyl" is replaced with a term "ethyl", "isopropyl", "t-butyl", "cyclohexyl", "phenyl", or "trimethylsilyl"; and polycyclic polyazolyl groups, such as an indolyl group, a 4,5,6,7-tetrahydroindolyl group, an indazolyl group, a benzimidazolyl group, a 7-azaindolyl group, a benzotriazolyl group, a 4-azabenzimidazolyl group, a purinyl group, a carbazolyl group, a 1,2,3,4-tetrahydrocarbazolyl group, and cyclic polyazolyl groups which are substituted with a methyl group, an ethyl group, an isopropyl group, a t-butyl group, a cyclohexyl group, a phenyl group, or a trimethylsilyl group.

When E in formula V is a phosphorus atom, examples of $L^1$ represented by formula V include a phospholyl group, and substituted phospholyl groups, such as a 2-methylphospholyl group, a 3-methylphospholyl group, a 2,3-dimethylphospholyl group, a 3,4-dimethylphospholyl group, a 2,5-dimethylphospholyl group, a 2,3,4-trimethylphospholyl group, a 2,3,5-trimethylphospholyl group, a 2,3,4,5-tetramethylphospholyl group, and substituted phospholyl groups having the same nomenclatures as those of the above groups except that the term "methyl" is replaced with a termi "ethyl", "isopropyl", "t-butyl", "cyclohexyl", "phenyl", or "trimethylsilyl"; a 1,2-diphospholyl group, and substituted 1,2-diphospholyl groups, such as a 3-methyl 1,2-diphospholyl group, a 4-methyl 1,2-diphospholyl group, a 5-methyl 1,2-diphospholyl group, a 3,4-dimethyl 1,2-diphospholyl group, a 3,5-dimethyl 1,2-diphospholyl group, a 3,4,5-trimethyl 1,2-diphospholyl group, and substituted 1,2-diphospholyl groups having the same nomenclatures as those of the above groups except that the term "methyl" is replaced with a term "ethyl", "isopropyl", "t-butyl", "cyclohexyl", "phenyl", or "trimethylsilyl"; a 1,3-diphospholyl group, and substituted 1,3-diphospholyl groups, such as a 2-methyl 1,3-diphospholyl group, a 4-methyl 1,3-diphospholyl group, a 5-methyl 1,3-diphospholyl group, a 2,4-dimethyl 1,3-diphospholyl group, a 2,5-dimethyl 1,3-diphospholyl group, a 2,4,5-trimethyl 1,3-diphospholyl group, and substituted 1,3-diphospholyl groups having the same nomenclatures as those of the above groups except that the term "methyl" is replaced with a term "ethyl", "isopropyl", "t-butyl", "cyclohexyl", "phenyl", or "trimethylsilyl"; a 1,2,3-triphospholyl group, and substituted 1,2,3-triphospholyl groups, such as a 4-methyl 1,2,3-triphospholyl group, a 5-methyl 1,2,3-triphospholyl group, a 4,5-dimethyl 1,2,3-triphospholyl group, and substituted 1,2,3-triphospholyl groups having the same nomenclatures as those of the above groups except that the term "methyl" is replaced with a term "ethyl", "isopropyl", "t-butyl", "cyclohexyl", "phenyl", or "trimethylsilyl"; a 1,3,5-triphospholyl group, and substituted 1,3,5-triphospholyl groups, such as a 2-methyl 1,3,5-triphospholyl group, a 3,4-dimethyl 1,3,5-triphospholyl group, and substituted pyrrolyl groups having the same nomenclatures as those of the above groups except that the term "methyl" is replaced with a term "ethyl", "isopropyl", "t-butyl", "cyclohexyl", "phenyl", or "trimethylsilyl"; a tetraphospholyl group, and substituted tetraphospholyl groups, such as a 5-methyltetraphospholyl group, and substituted tetraphospholyl groups having the same nomenclatures as those of the above groups except that the term "methyl" is replaced with a term "ethyl", "isopropyl", "t-butyl", "cyclohexyl", "phenyl", or "trimethylsilyl"; a pentaphospholyl group; and polycyclic polyphospholyl groups, such as a benzo[b]-phospholyl group, a 4,5,6,7-tetrahydrobenzo[b]-phospholyl group, a benzo[b]-1,2-diphospholyl group, a benzo[b]-1,3-diphospholyl group, a dibenzo[b,d]phospholyl group, and polycyclic polyphospholyl groups which are substituted with a methyl group, an ethyl group, an isopropyl group, a t-butyl group, a cyclohexyl group, a phenyl group, or a trimethylsilyl group.

When E in formula V is an arsenic atom, examples of $L^1$ represented by formula V include an arsolyl group, and substituted arsolyl groups, such as a 2-methylarsolyl group, a 3-methylarsolyl group, a 2,3-dimethylarsolyl group, a 3,4-dimethylarsolyl group, a 2,5-dimethylarsolyl group, a 2,3,4-trimethylarsolyl group, a 2,3,5-trimethylarsolyl group, a 2,3,4,5-tetramethylarsolyl group, and substituted arsolyl groups having the same nomenclatures as those of the above groups except that the term "methyl" is replaced with a term "ethyl", "isopropyl", "t-butyl", "cyclohexyl", "phenyl", or "trimethylsilyl"; a 1,2-diarsolyl group, and substituted 1,2-diarsolyl groups, such as a 3-methyl 1,2-diarsolyl group, a 4-methyl 1,2-diarsolyl group, a 5-methyl 1,2-diarsolyl group, a 3,4-dimethyl 1,2-diarsolyl group, a 3,5-dimethyl 1,2-diarsolyl group, a 3,4,5-trimethyl 1,2-diarsolyl group, and substituted 1,2-diarsolyl groups having the same nomenclatures as those of the above groups except that the term "methyl" is replaced with a term "ethyl", "isopropyl", "t-butyl", "cyclohexyl", "phenyl", or "trimethylsilyl"; a 1,3-diarsolyl group, and substituted 1,3-diarsolyl groups, such as a 2-methyl 1,3-diarsolyl group, a 4-methyl 1,3-diarsolyl group, a 5-methyl 1,3-diarsolyl group, a 2,4-dimethyl 1,3-diarsolyl group, a 2,5-dimethyl 1,3-diarsolyl group, a 2,4,5-trimethyl 1,3-diarsolyl group, and substituted 1,3-diarsolyl groups having the same nomenclatures as those of the above groups except that the term "methyl" is replaced with a term "ethyl", "isopropyl", "t-butyl", "cyclohexyl", "phenyl", or "trimethylsilyl"; a 1,2,3-triarsolyl group, and substituted 1,2,3-triarsolyl groups, such as a 4-methyl 1,2,3-triarsolyl group, a 5-methyl 1,2,3-triarsolyl group, a 4,5-dimethyl 1,2,3-triarsolyl group, and substituted 1,2,3-triarsolyl groups having the same nomenclatures as those of the above groups except that the term "methyl" is replaced with a term "ethyl", "isopropyl", "t-butyl", "cyclohexyl", "phenyl", or "trimethylsilyl"; a 1,3,5-triarsolyl group, and substituted 1,3,5-triarsolyl groups, such as a 2-methyl 1,3,5-triarsolyl group, a 2,4-dimethyl 1,3,5-triarsolyl group, and substituted 1,3,5-triarsolyl groups having the same nomenclatures as those of the above groups except that the term "methyl" is replaced with a term "ethyl", "isopropyl", "t-butyl", "cyclohexyl", "phenyl", or "trimethylsilyl"; a tetraarsolyl group, and substituted tetraarsolyl groups, such as a 5-methyltetraarsolyl group, and substituted tetraarsolyl groups having the same nomenclature as that of the above group except that the term "methyl" is replaced with a term "ethyl", "isopropyl", "t-butyl", "cyclohexyl", "phenyl", or "trimethylsilyl"; and polycyclic polyarsolyl groups, such as benzo[b]arsolyl group, a 4,5,6,7-tetrahydrobenzo[b]arsolyl group, a benzo[b]-1,2-diarsolyl group, a benzo[b]-1,3-diarsolyl group, a dibenzo[b,d]arsolyl group, and polycyclic polyarsolyl groups which are substituted with a methyl group, an ethyl group, an isopropyl group, a t-butyl group, a cyclohexyl group, a phenyl group, or a dimethylsilyl group.

When E in formula V is an antimony atom, examples of ligand $L^1$ represented by formula V include a stibolyl group, and substituted stibolyl groups, such as a 2-methylstibolyl group, a 3-methylstibolyl group, a 2,3-dimethylstibolyl group, a 3,4-dimethylstibolyl group, a 2,5-dimethylstibolyl group, a 2,3,4-trimethylstibolyl group, a 2,3,5-trimethylstibolyl group, a 2,3,4,5-tetramethylstibolyl group, and substituted stibolyl groups having the same nomenclatures as those of the above groups except that the term "methyl" is replaced with a term "ethyl", "isopropyl", "t-butyl", "cyclohexyl", "phenyl", or "trimethylsilyl"; a 1,2-distibolyl group, and substituted 1,2-distibolyl groups, such as a 3-methyl 1,2-distibolyl group, a 4-methyl 1,2-distibolyl group, a 5-methyl 1,2-distibolyl group, a 3,4-dimethyl 1,2-distibolyl group, a 3,5-dimethyl 1,2-distibolyl group, a 3,4,5-trimethyl 1,2-distibolyl group, and substituted 1,2-distibolyl groups having the same nomenclatures as those of the above groups except that the term "methyl" is replaced with a term "ethyl", "isopropyl", "t-butyl", "cyclohexyl", "phenyl", or "trimethylsilyl"; a 1,3-distibolyl group, and substituted 1,3-distibolyl groups, such as a 2-methyl 1,3-distibolyl group, a 4-methyl 1,3-distibolyl group, a 5-methyl 1,3-distibolyl group, a 2,4-dimethyl 1,3-distibolyl group, a 2,5-dimethyl 1,3-distibolyl. group, a 2,4,5-trimethyl 1,3-distibolyl group, and substituted 1,3-distibolyl groups having the same nomenclatures as those of the above groups except that the term "methyl" is replaced with a term "ethyl", "isopropyl", "t-butyl", "cyclohexyl", "phenyl", or "trimethylsilyl"; a 1,2,3-tristibolyl group, and substituted 1,2,3-tristibolyl groups, such as a 4-methyl 1,2,3-tristibolyl group, a 5-methyl 1,2,3-tristibolyl group, a 4,5-dimethyl 1,2,3-tristibolyl group, and substituted 1,2,3-tristibolyl groups having the same nomenclatures as those of the above groups except that the term "methyl" is replaced with a term "ethyl", "isopropyl", "t-butyl", "cyclohexyl", "phenyl", or "trimethylsilyl"; a 1,3,5-tristibolyl groups, and substituted 1,3,5-tristibolyl groups, such as a 2-methyl 1,3, 5-tristibolyl group, a 2,4-dimethyl 1,3,5-tristibolyl group, and substituted 1,3,5-tristibolyl groups having the same nomenclatures as those of the above groups except that the term "methyl" is replaced with a term "ethyl", "isopropyl", "t-butyl", "cyclohexyl", "phenyl", or "trimethylsilyl"; a tetrastibolyl group, and substituted tetrastibolyl groups, such as a 5-methyltetrastibolyl group, and substituted tetrastibolyl groups having the same nomenclature as that of the above group except that the term "methyl" is replaced with a term "ethyl", "isopropyl", "t-butyl", "cyclohexyl", "phenyl", or "trimethylsilyl"; polycyclic polystibolyl groups, such as a benzo[b]stibolyl group, a 4,5,6,7-tetrahydrobenzo[b]stibolyl group, a benzo[b]-1,2-distibolyl group, a benzo[b]-1,3-distibolyl group, a dibenzo[b,d]stibolyl group, and polycyclic polystibolyl groups which are substituted with a methyl group, an ethyl group, an isopropyl group, a t-butyl group, a cyclohexyl group, a phenyl group or a trimethylsilyl group.

When E in formula v is a bismuth atom, examples of ligand $L^1$ represented by formula V include a bismolyl group, and substituted bismolyl groups, such as a 2-methylbismolyl group, a 3-methylbismolyl group, a 2,3-dimethylbismolyl group, a 3,4-dimethylbismolyl group, a 2,5-dimethylbismolyl group, a 2,3,4-trimethylbismolyl group, a 2,3,5-trimethylbismolyl group, a 2,3,4,5-tetramethylbismolyl group, and substituted bismolyl groups having the same nomenclatures as those of the above groups except that the term "methyl" is replaced with a term "ethyl", "isopropyl", "t-butyl", "cyclohexyl", "phenyl", or "trimethylsilyl"; a 1,2-dibismolyl group, and substituted 1,2-dibismolyl groups, such as a 3-methyl 1,2-dibismolyl group, a 4-methyl 1,2-dibismolyl group, a 5-methyl 1,2-dibismolyl group, a 3,4-dimethyl 1,2-dibismolyl group, a 3,5-dimethyl 1,2-dibismolyl group, a 3,4,5-trimethyl 1,2-dibismolyl group, and substituted 1,2-dibismolyl groups having the same nomenclatures as those of the above groups except that the term "methyl" is replaced with a term "ethyl", "isopropyl", "t-butyl", "cyclohexyl", "phenyl", or "trimethylsilyl"; a 1,3-dibismolyl groups, and substituted 1,3-dibismolyl groups, such as a 2-methyl 1,3-dibismolyl group, a 4-methyl 1,3-dibismolyl group, a 5-methyl 1,3-dibismolyl group, a 2,4-dimethyl 1,3-dibismolyl group, a 2,5-dimethyl 1,3-dibismolyl group, a 2,4,5-trimethyl 1,3-dibismolyl group, and substituted 1,3-dibismolyl groups having the same nomenclatures as those of the above groups except that the term "methyl" is replaced with a term "ethyl", "isopropyl", "t-butyl", "cyclohexyl", "phenyl", or "trimethylsilyl"; a 1,2,3-tribismolyl group, and substituted 1,2,3-tribismolyl groups, such as a 4-methyl 1,2,3-tribismolyl group, a 5-methyl 1,2,3-tribismolyl group, a 4,5-dimethyl 1,2,3-tribismolyl group, and substituted 1,2,3-tribismolyl groups having the same nomenclatures as those of the above groups except that the term "methyl" is replaced with a term "ethyl", "isopropyl", "t-butyl", "cyclohexyl", "phenyl", or "trimethylsilyl"; a 1,3,5-tribismolyl group, and substituted 1,3,5-tribismolyl groups, such as a 2-methyl 1,3,5-tribismolyl group, a 2,4-dimethyl 1,3,5-tribismolyl group, and substituted 1,3,5-tribismolyl groups having the same nomenclatures as those of the above groups except that the term "methyl" is replaced with a term "ethyl", "isopropyl", "t-butyl", "cyclohexyl", "phenyl", or "trimethylsilyl"; a tetrabismolyl group, and substituted tetrabismolyl groups, such as a 5-methyltetrabismolyl group, and substituted tetrabismolyl groups having the same nomenclatures as that of the above group except that the term "methyl" is replaced with a term "ethyl", "isopropyl", "t-butyl", "cyclohexyl", "phenyl", or "trimethylsilyl"; polycyclic polybismolyl groups, such as a benzo[b]bismolyl group, a 4,5,6,7-tetrahydrobenzo[b]bismolyl group, a benzo [b]-1,2-dibismolyl group, a benzo[b]-1,3-dibismolyl group and a dibenzo[b,d]bismolyl group, and polycyclic polybismolyl groups which are substituted with a methyl group, an ethyl group, an isopropyl group, a t-butyl, a cyclohexyl group, a phenyl group, or a trimethylsilyl group.

Further, when E in formula V is a combination of atoms selected from nitrogen, phosphorus, arsenic, antimony and bismuth atoms, examples of ligand $L^1$ represented by formula V include a phosphazolyl group, a phosphadiazolyl group, a diphosphadiazolyl group, a phosphatriazolyl group, a diphosphazolyl group, a triphosphazolyl group, an arsazolyl group, a stibazolyl group, a bismazolyl group, an arsaphospholyl group, a stibaphospholyl group, a bismaphospholyl group, a stibaarsolyl group, a bismaarsolyl group, a bismastibolyl group, and groups which can be obtained by substitution of the above groups with an alkyl group, and polycyclic compounds containing the above groups.

In combination (2) of $L^1$ and $L^2$, ligand $L^2$ to be employed in combination with $L^1$ is selected from the group consisting of a ligand having a σ-bond and a ligand having a σ-bond and a bond selected from the group consisting of at least one π-bond and at least one lone electron pair donative bond, with the proviso that when m of formula V is 1, $L^2$ is a ligand having a σ-bond, or a ligand having a σ-bond and at least one lone electron pair donative bond.

As illustrative examples of $L^2$ of combination (2) of $L^1$ and $L^2$, there can be mentioned the same compounds as compounds mentioned as being employable as $L^2$ of combination (1) of $L^1$ and $L^2$.

In combination (3) of ligands $L^1$ and $L^2$, ligand $L^1$ is a trispyrazolyl tridentate ligand represented by formula VI:

(VI)

In formula VI, A is defined above for formula III. That is, in formula VI, A is a carbon atom, or a boron atom substituted with a substituent selected from the group consisting of:

a hydrogen atom;

a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom;

a $C_6$–$C_{20}$, more preferably $C_6$–$C_{14}$ aromatic hydrocarbon group which is unsubstituted or substituted with at least one $C_1$–$C_{10}$ alkyl group or at least one halogen atom;

an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a silyl group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

an amino group which is N,N-disubstituted with a saturated or unsaturated $C_1$–$C_{20}$ aliphatic hydrocarbon group or a $C_6$–$C_{20}$ aromatic hydrocarbon group; and a phosphino group which is P,P-disubstituted with a saturated or unsaturated $C_1$–$C_{20}$ aliphatic hydrocarbon group or a $C_6$–$C_{20}$ aromatic hydrocarbon group.

In formula VI, each of $Z^3$, $Z^4$ and $Z^5$ independently represents a pyrazolyl group represented by formula IV:

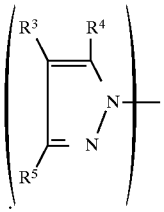

(IV)

wherein:

each of $R^3$, $R^4$ and $R^5$ independently represents:

a hydrogen atom;

a saturated or unsaturated $C_1$–$C_{20}$, more preferably $C_1$–$C_{10}$ aliphatic hydrocarbon group which is unsubstituted or substituted with at least one $C_6$–$C_{14}$ aromatic hydrocarbon group or at least one halogen atom;

a $C_6$–$C_{20}$, more preferably $C_6$–$C_{14}$ aromatic hydrocarbon group which is unsubstituted or substituted with at least one $C_1$–$C_{10}$ alkyl group or at least one halogen atom;

an oxy group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a thio group which is substituted with a saturated or unsaturated $C_1$–$C_{20}$, more preferably $C_1$–$C_{10}$ aliphatic hydrocarbon group unsubstituted or substituted with at least one $C_6$–$C_{14}$ aromatic hydrocarbon group, or which is substituted with a $C_6$–$C_{20}$, more preferably $C_6$–$C_{14}$ aromatic hydrocarbon group unsubstituted or substituted with at least one $C_1$–$C_{10}$ alkyl group;

a silyl group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

a siloxy group which is unsubstituted or substituted with at least one saturated or unsaturated $C_1$–$C_{20}$, more preferably $C_1$–$C_{10}$, still more preferably $C_1$–$C_6$ aliphatic hydrocarbon group, at least one $C_6$–$C_{20}$, more preferably $C_6$–$C_{14}$, still more preferably $C_6$–$C_{10}$ aromatic hydrocarbon group, or at least one halogen atom;

an amino group which is N,N-disubstituted with a saturated or unsaturated $C_1$–$C_{20}$ aliphatic hydrocarbon group or a $C_6$–$C_{20}$ aromatic hydrocarbon group; and a phosphino group which is P,P-disubstituted with a saturated or unsaturated $C_1$–$C_{20}$ aliphatic hydrocarbon group or a $C_6$–$C_{20}$ aromatic hydrocarbon group.

In formula IV, a bridge bond is optionally formed between $R^3$ and $R^4$ or between $R^3$ and $R^5$.

Examples of such trispyrazolyl tridentate ligands include a hydrotrispyrazolylborate group; and derivatives thereof obtained by substituting the hydro group of the hydrotrispyrazolylborate group with alkyl, aryl or a heterocyclic ring, such as isopropyltrispyrazolylborate, n-butyltrispyrazolylborate, and tetrakispyrazolylborate (Class 1 ligands); Class 1 ligands having monosubstituted pyrazolyl, such as hydrotris(3-isopropylpyrazolyl)borate, hydrotris(3-t-butylpyrazolyl)borate, hydrotris(3-phenylpyrazolyl)borate, and hydrotris(3-(2'-thienyl) pyrazolyl)borate (Class 2 ligands); substitution isomers of Class 2 ligands, such as hydrobis(3-isopropylpyrazolyl)(5-isopropylpyrazolyl)borate and the like (Class 3 ligands); Class 1 ligands having disubstituted pyrazolyl, such as hydrotris(3,5-dimethylpyrazolyl)borate, isopropyltris(3,5-dimethylpyrazolyl)borate, n-butyltris(3,5-dimethylpyarzolyl)borate, tetrakis(3,5-dimethylpyarzolyl)borate, hydrotris(3,5-diisopropylpyrazolyl)borate, isopropyltris(3,5-diisopropylpyrazolyl)borate, n-butyltris(3,5-diisopropylpyrazolyl)borate, tetrakis(3,5-diisopropylpyrazolyl)borate, hydrotris(3,5-diphenylpyrazolyl)borate, isopropyltris(3,5-diphenylpyrazolyl)borate, n-butyltris(3,5-diphenylpyrazolyl)borate, tetrakis(3,5-diphenylpyrazolyl)borate and hydrotri s(3-isopropyl-4-bromopyrazolyl)borate (Class 4 ligands); and substitution isomers of Class 4 ligands, such as hydrobis(3-isopropyl-4-bromopyrazolyl)(5-isopropyl-4-bromopyrazolyl)borate; ring-substituted Class 1 ligands, such as hydrotris(7-isopropyl-4-methyl-4,5,6,7-tetrahydro-2-indazoyl)borate (Class 5 ligands).

Ligand $L^2$ of combination (3) of $L^1$ and $L^2$ is an alkapolyenyl ligand having a σ-bond and two or more π-bonds.

As examples of L2 employable in combination with $L^1$ of combination (3) of $L^1$ and $L^2$, there can be mentioned alkatrienyl, cycloalkatrienyl, cycloalkadienyl and alkadienyl.

An especially preferred example of ligand $L^2$ of combination (3) of $L^1$ and $L^2$ is a ligand having a monocyclic or polycyclic alkadienyl skeleton represented by the following formula XI:

$C_5H_{5-x}R_x$ (XI)

wherein:

H represents a hydrogen atom;

X represents an integer of from 0 to 5; and each R independently represents:
- a saturated or unsaturated $C_1-C_{20}$, more preferably $C_1-C_{10}$ aliphatic hydrocarbon group which is unsubstituted or substituted with at least one $C_6-C_{14}$ aromatic hydrocarbon group or at least one halogen atom, a $C_6-C_{20}$, more preferably $C_6-C_{14}$ aromatic hydrocarbon group which is unsubstituted or substituted with at least one $C_1-C_{10}$ alkyl group or at least one halogen atom,
- an oxy group which is substituted with a saturated or unsaturated $C_1-C_{20}$, more preferably $C_1-C_{10}$ aliphatic hydrocarbon group unsubstituted or substituted with at least one $C_6-C_{14}$ aromatic hydrocarbon group, or which is substituted with a $C_6-C_{20}$, more preferably $C_6-C_{14}$ aromatic hydrocarbon group unsubstituted or substituted with at least one $C_1-C_{10}$ alkyl group,
- a thio group which is substituted with a saturated or unsaturated $C_1-C_{20}$, more preferably $C_1-C_{10}$ aliphatic hydrocarbon group unsubstituted or substituted with at least one $C_6-C_{14}$ aromatic hydrocarbon group, or which is substituted with a $C_6-C_{20}$, more preferably $C_6-C_{14}$ aromatic hydrocarbon group unsubstituted or substituted with at least one $C_1-C_{10}$ alkyl group,
- a silyl group which is unsubstituted or substituted with at least one saturated or unsaturated $C_1-C_{20}$, more preferably $C_1-C_{10}$, still more preferably $C_1-C_6$ aliphatic hydrocarbon group, at least one $C_6-C_{20}$, more preferably $C_6-C_{14}$, still more preferably $C_6-C_{10}$ aromatic hydrocarbon group, or at least one halogen atom,
- a siloxy group which is unsubstituted or substituted with at least one saturated or unsaturated $C_1-C_{20}$, more preferably $C_1-C_{10}$, still more preferably $C_1-C_6$ aliphatic hydrocarbon group, at least one $C_6-C_{20}$, more preferably $C_6-C_{14}$, still more preferably $C_6-C_{10}$ aromatic hydrocarbon group, or at least one halogen atom,
- an amino group which is N,N-disubstituted with a saturated or unsaturated $C_1-C_{20}$ aliphatic hydrocarbon group or a $C_6-C_{20}$ aromatic hydrocarbon group, or
- a phosphino group which is P,P-disubstituted with a saturated or unsaturated $C_1-C_{20}$ aliphatic hydrocarbon group or a $C_6-C_{20}$ aromatic hydrocarbon group.

Examples of ligands represented by formula XI include a cyclopentadienyl group, a methylcyclopentadienyl group, an ethylcyclopentadienyl group, an n-propylcyclopentadienyl group, an isopropylcyclopentadienyl group, an n-butylcyclopentadienyl group, a trimethylsilylcyclopentadienyl group, a trimethylgermylcyclopentadienyl group, a 1,2-dimethylcyclopentadienyl group and 1,3- or 1,4-substitution isomers thereof, a 1,2,3-trimethylcyclopentadienyl group and substitution isomers thereof, a 1,2,3,4-tetramethylcyclopentadienyl group and substitution isomers thereof, a tetramethylcyclopentadienyl group, an unsubstituted or substituted indenyl group, an unsubstituted or substituted terahydroindenyl group, an unsubstituted or substituted fluorenyl group, and an unsubstituted or substituted octahydrofluorenyl group. The above-mentioned ligands may be bridge-bonded to ligand $L^1$ represented by formula VI.

When a bridge bond is formed between $L^1$ and $L^2$, $L^1$ and $L^2$ may be bridge-bonded through a divalent group. Examples of such divalent groups through which $L^1$ and $L^2$ may be bridge bonded include an alkylene group, such as a methylene group, a diphenylmethylene group, an ethylene group, a propylene group and a cyclohexylene group; a silylene group, and derivatives thereof, such as a dimethylsilylene group and a diphenylsilylene group; a germylene group, and derivatives thereof, such as a dimethylgermylene group and a diphenylgermylene group; and a stannylene group, and derivatives thereof, such as a dimethylstannylene group and a diphenylstannylene group.

In the present invention, a bridge bond may be formed within either of ligand $L^1$ and $L^2$ through a divalent hydrocarbon group, such as a methylene group, a diphenylmethylene group, an ethylene group, a propylene group, a butenylene group and a cyclohexylene group.

The transition metal used in the catalyst of the present invention is selected from the group consisting of metals of Groups IIIA including the lanthanide series, IVA, VA, VIA, VIIA and VIII, more preferably metals of Groups IIIA, IVA, VA of the Periodic Table of the Elements. It is still more preferred that the transition metal used in the catalyst of the present invention is selected from metals of Groups IVA, such as titanium, zirconium and hafnium. The transition metal compound of the catalyst of the present invention is selected from compounds represented by the following formulae XII, XIII, XIV and XV:

 (XII)

 (XIII)

 (XIV)

and

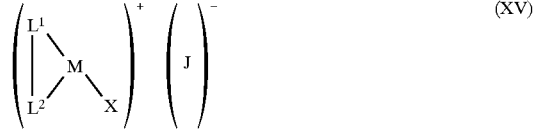 (XV)

wherein:

M is a transition metal of Groups IVA of the Periodic Table of the Elements,

X is an anionic ligand,

J is a non-coordinating anion, $L^1$ and $L^2$ are ligands, a combination of which is at least one combination selected from the group consisting of combinations (1), (2) and (3) of $L^1$ and $L^2$ described above, and wherein a bridge bond may be formed between ligand $L^1$ and ligand $L^2$.

Examples of compounds of formula XII wherein M represents zirconium include those which can be classified into the following three classes, i.e., Classes 1 to 3.

Class 1 (compounds having a combination of ligand $L^1$ and ligand $L^2$, wherein ligand $L^1$ is a group containing at least one phosphorous-containing group, represented by formula III and ligand $L^2$ is selected from the group consisting of a ligand having a σ-bond and a ligand having a σ-bond and a bond selected from the group consisting of at least one π-bond and at least one lone electron pair donative bond):
tris(diphenylphosphino)methanidozirconium trichloride,
tris(diphenylphosphino)methanidozirconium tribenzyl,
tris(diphenylphosphino)methanidozirconium trimethyl,
tris(diphenylphosphino)methanidodiisopropylaminozirconium dichloride,
tris(diphenylphosphino)methanidodiisopropylaminozirconium dimethyl,
tris(diphenylphosphino)methanidodi(t-butyl)aminozirconium dichloride,
tris(diphenylphosphino)methanidodi(t-butyl)aminozirconium dimethyl,
tris(diphenylphosphino)methanidodicyclohexylaminozirconium dichloride,
tris(diphenylphosphino)methanidodicyclohexylaminozirconium dimethyl,
tris(diphenylphosphino)methanidodiphenylphosphinozirconium dichloride,
tris(diphenylphosphino)methanidodiphenylphosphinozirconium dimethyl,
tris(diphenylphosphino)methanidodicyclohexylphosphinozirconium dichloride,
tris(diphenylphosphino)methanidodicyclohexylphosphinozirconium dimethyl,
tris(diphenylphosphino)methanidocyclopentadienylzirconium dichloride,
tris(diphenylphosphino)methanidocyclopentadienylzirconium dimethyl,
tris(diphenylphosphino)methanidobutylcyclopentadienylzirconium dichloride,
tris(diphenylphosphino)methanidobutylcyclopentadienylzirconium dimethyl,
tris(diphenylphosphino)methanidoindenylzirconium dichloride,
tris(diphenylphosphino)methanidoindenylzirconium dimethyl,
tris(diphenylphosphino)methanidotetrahydroindenylzirconium dichloride,
tris(diphenylphosphino)methanidotetrahydroindenylzirconium dimethyl,
tris(diphenylphosphino)methanidofluorenylzirconium dichloride,
tris(diphenylphosphino)methanidofluorenylzirconium dimethyl,
tris(diphenyloxophosphoranyl)methanidozirconium trichloride,
tris(diphenyloxophosphoranyl)methanidozirconium tribenzyl,
tris(diphenyloxophosphoranyl)methanidozirconium trimethyl,
tris(diphenyloxophosphoranyl)methanidodiisopropylaminozirconium dichloride,
tris(diphenyloxophosphoranyl)methanidodiisopropylaminozirconium dimethyl,
tris(diphenyloxophosphoranyl)methanidodi(t-butyl)aminozirconium dichloride,
tris(diphenyloxophosphoranyl)methanidodi(t-butyl)aminozirconium dimethyl,
tris(diphenyloxophosphoranyl)methanidodicyclohexylaminozirconium dichloride,
tris(diphenyloxophosphoranyl)methanidodicyclohexylaminozirconium dimethyl,
tris(diphenyloxophosphoranyl)methanidodiphenylphosphinozirconium dichloride,
tris(diphenyloxophosphoranyl)methanidodiphenylphosphinozirconium dimethyl,
tris(diphenyloxophosphoranyl)methanidodicyclohexylphosphinozirconium dichloride,
tris(diphenyloxophosphoranyl)methanidodicyclohexylphosphinozirconium dimethyl,
tris(diphenyloxophosphoranyl)methanidocyclopentadienylzirconium dichloride,
tris(diphenyloxophosphoranyl)methanidocyclopentadienylzirconium dimethyl,
tris(diphenyloxophosphoranyl)methanidobutylcyclopentadienylzirconium dichloride,
tris(diphenyloxophosphoranyl)methanidobutylcyclopentadienylzirconium dimethyl,
tris(diphenyloxophosphoranyl)methanidoindenylzirconium dichloride,
tris(diphenyloxophosphoranyl)methanidoindenylzirconium dimethyl,
tris(diphenyloxophosphoranyl)methanidotetra(n-butyl)indenylzirconium dichloride,
tris(diphenyloxophosphoranyl)methanidotetra(n-butyl)indenylzirconium dimethyl,
tris(diphenyloxophosphoranyl)methanidofluorenylzirconium dichloride,
tris(diphenyloxophosphoranyl)methanidofluorenylzirconium dimethyl,
tris(diphenylthiophosphoranyl)methanidozirconium trichloride,
tris(diphenylthiophosphoranyl)methanidozirconium tribenzyl,
tris(diphenylthiophosphoranyl)methanidozirconium trimethyl,
tris(diphenylthiophosphoranyl)methanidodiisopropylaminozirconium dichloride,
tris(diphenylthiophosphoranyl)methanidodiisopropylaminozirconium dimethyl,
tris(diphenylthiophosphoranyl)methanidodi(t-butyl)aminozirconium dichloride,
tris(diphenylthiophosphoranyl)methanidodicyclohexylaminozirconium dichloride,
tris(diphenylthiophosphoranyl)methanidodiphenylphosphinozirconium dichloride,
tris(diphenylthiophosphoranyl)methanidodicyclohexylphosphinozirconium dichloride,
tris(diphenylthiophosphoranyl)methanidocyclopentadienylzirconium dichloride,
tris(diphenylthiophosphoranyl)methanidobutylcyclopentadienylzirconium dichloride,
tris(diphenylthiophosphoranyl)methanidoindenylzirconium dichloride,
tris(diphenylthiophosphoranyl)methanidotetrahydroindenylzirconium dichloride,
tris(diphenylthiophosphoranyl)methanidofluorenylzirconium dichloride,
bis(diphenylphosphino)(diphenyloxophosphoranyl)methanidozirconium trichloride,
bis(diphenylphosphino)(diphenyloxophosphoranyl)methanidozirconium tribenzyl,
bis(diphenylphosphino)(diphenyloxophosphoranyl)methanidozirconium trimethyl,
bis(diphenylphosphino)(diphenyloxophosphoranyl)methanidodiisopropylaminozirconium dichloride,
bis(diphenylphosphino)(diphenyloxophosphoranyl)methanidodiisopropylaminozirconium dimethyl,
bis(diphenylphosphino)(diphenyloxophosphoranyl)methanidodi(t-butyl)aminozirconium dichloride,
bis(diphenylphosphino)(diphenyloxophosphoranyl)methanidodicyclohexylaminozirconium dichloride,
bis(diphenylphosphino)(diphenyloxophosphoranyl)methanidodiphenylphosphinozirconium dichloride, bis(diphenylphosphino)(diphenyloxophosphoranyl) methanidodicyclohexylphosphinozirconium dichloride,
bis(diphenylphosphino)(diphenyloxophosphoranyl) methanidocyclopentadienylzirconium dichloride,
bis(diphenylphosphino)(diphenyloxophosphoranyl) methanidobutylcyclopentadienylzirconium dichloride,
bis(diphenylphosphino)(diphenyloxophosphoranyl) methanidoindenylzirconium dichloride,
bis(diphenylphosphino)(diphenyloxophosphoranyl) methanidotetrahydroindenylzirconium dichloride,
bis(diphenylphosphino)(diphenyloxophosphoranyl) methanidofluorenylzirconium dichloride,
tris(diphenylselenophosphoranyl) methanidozirconiumtrichloride,
tris(diphenylselenophosphoranyl)methanidozirconium tribenzyl,
tris(diphenylselenophosphoranyl)methanidozirconium trimethyl,
tris(diphenylselenophosphoranyl.) methanidodiisopropylaminozirconium dichloride,
tris(diphenylselenophosphoranyl) methanidodiisopropylaminozirconium dimethyl,
tris(diphenylselenophosphoranyl)methanidodi(t-butyl) aminozirconium dichloride,
tris(diphenylselenophosphoranyl) methanidodicyclohexylaminozirconium dichloride,
tris(diphenylselenophosphoranyl) methanidodiphenylphosphinozirconium dichloride,
tris(diphenylselenophosphoranyl) methanidodicyclohexylphosphinozirconium dichloride,
tris(diphenylselenophosphoranyl) methanidocyclopentadienylzirconium dichloride,
tris(diphenylselenophosphoranyl) methanidobutylcyclopentadienylzirconium dichloride,
tris(diphenylselenophosphoranyl) methanidoindenylzirconium dichloride,
tris(diphenylselenophosphoranyl) methanidotetrahydroindenylzirconium dichloride,
tris(diphenylselenophosphoranyl) methanidofluorenylzirconium dichloride,
bis(diphenylphosphino)(diphenylthiophosphoranyl) methanidozirconium trichloride,
bis(diphenylphosphino)(diphenylthiophosphoranyl) methanidozirconium tribenzyl,
bis(diphenylphosphino)(diphenylthiophosphoranyl) methanidozirconium trimethyl,
bis(diphenylphosphino)(diphenylthiophosphoranyl) methanidodiisopropylaminozirconium dichloride,
bis(diphenylphosphino)(diphenylthiophosphoranyl) methanidodiisopropylaminozirconium dimethyl,
bis(diphenylphosphino)(diphenylthiophosphoranyl) methanidodi(t-butyl)aminozirconium dichloride,
bis(diphenylphosphino)(diphenylthiophosphoranyl) methanidodihexylaminozirconium dichloride,
bis(diphenylphosphino)(diphenylthiophosphoranyl) methanidodiphenylphosphinozirconium dichloride,
bis(diphenylphosphino)(diphenylthiophosphoranyl) methanidodicyclohexylphosphinozirconium dichloride,
bis(diphenylphosphino)(diphenylthiophosphoranyl) methanidocyclopentadienylzirconium dichloride,
bis(diphenylphosphino)(diphenylthiophosphoranyl) methanidobutylcyclopentadienylzirconium dichloride,
bis(diphenylphosphino)(diphenylthiophosphoranyl) methanidoindenylzirconium dichloride,
bis(diphenylphosphino)(diphenylthiophosphoranyl) methanidotetrahydroindenylzirconium dichloride,
bis(diphenylphosphino)(diphenylthiophosphoranyl) methanidofluorenylzirconium dichloride,
(diphenyloxophosphoranyl)(diphenylthiophosphoranyl) (diphenylselenophosphoranyl)methanidozirconium trichloride,
(diphenyloxophosphoranyl)(diphenylthiophosphoranyl) (diphenylselenophosphoranyl)methanidozirconium tribenzyl,
(diphenyloxophosphoranyl)(diphenylthiphoranyl) (diphenylselenophosphoranyl)methanidozirconium trimethyl,
(diphenyloxophosphoranyl)(diphenylthiophosphoranyl) (diphenylselenophosphoranyl) methanidodiisopropylaminozirconium dichloride,
(diphenyloxophosphoranyl)(diphenylthiophosphoranyl) (diphenylselenophosphoranyl) methanidodiisopropylaminozirconium dimethyl,
(diphenyloxophosphoranyl)(diphenylthiophosphoranyl) (diphenylselenophosphoranyl)methanidodi(t-butyl) aminozirconium dichloride,
(diphenyloxophosphoranyl)(diphenylthiophosphoranyl) (diphenylselenophosphoranyl) methanidodicyclohexylaminozirconium dichloride,
(diphenyloxophosphoranyl)(diphenylthiophosphoranyl) (diphenylselenophosphoranyl) methanidodiphenylphosphinozirconium dichloride,
(diphenyloxophosphoranyl)(diphenylthiophosphoranyl) (diphenylselenophosphoranyl) methanidodicyclohexylphosphinozirconium dichloride,
(diphenyloxophosphoranyl)(diphenylthiophosphoranyl) diphenylselenophosphoranyl) methanidocyclopentadienylzirconium dichloride,
(diphenyloxophosphoranyl)(diphenylthiophosphoranyl) (diphenylselenophosphoranyl) methanidobutylcyclopentadienylzirconium dichloride,
(diphenyloxophosphoranyl)(diphenylthiophosphoranyl) (diphenylselenophosphoranyl) methanidoindenylzirconium dichloride,
(diphenyloxophosphoranyl)(diphenylthiophosphoranyl) (diphenylselenophosphoranyl) methanidotetrahydroindenylzirconium dichloride,
(diphenyloxophosphoranyl)(diphenylthiophosphoranyl) (diphenylselenophosphoranyl) methanidofluorenylzirconium dichloride,
substituted compounds of the above compounds, and compounds having the same nomenclatures as those of the above compounds except that the term "methanido" is replaced with "hydroborato" or "$C_1$–$C_{10}$ alkyl group-substituted borato".

Class 2 (compounds having a combination of ligand $L^1$ and ligand $L^2$ wherein ligand $L^1$ is a 5-membered heterocyclic ligand, represented by formula V, containing at least one trivalent atom selected from the group consisting of nitrogen, phosphorus, arsenic, antimony and bismuth atoms and ligand $L^2$ is selected from the group consisting of a ligand having a σ-bond and a ligand having a σ-bond and a bond selected from the group consisting of at least one π-bond and at least one lone electron pair donative bond, with the proviso that when m of formula V is 1, $L^2$ is a ligand having a σ-bond, or a ligand having a σ-bond and at least one lone electron pair donative bond):

pyrazolylzirconium trichloride,
pyrazolylzirconium trimethyl,
pyrazolylzirconium tribenzyl,
cyclopentadienylpyrazolylzirconium dichloride,
hydrotrispyrazolylboratopyrazolylzirconium dichloride,
tris(diphenyloxophosphoranyl) methanidopyrazolylzirconium dichloride,
bis(pyrazolyl)zirconium dichloride, bis(pyrazolyl)zirconium dimethyl,
bis(pyrazolyl)zirconium dibenzyl,
3,4,5-trimethylpyrazolylzirconium trichloride,
3,4,5-trimethylpyrazolylzirconium trimrthyl,
3,4,5-trimethylpyrazolylzirconium tribenzyl,
cyclopentadienyl(3,4,5-trimethylpyrazolyl)zirconium dichloride,
hydrotrispyrazolylborato( 3,4,5-trimethylpyrazolyl) zirconium dichloride,
tris(diphenyloxophosphoranyl)methanido(3,4,5-trimethylpyrazolyl)zirconium dichloride,
bis(3,4,5-trimethylpyrazolyl)zirconium dichloride,
bis(3,4,5-trimethylpyrazolyl)zirconium dimethyl,
bis(3,4,5-trimethylpyrazolyl)zirconium dibenzyl,
imidazolylzirconium trichloride,
imidazolylzirconium trimethyl,
imidazolylzirconium tribenzyl,
cyclopentadienylimidazolylzirconium dichloride,
hydrotrispyrazolylboratoimidazolylzirconium dichloride,
tris(diphenyloxophosphoranyl) methanidoimidazolylzirconium dichloride,
bis(imidazolyl)zirconium dichloride,
bis(imidazolyl)zirconium dimethyl,
bis(imidazolyl)zirconium dibenzyl,
1,2,3-triazolylzirconium trichloride,
1,2,3-triazolylzirconium trimethyl,
1,2,3-triazolylzirconium tribenzyl,
cyclopentadienyl(1,2,3-triazolyl)zirconium dichloride,
hydrotrispyrazolylborato(1,2,3-triazolyl)zirconium. dichloride,
tris(diphenyloxophosphoranyl)methanido(1,2,3-triazolyl) zirconium dichloride,
bis (1,2,3-triazolyl) zirconium dichloride,
bis(1,2,3-triazolyl)zirconium dimethyl,
bis(1,2,3-triazolyl)zirconium dibenzyl,
tetraazolylzirconium trichloride,
tetraazolylzirconium trimethyl,
tetraazolylzirconium tribenzyl,
cyclopentadienyltetraazolylzirconium dichloride,
hydrotrispyrazolylboratotetraazolylzirconium dichloride,
tris(diphenyloxophosphoranyl) methanidotetraazolylzirconium dichloride,
bis(tetraazolyl)zirconium dichloride,
bis(tetraazolyl)zirconium dimethyl,
bis(tetraazolyl)zirconium dibenzyl,
(1,2-diphospholyl)zirconium trichloride,
(1, 2-diphospholyl)zirconium trimethyl,
(1,2-diphospholyl)zirconium tribenzyl,
cyclopentadienyl(1,2-diphospholyl)zirconium dichloride,
hydrotrispyrazolylborato(1,2-diphospholyl)zirconium dichloride,
tris(diphenyloxophosphoranyl)methanido(1,2-diphospholyl)zirconium dichloride,
bis(1,2-diphospholyl)zirconium dichloride,
bis(1,2-diphospholyl)zirconium dimethyl,
bis(1,2-diphospholyl)zirconium dibenzyl,
3,4,5-trimethyl-1,2-diphospholylzirconium trichloride,
3,4,5-trimethyl-1,2-diphospholylzirconium trimethyl,
3,4,5-trimethyl-1,2-diphospholylzirconium tribenzyl,
cyclopentadienyl(3,4,5-trimethyl-1,2-diphospholyl) zirconium dichloride,
hydrotrispyrazolylborato(3,4,5-trimethyl-1,2-diphospholyl) zirconium dichloride,
tris(diphenyloxophosphoranyl)methanido-(3,4,5-trimethyl-1,2-diphospholyl)zirconium dichloride,
bis(3,4,5-trimethyl-1,2-diphospholyl)zirconium dichloride,
bis(3,4,5-trimethyl-1,2-diphospholyl)zirconium dimethyl,
bis(3,4,5-trimethyl-1,2-diphospholyl)zirconium dibenzyl,
(1,3-diphospholyl)zirconium trichloride,
(1,3-diphospholyl)zirconium trimethyl,
(1,3-diphospholyl)zirconium tribenzyl,
cyclopentadienyl(1,3-diphospholyl)zirconium dichloride,
hydrotrispyrazolylborato(1,3-diphospholyl)zirconium dichloride,
tris(diphenyloxophosphoranyl)methanido-(1,3-diphospholyl)zirconium dichloride,
bis(1,3-diphospholyl)zirconium dichloride,
bis(1,3-diphospholyl)zirconium dimethyl,
bis(1,3-diphospholyl)zirconium dibenzyl,
1,2,3-triphospholylzirconium trichloride,
1,2,3-triphospholylzirconium trimethyl,
1,2,3-triphospholylzirconium tribenzyl,
cyclopentadienyl(1,2,3-triphospholyl)zirconium dichloride,
hydrotrispyrazolylborato(1,2,3-triphospholyl)zirconium dichloride,
tris(diphenyloxophosphoranyl)methanido(1,2,3-triphospholyl)zirconium dichloride,
bis(1,2,3-triphospholyl)zirconium dichloride,
bis(1,2,3-triphospholyl)zirconium dimethyl,
bis(1,2,3-triphospholyl)zirconium dibenzyl,
pentaphospholylzirconium trichloride,
pentaphospholylzirconium trimethyl,
pentaphospholylzirconium tribenzyl,
cyclopentadienyl pentaphospholylzirconium dichloride,
hydrotrispyrazolylboratopentaphospholylzirconium dichloride,
tris(diphenyloxophosphoranyl) methanidopentaphospholylzirconium dichloride,
bis(pentaphospholyl)zirconium dichloride,
bis(pentaphospholyl)zirconium dimethyl,
bis(pentaphospholyl)zirconium dibenzyl,
(1,2-diarsolyl)zirconium trichloride,
(1,2-diarsolyl)zirconium trimethyl,
(1,2-diarsolyl)zirconium tribenzyl,
cyclopentadienyl(1,2-diarsolyl)zirconium dichloride,
hydrotrispyrazolylborato(1,2-diarsolyl)zirconium dichloride,
tris(diphenyloxophosphoranyl)methanido(1,2-diarsolyl) zirconium dichloride,
bis(1,2-diarsolyl)zirconium dichloride,
bis(1,2-diarsolyl)zirconium dimethyl,
bis(1,2-diarsolyl)zirconium dibenzyl,
3,4,5-trimethyl-1,2-diarsolylzirconium trichloride,
3,4,5-trimethyl-1,2-diarsolylzirconium trimethyl,
3,4,5-trimethyl-1,2-diarsolylzirconium tribenzyl,
cyclopentadienyl(3,4,5-trimethyl-1,2-diarsolyl)zirconium dichloride,
hydrotrispyrazolylborato(3,4,5-trimethyl-1,2-diarsolyl) zirconium dichloride,
tris(diphenyloxophosphoranyl)methanido-(3,4,5-trimethyl-1,2-diarsolyl)zirconium dichloride,
bis(3,4,5-trimethyl-1,2-diarsolyl)zirconium dichloride,
bis(3,4,5-trimethyl-1,2-diarsolyl)zirconium dimethyl,
bis(3,4,5-trimethyl-1,2-diarsolyl)zirconium dibenzyl,
(1,3-diarsolyl)zirconium trichloride,
(1,3-diarsolyl)zirconium trimethyl,
(1,3-diarsolyl)zirconium tribenzyl,
cyclopentadienyl(1,3-diarsolyl)zirconium dichloride,
hydrotrispyrazolylborato(1,3-diarsolyl)zirconium dichloride,
tris(diphenyloxophosphoranyl)methanido(1,3-diarsolyl) zirconium dichloride,
bis(1,3-diarsolyl)zirconium dichloride,
bis(1,3-diarsolyl)zirconium dimethyl, bis(1,3-diarsolyl)zirconium dibenzyl,
1,2,3-triarsolylzirconium trichloride,
1,2,3-triarsolylzirconium trimethyl,
1,2,3-triarsolylzirconium tribenzyl,
cyclopentadienyl(1,2,3-triarsolyl)zirconium dichloride,
hydrotrispyrazolylborato(1,2,3-triarsolyl)zirconium dichloride,
tris(diphenyloxophosphoranyl)methanido(1,2,3-triarsolyl)zirconium dichloride,
bis(1,2,3-triarsolyl)zirconium dichloride,
bis(1,2,3-triarsolyl)zirconium dimethyl,
bis(1,2,3-triarsolyl)zirconium dibenzyl,
tetraarsolylzirconium trichloride,
tetraarsolylzirconium trimethyl,
tetraarsolylzirconium tribenzyl,
cyclopentadienyltetraarsolylzirconium dichloride,
hydrotrispyrazolylboratotetraarsolylzirconium dichloride,
tris(diphenyloxophosphoranyl)methanidotetraarsolylzirconium dichloride,
bis(tetraarsolyl)zirconium dichloride,
bis(tetraarsolyl)zirconium dimethyl,
bis(tetraarsolyl)zirconium dibenzyl,
(1,2-distibolyl)zirconium trichloride,
(1,2-distibolyl)zirconium trimethyl,
(1,2-distibolyl)zirconium tribenzyl,
cyclopentadienyl(1,2-distibolyl)zirconium dichloride,
hydrotrispyrazolylborato(1,2-distibolyl)zirconium dichloride,
tris(diphenyloxophosphoranyl)methanido (1,2-distibolyl)zirconium dichloride,
bis(1,2-distibolyl)zirconium dichloride,
bis(1,2-distibolyl)zirconium dimethyl,
bis(1,2-distibolyl)zirconium dibenzyl,
3,4,5-trimethyl-1,2-distibolylzirconium trichloride,
3,4,5-trimethyl-1,2-distibolylzirconium trimethyl,
3,4,5-trimethyl-1,2-distibolylzirconium tribenzyl,
cyclopentadienyl(3,4,5-trimethyl-1,2-distibolyl) zirconium dichloride,
hydrotrispyrazolylborato(3,4,5-trimethyl-1,2-distibolyl)zirconium dichloride,
tris(diphenyloxophosphoranyl)methanido-(3,4,5-trimethyl-1,2-distibolyl)zirconium dichloride,
bis(3,4,5-trimethyl-1,2-distibolyl)zirconium dichloride,
bis(3,4,5-trimethyl-1,2-distibolyl)zirconium dimethyl,
bis(3,4,5-trimethyl-1,2-distibolyl)zirconium dibenzyl,
(1,3-distibolyl)zirconium trichloride,
(1,3-distibolyl)zirconium trimethyl,
(1,3-distibolyl)zirconium tribenzyl,
cyclopentadienyl(1,3-distibolyl)zirconium dichloride,
hydrotrispyrazolylborato(1,3-distibolyl)zirconium dichloride,
tris(diphenyloxophosphoranyl)methanido(1,3-distibolyl)zirconium dichloride,
bis(1,3-distibolyl)zirconium dichloride,
bis(1,3-distibolyl)zirconium dimethyl,
bis(1,3-distibolyl)zirconium dibenzyl,
1,2,3-tristibolylzirconium trichloride,
1,2,3-tristibolylzirconium trimethyl,
1,2,3-tristibolylzirconium tribenzyl,
cyclopentadienyl(1,2,3-tristibolyl)zirconium dichloride,
hydrotrispyrazolylborato(1,2,3-tristibolyl)zirconium dichloride,
tris(diphenyloxophosphoranyl)methanido(1,2,3-tristibolyl)zirconium dichloride,
bis(1,2,3-tristibolyl)zirconium dichloride,
bis(1,2,3-tristibolyl)zirconium dimethyl,
bis(1,2,3-tristibolyl)zirconium dibenzyl,
tetrastibolylzirconium trichloride,
tetrastibolylzirconium trimethyl,
tetrastibolylzirconium tribenzyl,
cyclopentadienyltetrastibolylzirconium dichloride,
hydrotrispyrazolylboratotetrastibolylzirconium dichloride,
tris(diphenyloxophosphoranyl)methanidotetrastibolylzirconium dichloride,
bis(tetrastibolyl)zirconium dichloride,
bis(tetrastibolyl)zirconium dimethyl,
bis(tetrastibolyl)zirconium dibenzyl,
(1,2-dibismolyl)zirconium trichloride,
(1,2-dibismolyl)zirconium trimethyl,
(1,2-dibismolyl)zirconium tribenzyl,
cyclopentadienyl(1,2-dibismolyl)zirconium dichloride,
hydrotrispyrazolylborato(1,2-dibismolyl)zirconium dichloride,
tris(diphenyloxophosphoranyl)methanido(1,2-dibismolyl)zirconium dichloride,
bis(1,2-dibismolyl)zirconium dichloride,
bis(1,2-dibismolyl)zirconium dimethyl,
bis(1,2-dibismolyl)zirconium dibenzyl,
3,4,5-trimethyl-1,2-dibismolylzirconium trichloride,
3,4,5-trimethyl-1,2-dibismolylzirconium trimethyl,
3,4,5-trimethyl-1,2-dibismolylzirconium tribenzyl,
cyclopentadienyl(3,4,5-trimethyl-1,2-dibismolyl)zirconium dichloride,
hydrotrispyrazolylborato(3,4,5-trimethyl-1,2-dibismolyl)zirconium dichloride,
tris(diphenyloxophosphoranyl)methanido-(3,4,5-trimethyl-1,2-dibismolyl)zirconium dichloride,
bis(3,4,5-trimethyl-1,2-dibismolyl)zirconium dichloride,
bis(3,4,5-trimethyl-1,2-dibismolyl)zirconium dimethyl,
bis(3,4,5-trimethyl-1,2-dibismolyl)zirconium dibenzyl,
(1,3-dibismolyl)zirconium trichloride,
(1,3-dibismolyl)zirconium trimethyl,
(1,3-dibismolyl)zirconium tribenzyl,
cyclopentadienyl(1,3-dibismolyl)zirconium dichloride,
hydrotrispyrazolylborato(1,3-dibismolyl)zirconium dichloride,
tris(diphenyloxophosphoranyl)methanido(1,3-dibismolyl)zirconium dichloride,
bis(1,3-dibismolyl)zirconium dichloride,
bis(1,3-dibismolyl)zirconium dimethyl,
bis(1,3-dibismolyl)zirconium dibenzyl,
1,2,3-tribismolylzirconium trichloride,
1,2,3-tribismolylzirconium trimethyl,
1,2,3-tribismolylzirconium tribenzyl,
cyclopentadienyl(1,2,3-tribismolyl)zirconium dichlorode,
hydrotrispyrazolylborato(1,2,3-tribismolyl)zirconium dichloride,
tris(diphenyloxophosphoranyl)methanido(1,2,3-tribismolyl)zirconium dichloride,
bis(1,2,3-tribismolyl)zirconium dichloride,
bis(1,2,3-tribismolyl)zirconium dimethyl,
bis(1,2,3-tribismolyl)zirconium dibenzyl,
tetrabismolylzirconium trichloride,
tetrabismolylzirconium trimethyl,
tetrabismolylzirconium tribenzyl,
cyclopentadienyltetrabismolylzirconium dichloride,
hydrotrispyrazolylboratotetrabismolylzirconium dichloride,
tris(diphenyloxophosphoranyl)methanidotetrabismolylzirconium dichloride,
bis(tetrabismolyl)zirconium dichloride,
bis(tetrabismolyl)zirconium dimethyl,
bis(tetrabismolyl)zirconium dibenzyl,
bis(phosphazolyl)zirconium dichloride,
bis(phosphadiazolyl)zirconium dichloride, bis(diphosphadiazolyl)zirconium dichloride,
bis(phosphatriazolyl)zirconium dichloride,
bis(diphosphazolyl)zirconium dichloride,
bis(triphosphazolyl)zirconium dichloride,
bis(arsazolyl)zirconium dichloride,
bis(stibaazolyl)zirconium dichloride,
bis(bismaazolyl)zirconium dichloride,
bis(arsaphospholyl)zirconium dichloride,
bis(stibaphospholyl)zirconium dichloride,
bis(bismaphospholyl)zirconium dichloride,
bis(stibaarsolyl)zirconium dichloride,
bis(bismaarsolyl)zirconium dichloride,
bis(bismastibolyl)zirconium dichloride
pyrrolylzirconium trichloride,
pyrrolylzirconium trimethyl,
pyrrolylzirconium tribenzyl,
2-methylpyrrolylzirconium trichloride,
2-methylpyrrolylzirconium trimethyl,
2-methylpyrrolylzirconium tribenzyl,
3,4-dimethylpyrrolylzirconium trichloride,
3,4-dimethylpyrrolylzirconium trimethyl,
3,4-dimethylpyrrolylzirconium tribenzyl,
2,3,4,5-tetramethylpyrrolylzirconium trichloride,
2,3,4,5-tetramethylpyrrolylzirconium trimethyl,
2,3,4,5-tetramethylpyrrolylzirconium tribenzyl,
indolylzirconium trichloride,
indolylzirconium trimethyl,
indolylzirconium tribenzyl,
carbazolylzirconium trichloride,
carbazolylzirconium trimethyl,
carbazolylzirconium tribenzyl,
phospholylzirconium trichloride,
phospholylzirconium trimethyl,
phospholylzirconium tribenzyl,
2-methylphospholylzirconium trichloride,
2-methylphospholylzirconium trimethyl,
2-methylphospholylzirconium tribenzyl,
3,4-dimethylphospholylzirconium trichloride,
3,4-dimethylphospholylzirconium trimethyl,
3,4-dimethylphospholylzirconium tribenzyl,
2,3,4,5-tetramethylphospholylzirconium trichloride,
2,3,4,5-tetramethylphospholylzirconium trimethyl,
2,3,4,5-tetramethylphospholylzirconium tribenzyl,
benzo[b]phospholylzirconium trichloride,
benzo[b]phospholylzirconium trimethyl,
benzo[b]phospholylzirconium tribenzyl,
dibenzo[b,d]phospholylzirconium trichloride,
dibenzo[b,d]phospholylzirconium trimethyl,
dibenzo[b,d]phospholylzirconium tribenzyl,
arsolylzirconium trichloride,
arsolylzirconium trimethyl,
arsolylzirconium tribenzyl,
2-methylarsolylzirconium trichloride,
2-methylarsolylzirconium trimethyl,
2-methylarsolylzirconium tribenzyl,
3,4-dimethylarsolylzirconium trichloride,
3,4-dimethylarsolylzirconium trimethyl,
3,4-dimethylarsolylzirconium tribenzyl,
2,3,4,5-tetramethylarsolylzirconium trichloride,
2,3,4,5-tetramethylarsolylzirconium trimethyl,
2,3,4,5-tetramethylarsolylzirconium tribenzyl,
benzo[b]arsolylzirconium trichloride,
benzo[b]arsolylzirconium trimethyl,
benzo[b]arsolylzirconium tribenzyl,
dibenzo[b,d]arsolylzirconium trichloride,
dibenzo[b,d]arsolylzirconium trimethyl,
dibenzo[b,d]arsolylzirconium tribenzyl,
stibolylzirconium trichloride,
stibolylzirconium trimethyl,
stibolylzirconium tribenzyl,
2-methylstibolylzirconium trichloride,
2-methylstibolylzirconium trimethyl,
2-methylstibolylzirconium tribenzyl,
3,4-dimethylstibolylzirconium trichloride,
3,4-dimethylstibolylzirconium trimethyl,
3,4-dimethylstibolylzirconium tribenzyl,
2,3,4,5-tetramethylstibolylzirconium trichloride,
2,3,4,5-tetramethylstibolylzirconium trimethyl,
2,3,4,5-tetramethylstibolylzirconium tribenzyl,
benzo[b]stibolylzirconium trichloride,
benzo[b]stibolylzirconium trimethyl,
benzo[b]stibolylzirconium tribenzyl,
dibenzo[b,d]stibolylzirconium trichloride,
dibenzo[b,d]stibolylzirconium trimethyl,
dibenzo[b,d]stibolylzirconium tribenzyl,
bismolylzirconium trichloride,
bismolylzirconium trimethyl,
bismolylzirconium tribenzyl,
2-methylbismolylzirconium trichloride,
2-methylbismolylzirconium trimethyl,
2-methylbismolylzirconium tribenzyl,
3,4-dimethylbismolylzirconium trichloride,
3,4-dimethylbismolylzirconium trimethyl,
3,4-dimethylbismolylzirconium tribenzyl,
2,3,4,5-tetramethylbismolylzirconium trichloride,
2,3,4,5-tetramethylbismolylzirconium trimethyl,
2,3,4,5-tetramethylbismolylzirconium tribenzyl,
benzo[b]bismolylzirconium trichloride,
benzo[b]bismolylzirconium trimethyl,
benzo[b]bismolylzirconium tribenzyl,
dibenzo[b,d]bismolylzirconium trichloride,
dibenzo[b,d]bismolylzirconium trimethyl,
dibenzo[b,d]bismolylzirconium tribenzyl,
hydrotrispyrazolylboratopyrrolylzirconium dichloride,
hydrotrispyrazolylborato(2-methylpyrrolyl)zirconium dichloride,
hydrotrispyrazolylborato(3,4-dimethylpyrrolyl)zirconium dichloride,
hydrotrispyrazolylborato(2,3,4,5-tetramethylpyrrolyl) zirconium dichloride,
hydrotrispyrazolylboratoindolylzirconium dichloride,
hydrotrispyrazolylboratocarbazolylzirconium dichloride,
hydrotrispyrazolylboratophospholylzirconium dichloride,
hydrotrispyrazolylborato(2-methylphospholyl)zirconium dichloride,
hydrotrispyrazolylborato(3,4-dimethylphospholyl) zirconium dichloride,
hydrotrispyrazolylborato(2,3,4,5-tetramethylphospholyl) zirconium dichloride,
hydrotrispyrazolylboratobenzo[b]phospholylzirconium dichloride,
hydrotrispyrazolylboratodibenzo[b,d]phospholylzirconium dichloride,
hydrotrispyrazolylboratoarsolylzirconium dichloride,
hydrotrispyrazolylborato(2-methylarsolyl)zirconium dichloride,
hydrotrispyrazolylborato(3,4-dimethylarsolyl)zirconium dichloride,
hydrotrispyrazolylborato( 2,3,4,5-tetramethylarsolyl) zirconium dichloride,
hydrotrispyrazolylboratobenzo[b]arsolylzirconium dichloride,
hydrotrispyrazolylboratodibenzo[b,d]arsolylzirconium dichloride, hydrotrispyrazolylboratostibolylzirconium dichloride,
hydrotrispyrazolylborato(2-methylstibolyl)zirconium dichloride,
hydrotrispyrazolylborato(3,4-dimethylstibolyl)zirconium dichloride,
hydrotrispyrazolylborato(2,3,4,5-tetramethylstibolyl)zirconium dichloride,
hydrotrispyrazolylboratobenzo[b]stibolylzirconium dichloride,
hydrotrispyrazolylboratodibenzo[b,d]stibolylzirconium dichloride,
hydrotrispyrazolylboratobismolylzirconium dichloride,
hydrotrispyrazolylborato(2-methylbismolyl)zirconium dichloride,
hydrotrispyrazolylborato(3,4-dimethylbismolyl)zirconium dichloride,
hydrotrispyrazolylborato(2,3,4,5-tetramethylbismolyl)zirconium dichloride,
hydrotrispyrazolylboratobenzo[b]bismolylzirconium dichloride,
hydrotrispyrazolylboratodibenzo[b,d]bismolylzirconium dichloride,
tris(diphenyloxophosphoranyl)methanidopyrrolylzirconium dichloride,
tris(diphenyloxophosphoranyl)methanido(2-methylpyrrolyl)zirconium dichloride,
tris(diphenyloxophosphoranyl)methanido(3,4-dimethylpyrrolyl)zirconium dichloride,
tris(diphenyloxophosphoranyl)methanido(2,3,4,5-tetrametylpyrrolyl)zirconium dichloride,
tris(diphenyloxophosphoranyl)methanidoindolylzirconium dichloride,
tris(diphenyloxophosphoranyl)methanidocarbazolylzirconium dichloride,
tris(diphenyloxophosphoranyl)methanidophospholylzirconium dichloride,
tris(diphenyloxophosphoranyl)methanido(2-methylphospholyl)zirconium dichloride,
tris(diphenyloxophosphoranyl)methanido(3,4-dimethylphospholyl)zirconium dichloride,
tris(diphenyloxophosphoranyl)methanido(2,3,4,5-tetramethylphospholyl)zirconium dichloride,
tris(diphenyloxophosphoranyl)methanidobenzo[b]phospholylzirconium dichloride,
tris(diphenyloxophosphoranyl)methanidodibenzo[b,d]phospholylzirconium dichloride,
tris(diphenyloxophosphoranyl)methanidoarsolylzirconium dichloride,
tris(diphenyloxophosphoranyl)methanido(2-methylarsolyl)zirconium dichloride,
tris(diphenyloxophosphoranyl)methanido(3,4-dimethylarsolyl)zirconium dichloride,
tris(diphenyloxophosphoranyl)methanido(2,3,4,5-tetramethylarsolyl)zirconium dichloride,
tris(diphenyloxophosphoranyl)methanidobenzo[b]arsolylzirconium dichloride,
tris(diphenyloxophosphoranyl)methanidodibenzo[b,d]arsolylzirconium dichloride,
tris(diphenyloxophosphoranyl)methanidostibolylzirconium dichloride,
tris(diphenyloxophosphoranyl)methanido(2-methylstibolyl)zirconium dichloride,
tris(diphenyloxophosphoranyl)methanido(3,4-dimethylstibolyl)zirconium dichloride,
tris(diphenyloxophosphoranyl)methanido(2,3,4,5-tetramethylstibolyl)zirconium dichloride,
tris(diphenyloxophosphoranyl)methanidobenzo[b]stibolylzirconium dichloride,
tris(diphenyloxophosphoranyl)methanidodibenzo[b,d]stibolylzirconium dichloride,
tris(diphenyloxophosphoranyl)methanidobismolylzirconium dichloride,
tris(diphenyloxophosphoranyl)methanido(2-methylbismolyl)zirconium dichloride,
tris(diphenyloxophosphoranyl)methanido(3,4-dimethylbismolyl)zirconium dichloride,
tris(diphenyloxophosphoranyl)methanido(2,3,4,5-tetramethylbismolyl)zirconium dichloride,
tris(diphenyloxophosphoranyl)methanidobenzo[b]bismolylzirconium dichloride, and
tris(diphenyloxophosphoranyl)methanidodibenzo[b,d]bismolylzirconium dichloride.

Class 3 (compounds having a combination of ligand $L^1$ and ligand $L^2$, wherein $L^1$ is a trispyrazolyl tridentate ligand represented by formula VI and ligand $L^2$ is an alkapolyenyl ligand having a σ-bond and two or more π-bonds):
hydrotrispyrazolylboratocyclopentadienylzirconium dichloride,
hydrotrispyrazolylboratocyclopentadienylzirconium dimethyl,
hydrotrispyrazolylboratocyclopentadienylzirconium dibenzyl,
hydrotrispyrazolylboratocyclopentadienylzirconium dimethoxide,
hydrotrispyrazolylboratobutylcyclopentadienylzirconium dichloride,
hydrotrispyrazolylboratobutylcyclopentadienylzirconium dimethyl,
hydrotrispyrazolylboratobutylcyclopentadienylzirconium dibenzyl,
hydrotrispyrazolylboratobutylcyclopentadienylzirconium dimethoxide,
hydrotrispyrazolylboratopentamethylcyclopentadienylzirconium dichloride,
hydrotrispyrazolylboratopentamethylcyclopentadienylzirconium dimethyl,
hydrotrispyrazolylboratopentamethylcyclopentadienylzirconium dibenzyl,
hydrotrispyrazolylboratopentamethylcyclopentadienylzirconium dimethoxide,
hydrotrispyrazolylboratoindenylzirconium dicholoride,
hydrotrispyrazolylboratoindenylzirconium dimethyl,
hydrotrispyrazolylboratoindenylzirconium dibenzyl,
hydrotrispyrazolylboratoindenylzirconium dimethoxide,
hydrotrispyrazolylboratotetrahydroindenylzirconium dicholoride,
hydrotrispyrazolylboratotetrahydroindenylzirconium dimethyl,
hydrotrispyrazolylboratotetrahydroindenylzirconium dibenzyl,
hydrotrispyrazolylboratotetrahydroindenylzirconium dimethoxide,
hydrotrispyrazolylboratofluorenylzirconium dichloride,
hydrotrispyrazolylboratofluorenylzirconium dimethyl,
hydrotrispyrazolylboratofluorenylzirconium dibenzyl,
hydrotrispyrazolylboratofluorenylzirconium dimethoxide,
isopropyltrispyrazolylboratocyclopentadienylzirconium dichloride,
isopropyltrispyrazolylboratocyclopentadienylzirconium dimethyl,
isopropyltrispyrazolylboratocyclopentadienylzirconium dibenzyl,
isopropyltrispyrazolylboratocyclopentadienylzirconium dimethoxide,
isopropyltrispyrazolylboratobutylcyclopentadienylzirconium dichloride, isopropyltrispyrazolylborato-butylcyclopentadienylzirconium dimethyl,
isopropyltrispyrazolylborato-butylcyclopentadienylzirconium dibenzyl,
isopropyltrispyrazolylborato-butylcyclopentadienylzirconium dimethoxide,
isopropyltrispyrazolylboratopentamethylcyclopentadienylzirconium dichloride,
isopropyltrispyrazolylboratopentamethylcyclopentadienylzirconium dimethyl,
isopropyltrispyrazolylboratopentamethylcyclopentadienylzirconium dibenzyl,
isopropyltrispyrazolylboratopentamethylcyclopentadienylzirconium dimethoxide,
isopropyltrispyrazolylboratoindenylzirconium dicholoride,
isopropyltrispyrazolylboratoindenylzirconium dimethyl,
isopropyltrispyrazolylboratoindenylzirconium dibenzyl,
isopropyltrispyrazolylboratoindenylzirconium dimethoxide,
isopropyltrispyrazolylboratotetraisopropylindenylzirconium dicholoride,
isopropyltrispyrazolylboratotetraisopropylindenylzirconium dimethyl,
isopropyltrispyrazolylboratotetraisopropylindenylzirconium dibenzyl,
isopropyltrispyrazolylboratotetraisopropylindenylzirconium dimethoxide,
isopropyltrispyrazolylboratofluorenylzirconium dichloride,
isopropyltrispyrazolylboratofluorenylzirconium dimethyl,
isopropyltrispyrazolylboratofluorenylzirconium dibenzyl,
isopropyltrispyrazolylboratofluorenylzirconium dimethoxide,
n-butyltrispyrazolylboratocyclopentadienylzirconium dichloride,
n-butyltrispyrazolylboratocyclopentadienylzirconium dimethyl,
n-butyltrispyrazolylboratocyclopentadienylzirconium dibenzyl,
n-butyltrispyrazolylboratocyclopentadienylzirconium dimethoxide,
n-butyltrispyrazolylboratobutylcyclopentadienylzirconium dichloride,
n-butyltrispyrazolylboratobutylcyclopentadienylzirconium dimethyl,
n-butyltrispyrazolylboratobutylcyclopentadienylzirconium dibenzyl,
n-butyltrispyrazolylboratobutylcyclopentadienylzirconium dimethoxide,
n-butyltrispyrazolylboratopentamethylcyclopentadienyl-zirconium dichloride,
n-butyltrispyrazolylboratopentamethylcyclopentadienyl-zirconium dimethyl,
n-butyltrispyrazolylboratopentamethylcyclopentadienyl-zirconium dibenzyl,
n-butyltrispyrazolylboratopentamethylcyclopentadienyl-zirconium dimethoxide,
n-butyltrispyrazolylboratoindenylzirconium dicholoride,
n-butyltrispyrazolylboratoindenylzirconium dimethyl,
n-butyltrispyrazolylboratoindenylzirconium dibenzyl,
n-butyltrispyrazolylboratoindenylzirconium dimethoxide,
n-butyltrispyrazolylboratotetra(n-butyl)indenylzirconium dicholoride,
n-butyltrispyrazolylboratotetra(n-butyl)indenylzirconium dimethyl,
n-butyltrispyrazolylboratotetra(n-butyl)indenylzirconium dibenzyl,
n-butyltrispyrazolylboratotetra(n-butyl)indenylzirconium dimethoxide,
n-butyltrispyrazolylboratofluorenylzirconium dichloride,
n-butyltrispyrazolylboratofluorenylzirconium dimethyl,
n-butyltrispyrazolylboratofluorenylzirconium dibenzyl,
n-butyltrispyrazolylboratofluorenylzirconium dimethoxide,
tetrakispyrazolylboratocyclopentadienylzirconium dichloride,
tetrakispyrazolylboratocyclopentadienylzirconium dimethyl,
tetrakispyrazolylboratocyclopentadienylzirconium dibenzyl,
tetrakispyrazolylboratocyclopentadienylzirconium dimethoxide,
tetrakispyrazolylboratobutylcyclopentadienylzirconium dichloride,
tetrakispyrazolylboratobutylcyclopentadienylzirconium dimethyl,
tetrakispyrazolylboratobutylcyclopentadienylzirconium dibenzyl,
tetrakispyrazolylboratobutylcyclopentadienylzirconium dimethoxide,
tetrakispyrazolylboratopentamethylcyclopentadienylzirconium dichloride,
tetrakispyrazolylboratopentamethylcyclopentadienylzirconium dimethyl,
tetrakispyrazolylboratopentamethylcyclopentadienylzirconium dibenzyl,
tetrakispyrazolylboratopentamethylcyclopentadienylzirconium dimethoxide,
tetrakispyrazolylboratoindenylzirconium dicholoride,
tetrakispyrazolylboratoindenylzirconium dimethyl,
tetrakispyrazolylboratoindenylzirconium dibenzyl,
tetrakispyrazolylboratoindenylzirconium dimethoxide,
tetrakispyrazolylboratotetrahydroindenylzirconium dicholoride,
tetrakispyrazolylboratotetrahydroindenylzirconium dimethyl,
tetrakispyrazolylboratotetrahydroindenylzirconium dibenzyl,
tetrakispyrazolylboratotetrahydroindenylzirconium dimethoxide,
tetrakispyrazolylboratofluorenylzirconium dichloride,
tetrakispyrazolylboratofluorenylzirconium dimethyl,
tetrakispyrazolylboratofluorenylzirconium dibenzyl,
tetrakispyrazolylboratofluorenylzirconium dimethoxide,
hydrotris(3-methylpyrazolyl)boratocyclopentadienylzirconium dichloride,
hydrotris(3-methylpyrazolyl)boratocyclopentadienylzirconium dimethyl,
hydrotris(3-methylpyrazolyl)boratocyclopentadienylzirconium dibenzyl,
hydrotris(3-methylpyrazolyl)boratocyclopentadienylzirconium dimethoxide,
hydrotris(3-methylpyrazolyl)boratobutylcyclopentadienylzirconium dichloride,
hydrotris(3-methylpyrazolyl)boratobutylcyclopentadienylzirconium dimethyl,
hydrotris(3-methylpyrazolyl)boratobutylcyclopentadienylzirconium dibenzyl,
hydrotris(3-methylpyrazolyl)boratobutylcyclopentadienylzirconium dimethoxide,
hydrotris(3-methylpyrazolyl)boratopentamethylcyclopentadienylzirconium dichloride,
hydrotris(3-methylpyrazolyl)boratopentamethylcyclopentadienylzirconium dimethyl,
hydrotris(3-methylpyrazolyl)boratopentamethylcyclopentadienylzirconium dibenzyl,
hydrotris(3-methylpyrazolyl)boratopentamethylcyclopentadienylzirconium dimethoxide, hydrotris(3-methylpyrazolyl)boratoindenylzirconium dicholoride,
hydrotris(3-methylpyrazolyl)boratoindenylzirconium dimethyl,
hydrotris(3-methylpyrazolyl)boratoindenylzirconium dibenzyl,
hydrotris(3-methylpyrazolyl)boratoindenylzirconium dimethoxide,
hydrotris(3-methylpyrazolyl)boratotetrahydroindenylzirconium dicholoride,
hydrotris(3-methylpyrazolyl)boratotetrahydroindenylzirconium dimethyl,
hydrotris(3-methylpyrazolyl)boratotetrahydroindenylzirconium dibenzyl,
hydrotris(3-methylpyrazolyl)boratotetrahydroindenylzirconium dimethoxide,
hydrotris(3-methylpyrazolyl)boratofluorenylzirconium dichloride,
hydrotris(3-methylpyrazolyl)boratofluorenylzirconium dimethyl,
hydrotris(3-methylpyrazolyl)boratofluorenylzirconium dibenzyl,
hydrotris(3-methylpyrazolyl)boratofluorenylzirconium dimethoxide,
isopropyltris(3-methylpyrazolyl)boratocyclopentadienylzirconium dichloride,
isopropyltris(3-methylpyrazolyl)boratocyclopentadienylzirconium dimethyl,
isopropyltris(3-methylpyrazolyl)boratocyclopentadienylzirconium dibenzyl,
isopropyltris(3-methylpyrazolyl)boratocyclopentadienylzirconium dimethoxide,
isopropyltris(3-methylpyrazolyl)boratobutylcyclopentadienylzirconium dichloride,
isopropyltris(3-methylpyrazolyl)boratobutylcyclopentadienylzirconium dimethyl,
isopropyltris(3-methylpyrazolyl)boratobutylcyclopentadienylzirconium dibenzyl,
isopropyltris(3-methylpyrazolyl)boratobutylcyclopentadienylzirconium dimethoxide,
isopropyltris(3-methylpyrazolyl)boratopentamethylcyclopentadienylzirconium dichloride,
isopropyltris(3-methylpyrazolyl)boratopentamethylcyclopentadienylzirconium dimethyl,
isopropyltris(3-methylpyrazolyl)boratopentamethylcyclopentadienylzirconium dibenzyl,
isopropyltris(3-methylpyrazolyl)boratopentamethylcyclopentadienylzirconium dimethoxide,
isopropyltris(3-methylpyrazolyl)boratoindenylzirconium dicholoride,
isopropyltris(3-methylpyrazolyl)boratoindenylzirconium dimethyl,
isopropyltris(3-methylpyrazolyl)boratoindenylzirconium dibenzyl,
isopropyltris(3-methylpyrazolyl)boratoindenylzirconium dimethoxide,
isopropyltris(3-methylpyrazolyl)boratotetraisopropylindenylzirconium dicholoride,
isopropyltris(3-methylpyrazolyl)boratotetraisopropylindenylzirconium dimethyl,
isopropyltris(3-methylpyrazolyl)boratotetraisopropylindenylzirconium dibenzyl,
isopropyltris(3-methylpyrazolyl)boratotetraisopropylindenylzirconium dimethoxide,
isopropyltris(3-methylpyrazolyl)boratofluorenylzirconium dichloride,
isopropyltris(3-methylpyrazolyl)boratofluorenylzirconium dimethyl,
isopropyltris(3-methylpyrazolyl)boratofluorenylzirconium dibenzyl,
isopropyltris(3-methylpyrazolyl)boratofluorenylzirconium dimethoxide,
n-butyltris(3-methylpyrazolyl)boratocyclopentadienylzirconium dichloride,
n-butyltris(3-methylpyrazolyl)boratocyclopentadienylzirconium dimethyl,
n-butyltris(3-methylpyrazolyl)boratocyclopentadienylzirconium dibenzyl,
n-butyltris(3-methylpyrazolyl)boratocyclopentadienylzirconium dimethoxide,
n-butyltris(3-methylpyrazolyl)boratobutylcyclopentadienylzirconium dichloride,
n-butyltris(3-methylpyrazolyl)boratobutylcyclopentadienylzirconium dimethyl,
n-butyltris(3-methylpyrazolyl)boratobutylcyclopentadienylzirconium dibenzyl,
n-butyltris(3-methylpyrazolyl)boratobutylcyclopentadienylzirconium dimethoxide,
n-butyltris(3-methylpyrazolyl)boratopentamethylcyclopentadienylzirconium dichloride,
n-butyltris(3-methylpyrazolyl)boratopentamethylcyclopentadienylzirconium dimethyl,
n-butyltris(3-methylpyrazolyl)boratopentamethylcyclopentadienylzirconium dibenzyl,
n-butyltris(3-methylpyrazolyl)boratopentamethylcyclopentadienylzirconium dimethoxide,
n-butyltris(3-methylpyrazolyl)boratoindenylzirconium dicholoride,
n-butyltris(3-methylpyrazolyl)boratoindenylzirconium dimethyl,
n-butyltris(3-methylpyrazolyl)boratoindenylzirconium dibenzyl,
n-butyltris(3-methylpyrazolyl)boratoindenylzirconium dimethoxide,
n-butyltris(3-methylpyrazolyl)boratotetra(n-butyl)indenylzirconium dicholoride,
n-butyltris(3-methylpyrazolyl)boratotetra(n-butyl)indenylzirconium dimethyl,
n-butyltris(3-methylpyrazolyl)boratotetra(n-butyl)indenylzirconium dibenzyl,
n-butyltris(3-methylpyrazolyl)boratotetra(n-butyl)indenylzirconium dimethoxide,
n-butyltris(3-methylpyrazolyl)boratofluorenylzirconium dichloride,
n-butyltris(3-methylpyrazolyl)boratofluorenylzirconium dimethyl,
n-butyltris(3-methylpyrazolyl)boratofluorenylzirconium dibenzyl,
n-butyltris(3-methylpyrazolyl)boratofluorenylzirconium dimethoxide,
tetrakis(3-methylpyrazolyl)boratocyclopentadienylzirconium dichloride,
tetrakis(3-methylpyrazolyl)boratocyclopentadienylzirconium dimethyl,
tetrakis(3-methylpyrazolyl)boratocyclopentadienylzirconium dibenzyl,
tetrakis(3-methylpyrazolyl)boratocyclopentadienylzirconium dimethoxide,
tetrakis(3-methylpyrazolyl)boratobutylcyclopentadienylzirconium dichloride,
tetrakis(3-methylpyrazolyl)boratobutylcyclopentadienylzirconium dimethyl, tetrakis(3-methylpyrazolyl)boratobutylcyclopentadienylzirconium dibenzyl,
tetrakis(3-methylpyrazolyl)boratobutylcyclopentadienylzirconium dimethoxide,
tetrakis(3-methylpyrazolyl)boratopentamethylcyclopentadienylzirconium dichloride,
tetrakis(3-methylpyrazolyl)boratopentamethylcyclopentadienylzirconium dimethyl,
tetrakis(3-methylpyrazolyl)boratopentamethylcyclopentadienylzirconium dibenzyl,
tetrakis(3-methylpyrazolyl)boratopentamethylcyclopentadienylzirconium dimethoxide,
tetrakis(3-methylpyrazolyl)boratoindenylzirconium dicholoride,
tetrakis(3-methylpyrazolyl)boratoindenylzirconium dimethyl,
tetrakis(3-methylpyrazolyl)boratoindenylzirconium dibenzyl,
tetrakis(3-methylpyrazolyl)boratoindenylzirconium dimethoxide,
tetrakis(3-methylpyrazolyl)boratotetrahydroindenylzirconium dicholoride,
tetrakis(3-methylpyrazolyl)boratotetrahydroindenylzirconium dimethyl,
tetrakis(3-methylpyrazolyl)boratotetrahydroindenylzirconium dibenzyl,
tetrakis(3-methylpyrazolyl)boratotetrahydroindenylzirconium dimethoxide,
tetrakis(3-methylpyrazolyl)boratofluorenylzirconium dichloride,
tetrakis(3-methylpyrazolyl)boratofluorenylzirconium dimethyl,
tetrakis(3-methylpyrazolyl)boratofluorenylzirconium dibenzyl,
tetrakis(3-methylpyrazolyl)boratofluorenylzirconium dimethoxide,
hydrotris(3,5-dimethylpyrazolyl)boratocyclopentadienylzirconium dichloride,
hydrotris(3,5-dimethylpyrazolyl)boratocyclopentadienylzirconium dimethyl,
hydrotris(3,5-dimethylpyrazolyl)boratocyclopentadienylzirconium dibenzyl,
hydrotris(3,5-dimethylpyrazolyl)boratocyclopentadienylzirconium dimethoxide,
hydrotris(3,5-dimethylpyrazolyl)boratobutylcyclopentadienylzirconium dichloride,
hydrotris(3,5-dimethylpyrazolyl)boratobutylcyclopentadienylzirconium dimethyl,
hydrotris(3,5-dimethylpyrazolyl)boratobutylcyclopentadienylzirconium dibenzyl,
hydrotris(3,5-dimethylpyrazolyl)boratobutylcyclopentadienylzirconium dimethoxide,
hydrotris(3,5-dimethylpyrazolyl)boratopentamethylcyclopentadienylzirconium dichloride,
hydrotris(3,5-dimethylpyrazolyl)boratopentamethylcyclopentadienylzirconium dimethyl,
hydrotris(3,5-dimethylpyrazolyl)boratopentamethylcyclopentadienylzirconium dibenzyl,
hydrotris(3,5-dimethylpyrazolyl)boratopentamethylcyclopentadienylzirconium dimethoxide,
hydrotris(3,5-dimethylpyrazolyl)boratoindenylzirconium dicholoride,
hydrotris(3,5-dimethylpyrazolyl)boratoindenylzirconium dimethyl,
hydrotris(3,5-dimethylpyrazolyl)boratoindenylzirconium dibenzyl,
hydrotris(3,5-dimethylpyrazolyl)boratoindenylzirconium dimethoxide,
hydrotris(3,5-dimethylpyrazolyl)boratotetrahydroindenylzirconium dicholoride,
hydrotris(3,5-dimethylpyrazolyl)boratotetrahydroindenylzirconium dimethyl,
hydrotris(3,5-dimethylpyrazolyl)boratotetrahydroindenylzirconium dibenzyl,
hydrotris(3,5-dimethylpyrazolyl)boratotetrahydroindenylzirconium dimethoxide,
hydrotris(3,5-dimethylpyrazolyl)boratofluorenylzirconium dichloride,
hydrotris(3,5-dimethylpyrazolyl)boratofluorenylzirconium dimethyl,
hydrotris(3,5-dimethylpyrazolyl)boratofluorenylzirconium dibenzyl,
hydrotris(3,5-dimethylpyrazolyl)boratofluorenylzirconium dimethoxide,
isopropyltris(3,5-dimethylpyrazolyl)boratocyclopentadienylzirconium dichloride,
isopropyltris(3,5-dimethylpyrazolyl)boratocyclopentadienylzirconium dimethyl,
isopropyltris(3,5-dimethylpyrazolyl)boratocyclopentadienylzirconium dibenzyl,
isopropyltris(3,5-dimethylpyrazolyl)boratocyclopentadienylzirconium dimethoxide,
isopropyltris(3,5-dimethylpyrazolyl)boratobutylcyclopentadienylzirconium dichloride,
isopropyltris(3,5-dimethylpyrazolyl)boratobutylcyclopentadienylzirconium dimethyl,
isopropyltris(3,5-dimethylpyrazolyl)boratobutylcyclopentadienylzirconium dibenzyl,
isopropyltris(3,5-dimethylpyrazolyl)boratobutylcyclopentadienylzirconium dimethoxide,
isopropyltris(3,5-dimethylpyrazolyl)boratopentamethylcyclopentadienylzirconium dichloride,
isopropyltris(3,5-dimethylpyrazolyl)boratopentamethylcyclopentadienylzirconium dimethyl,
isopropyltris(3,5-dimethylpyrazolyl)boratopentamethylcyclopentadienylzirconium dibenzyl,
isopropyltris(3,5-dimethylpyrazolyl)boratopentamethylcyclopentadienylzirconium dimethoxide,
isopropyltris(3,5-dimethylpyrazolyl)boratoindenylzirconium dicholoride,
isopropyltris(3,5-dimethylpyrazolyl)boratoindenylzirconium dimethyl,
isopropyltris(3,5-dimethylpyrazolyl)boratoindenylzirconium dibenzyl,
isopropyltris(3,5-dimethylpyrazolyl)boratoindenylzirconium dimethoxide,
isopropyltris(3,5-dimethylpyrazolyl)boratotetraisopropylindenylzirconium dicholoride,
isopropyltris(3,5-dimethylpyrazolyl)boratotetraisopropylindenylzirconium dimethyl,
isopropyltris(3,5-dimethylpyrazolyl)boratotetraisopropylindenylzirconium dibenzyl,
isopropyltris(3,5-dimethylpyrazolyl)boratotetraisopropylindenylzirconium dimethoxide,
isopropyltris(3,5-dimethylpyrazolyl)boratofluorenylzirconium dichloride,
isopropyltris(3,5-dimethylpyrazolyl)boratofluorenylzirconium dimethyl,
isopropyltris(3,5-dimethylpyrazolyl)boratofluorenylzirconium dibenzyl,
isopropyltris(3,5-dimethylpyrazolyl)boratofluorenylzirconium dimethoxide, n-butyltris(3,5-dimethylpyrazolyl)boratocyclopentadienylzirconium dichloride,
n-butyltris(3,5-dimethylpyrazolyl)boratocyclopentadienylzirconium dimethyl,
n-butyltris(3,5-dimethylpyrazolyl)boratocyclopentadienylzirconium dibenzyl,
n-butyltris(3,5-dimethylpyrazolyl)boratocyclopentadienylzirconium dimethoxide,
n-butyltris(3,5-dimethylpyrazolyl)boratobutylcyclopentadienylzirconium dichloride,
n-butyltris(3,5-dimethylpyrazolyl)boratobutylcyclopentadienylzirconium dimethyl,
n-butyltris(3,5-dimethylpyrazolyl)boratobutylcyclopentadienylzirconium dibenzyl,
n-butyltris(3,5-dimethylpyrazolyl)boratobutylcyclopentadienylzirconium dimethoxide,
n-butyltris(3,5-dimethylpyrazolyl)boratopentamethylcyclopentadienylzirconium dichloride,
n-butyltris(3,5-dimethylpyrazolyl)boratopentamethylcyclopentadienylzirconium dimethyl,
n-butyltris(3,5-dimethylpyrazolyl)boratopentamethylcyclopentadienylzirconium dibenzyl,
n-butyltris(3,5-dimethylpyrazolyl)boratopentamethylcyclopentadienylzirconium dimethoxide,
n-butyltris(3,5-dimethylpyrazolyl)boratoindenylzirconium dicholoride,
n-butyltris(3,5-dimethylpyrazolyl)boratoindenylzirconium dimethyl,
n-butyltris(3,5-dimethylpyrazolyl)boratoindenylzirconium dibenzyl,
n-butyltris(3,5-dimethylpyrazolyl)boratoindenylzirconium dimethoxide,
n-butyltris(3,5-dimethylpyrazolyl)boratotetra(n-butyl)indenylzirconium dicholoride,
n-butyltris(3,5-dimethylpyrazolyl)boratotetra(n-butyl)indenylzirconium dimethyl,
n-butyltris(3,5-dimethylpyrazolyl)boratotetra(n-butyl)indenylzirconium dibenzyl,
n-butyltris(3,5-dimethylpyrazolyl)boratotetra(n-butyl)indenylzirconium dimethoxide,
n-butyltris(3,5-dimethylpyrazolyl)boratofluorenylzirconium dichloride,
n-butyltris(3,5-dimethylpyrazolyl)boratofluorenylzirconium dimethyl,
n-butyltris(3,5-dimethylpyrazolyl)boratofluorenylzirconium dibenzyl,
n-butyltris(3,5-dimethylpyrazolyl)boratofluorenylzirconium dimethoxide,
tetrakis(3,5-dimethylpyrazolyl)boratocyclopentadienylzirconium dichloride,
tetrakis(3,5-dimethylpyrazolyl)boratocyclopentadienylzirconium dimethyl,
tetrakis(3,5-dimethylpyrazolyl)boratocyclopentadienylzirconium dibenzyl,
tetrakis(3,5-dimethylpyrazolyl)boratocyclopentadienylzirconium dimethoxide,
tetrakis(3,5-dimethylpyrazolyl)boratobutylcyclopentadienylzirconium dichloride,
tetrakis(3,5-dimethylpyrazolyl)boratobutylcyclopentadienylzirconium dimethyl,
tetrakis(3,5-dimethylpyrazolyl)boratobutylcyclopentadienylzirconium dibenzyl,
tetrakis(3,5-dimethylpyrazolyl)boratobutylcyclopentadienylzirconium dimethoxide,
tetrakis(3,5-dimethylpyrazolyl)boratopentamethylcyclopentadienylzirconium dichloride,
tetrakis(3,5-dimethylpyrazolyl)boratopentamethylcyclopentadienylzirconium dimethyl,
tetrakis(3,5-dimethylpyrazolyl)boratopentamethylcyclopentadienylzirconium dibenzyl,
tetrakis(3,5-dimethylpyrazolyl)boratopentamethylcyclopentadienylzirconium dimethoxide,
tetrakis(3,5-dimethylpyrazolyl)boratoindenylzirconium dicholoride,
tetrakis(3,5-dimethylpyrazolyl)boratoindenylzirconium dimethyl,
tetrakis(3,5-dimethylpyrazolyl)boratoindenylzirconium dibenzyl,
tetrakis(3,5-dimethylpyrazolyl)boratoindenylzirconium dimethoxide,
tetrakis(3,5-dimethylpyrazolyl)boratotetrahydroindenylzirconium dicholoride,
tetrakis(3,5-dimethylpyrazolyl)boratotetrahydroindenylzirconium dimethyl,
tetrakis(3,5-dimethylpyrazolyl)boratotetrahydroindenylzirconium dibenzyl,
tetrakis(3,5-dimethylpyrazolyl)boratotetrahydroindenylzirconium dimethoxide,
tetrakis(3,5-dimethylpyrazolyl)boratofluorenylzirconium dichloride,
tetrakis(3,5-dimethylpyrazolyl)boratofluorenylzirconium dimethyl,
tetrakis(3,5-dimethylpyrazolyl)boratofluorenylzirconium dibenzyl,
tetrakis(3,5-dimethylpyrazolyl)boratofluorenylzirconium dimethoxide,
substituted compounds of the above-mentioned compounds, and compounds having the same nomenclatures as those of the above compounds except that "substituted borato" is replaced with a term "methanido".

In place of the zirconium atom as a central metal of the above-mentioned zirconium compounds, other metals, such as titanium and hafnium, can be used. Further, in place of the anionic ligands used in the above-mentioned compounds, other types of non-coordinating anions can be used, so that a structure of the resultant compound is represented by formula XIII.

Examples of compounds of formula XIV wherein M represents zirconium include those which can be classified into the following three classes, i.e., Classes 4 to 6.

Class 4 (compounds having a combination of ligand $L^1$ and ligand $L^2$, wherein ligand $L^1$ is a group containing at least one phosphorous-containing groups, represented by formula III and ligand $L^2$ is selected from the group consisting of a ligand having a σ-bond and a ligand having a σ-bond and a bond selected from the group consisting of at least one π-bond and at least one lone electron pair donative bond, and wherein a bridge bond is formed between ligand $L^1$ and ligand $L^2$):

bis(diphenyloxophosphoranyl)(2-(ethylene)phenylphenyloxophosphoranyl)methanidozirconium dichloride,
bis(diphenyloxophosphoranyl)(2-(t-butylamino)phenylphenyloxophosphoranyl)methanidozirconium dichloride,
bis(diphenyloxophosphoranyl)(2-(dimethylsilylene-t-butylamino)phenylphenyloxophosphoranyl)methanidozirconium dichloride,
bis(diphenyloxophosphoranyl)(2-(cyclopentadienylene)phenylphenyloxophosphoranyl)methanidozirconium dichloride,
bis(diphenyloxophosphoranyl)(2-(1-indenylene)phenylphenyloxophosphoranyl)methanidozirconium dichloride, and compounds having the same nomenclatures as those of the above compounds except that the term "methanido" is replaced with "hydroborato" or "$C_1$–$C_{10}$ alkyl group-substituted borato".

Class 5 (compounds having a combination of lignad $L^1$ and ligand $L^2$ wherein ligand $L^1$ is a 5-membered heterocyclic ligand, represented by formula V, containing at least one trivalent atom selected from the group consisting of nitrogen, phosphorus, arsenic, antimony and bismuth atoms and ligand $L^2$ is selected from the group consisting of a ligand having a σ-bond and a ligand having. a σ-bond and a bond selected from the group consisting of at least one π-bond and at least one lone electron pair donative bond, with the proviso that when m of formula V is 1, $L^2$ is a ligand having a σ-bond, or a ligand having a σ-bond and at least one lone electron pair donative bond, wherein ligand $L^1$ and ligand $L^2$ are bridge-bonded by alkylene group, silylene group, germylene group or stannylene group):

ethylenebis(2-4,5-diphenyl-1,3-diphospholyl)zirconium dichloride,
ethylenecyclopentadienyl(2-4 15-diphenyl-1,3-diphospholyl)zirconium dichloride,
ethylene(2-4,5-diphenyl-1,3-diphospholyl)t-butylamidezirconium dichloride,
propylenebis(2-4,5-diphenyl-1,3-diphospholyl)zirconium dichloride,
propylenecyclopentadienyl(2-4,5-diphenyl-1,3-diphospholyl)zirconium dichloride,
propylene(2-4,5-diphenyl-1,3-diphospholyl)t-butylamidezirconium dichloride,
ethylenebis(2-4,5-diphenyl-1,3-diarsolyl)zirconium dichloride,
ethylenecyclopentadienyl(2-4,5-diphenyl-1,3-diarsolyl)zirconium dichloride,
ethylene(2-4,5-diphenyl-1,3-diarsolyl)t-butylamidezirconium dichloride,
propylenebis(2-4,5-diphenyl-1,3-diarsolyl)zirconium dichloride,
propylenecyclopentadienyl(2-4,5-diphenyl-1,3-diarsolyl)zirconium dichloride,
propylene(2-4, ,5-diphenyl-1,3-diarsolyl)t-butylamidezirconium dichloride,
ethylenebis(2-4,5-diphenyl-1,3-distibolyl)zirconium dichloride,
ethylenecyclopentadienyl(2-4,5-diphenyl-1,3-distibolyl)zirconium dichloride,
ethylene(2-4,5-diphenyl-1,3-distibolyl)t-butylamidezirconium dichloride,
propylenebis(2-4,5-diphenyl-1,3-distibolyl)zirconium dichloride,
propylenecyclopentadienyl(2-4,5-diphenyl-1,3-distibolyl)zirconium dichloride
propylene(2-4,5-diphenyl-1,3-distibolyl)t-butylamidezirconium dichloride,
dimethylsilylenebis(2-4,5-diphenyl-1,3-diphospholyl)zirconium dichloride,
dimethylsilylenecyclopentadienyl(2-4,5-diphenyl-1,3-diphospholyl)zirconium dichloride,
dimethylsilylene(2-4,5-diphenyl-1,3-diphospholyl)t-butylamidezirconium dichloride,
dimethylsilylenebis(2-4,5-diphenyl-1,3-diarsolyl)zirconium dichloride,
dimethylsilylenecyclopentadienyl(2-4,5-diphenyl-1,3-diarsolyl)zirconium dichloride,
dimethylsilylene(2-4,5-diphenyl-1,3-diarsolyl)t-butylamidezirconium dichloride,
dimethylsilylenebis(2-4,5-diphenyl-1,3-distibolyl) zirconium dichloride,
dimethylsilylenecyclopentadienyl(2-4,5-diphenyl-1,3-distibolyl)zirconium dichloride,
dimethylsilylene(2-4,5-diphenyl-1,3-distibolyl)t-butylamidezirconium dichloride,
dimethylgermylenebis(2-4,5-diphenyl-1,3-diphospholyl) zirconium dichloride,
dimethylgermylenecyclopentadienyl(2-4,5-diphenyl-1,3-diphospholyl)zirconium dichloride,
dimethylgermylene(2-4,5-diphenyl-1,3-diphospholyl)t-butylamidezirconium dichloride,
dimethylgermylenebis(2-4,5-diphenyl-1,3-diarsolyl) zirconium dichloride,
dimethylgermylenecyclopentadienyl(2-4,5-diphenyl-1,3-diarsolyl)zirconium dichloride,
dimethylgermylene(2-4,5-diphenyl-1,3-diarsolyl)t-butylamidezirconium dichloride,
dimethylgermylenebis(2-4,5-diphenyl-1,3-distibolyl) zirconium dichloride,
dimethylgermylenecyclopentadienyl(2-4,5-diphenyl-1,3-distibolyl)zirconium dichloride,
dimethylgermylene(2-4,5-diphenyl-1,3-distibolyl)t-butylamidezirconium dichloride,
dimethylstannylenebis(2-4,5-diphenyl-1,3-diphospholyl) zirconium dichloride,
dimethylstannylenecyclopentadienyl(2-4,5-diphenyl-1,3-diphospholyl)zirconium dichloride,
dimethylstannylene(2-4,5-diphenyl-1,3-diphospholyl)t-butylamidezirconium dichloride,
dimethylstannylene bis(2-4,5-diphenyl-1,3-diarsolyl) zirconium dichloride,
dimethylstannylenecyclopentadienyl(2-4,5-diphenyl-1,3-diarsolyl)zirconium dichloride,
dimethylstannylene(2-4,5-diphenyl-1,3-diarsolyl)t-butylamidezirconium dichloride,
dimethylstannylenebis(2-4,5-diphenyl-1,3-distibolyl) zirconium dichloride,
dimethylstannylenecyclopentadienyl(2-4,5-diphenyl-1,3-distibolyl)zirconium dichloride, and
dimethylstannylene(2-4,5-diphenyl-1,3-distibolyl)t-butylamide zirconium dichloride.

Class 6 (compounds having a combination of ligand $L^1$ and ligand $L^2$, wherein $L^1$ is a trispyrazolyl tridentate ligand represented by formula VI and ligand $L^2$ is an alkapolyenyl ligand having a σ-bond and two or more π-bonds, wherein a bridge bond is formed between ligand $L^1$ and ligand $L^2$):

hydrobis(3,5-dimethylpyrazolyl)(3-(ethylenecyclopentadienyl)pyrazolyl)boratozirconium dichloride,
hydrobispyrazolyl(3-(ethylenecyclopentadienyl)pyrazolyl)boratozirconium dimethyl,
hydrobispyrazolyl(3-(dimethylsilylenecyclopentadienyl)pyrazolyl)boratozirconium dichloride,
hydrobispyrazolyl(3-(dimethylsilylenecyclopentadienyl)pyrazolyl)boratozirconium dimethyl,
hydrobispyrazolyl(3-(ethyleneindenyl)pyrazolyl)boratozirconium dichloride,
hydrobispyrazolyl(3-(ethyleneindenyl)pyrazolyl)boratozirconium dimethyl,
hydrobispyrazolyl(3-(dimethylsilyleneindenyl)pyrazolyl)boratozirconium dichloride,
hydrobispyrazolyl(3-(dimethylsilyleneindenyl)pyrazolyl)boratozirconium dimethyl,
hydrobispyrazolyl(3-(ethylenetetrahydroindenyl)pyrazolyl)boratozirconium dichloride,
hydrobispyrazolyl(3-(ethylenetetrahydroindenyl)pyrazolyl)boratozirconium dimethyl,
hydrobispyrazolyl(3-(dimethylsilylenetetrahydroindenyl)pyrazolyl)boratozirconium dichloride, and hydrobispyrazolyl(3-(dimethylsilylenetetrahydroindenyl) pyrazolyl)boratozirconium dimethyl.

In place of the zirconium atom as a central metal of the above-mentioned zirconium compounds, other metals, such as titanium and hafnium, can be used. Further, in place of the anionic ligands used in the above-mentioned compounds, other types of non-coordinating anions can be used, so that a structure of the resultant compound is represented by formula XV.

The catalyst of the present invention may be used alone for olefin polymerization. However, the catalyst of the present invention may be used together with an auxiliary catalyst comprised of alkylaluminoxane which is represented by one of the following formulae XVI and XVII:

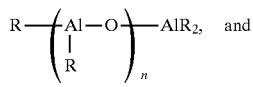, and (XVI)

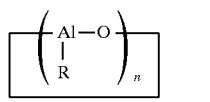 (XVII)

wherein each R independently represents a hydrogen atom, a halogen atom or a $C_1-C_{10}$ alkyl group, and n is an integer of from 1 to 40.

Representative examples of Rs in formulae (XVI) and (XVII) include a hydrogen atom, a chlorine atom, a bromine atom, a methyl group, an ethyl group, an n-propyl group, an isoprolyl group, an n-butyl group, an isobutyl group, an s-butyl group, a propyl group, a hexyl group, a cyclohexyl group, a heptyl group, an octyl group, a nonyl group and a decyl group. It is preferred that at least one R represent a methyl group. The number of recurring units (i.e., n) is preferably in the range from 2 to 40, more preferably 5 to 40. The alkylaluminoxane can be prepared by a customary method. For example, in one customary method, trialkylaluminum is dissolved in a hydrocarbon solvent to obtain a solution and then, an equivalent amount of water, relative to the amount of the trialkylaluminum, is gradually added to the solution to hydrolyze the trialkylaluminum. In another customary method, copper sulfate hydrate or aluminum sulfate hydrate is suspended in a hydrocarbon solvent and then, trialkylaluminum (in an amount 1 to 3 equivalents relative to one equivalent of the crystal water of the suspended hydrate) is contacted with the hydrate to thereby gradually hydrolyze the trialkylaluminum. In still another customary method, silica gel having water adsorbed thereon is suspended in a hydrocarbon solvent and then, trialkylaluminum (in an amount 1 to 3 equivalents relative to one equivalent of the water adsorbed on the suspended silica gel) is contacted with the silica gel to thereby gradually hydrolyze the trialkylaluminum.

Another example of an auxiliary catalyst which may be used together with the catalyst of the present invention is a cation producer represented by the following formula XVIII:

[On]⁺[An]⁻ (XVIII)

wherein: [On]⁺ represents a metal cation, such as a cation of a metal of Group IB, Group IIB or Group VIII of the Periodic Table of the Elements, or an onium, such as carbonium, silonium, oxonium, sulfonium, ammonium or phosphonium; and [An]⁻ represents an anion which is stable under the reaction conditions for olefin polymerization and has no or poor coordinating properties.

Preferred examples of cation producers represented by formula (XVIII) include tetra (pentafluorophenyl) borates, such as ferroceniumtetra(pentafluorophenyl) borate, silver (I) tetra(pentafluorophenyl)borate, copper (I) tetra (pentafluorophenyl)borate, mercury (II) bis(tetra (pentafluorophenyl)borate), palladium (II) bis(tetra (pentafluorophenyl)borate), platinum (II) bis(tetra (pentafluorophenyl)borate), diphenylhydrocarboniumtetra (pentafluorophenyl)borate, trihpenylcarboniumtetra (pentafluorophenyl)borate, triphenylsiloniumtetra (pentafluorophenyl)borate, tricyclohexylcarboniumtetra (pentafluorophenyl)borate, triethyloxoniumtetra (pentafluorophenyl)borate, triethylsulfoniumtetra (pentafluorophenyl)borate, diethylaniliniumtetra (pentafluorophenyl)borate, trimethylammoniumtetra (pentafluorophenyl)borate, triethylammoniumtetra (pentafluorophenyl)borate, tetra(n-butyl) ammoniumtetra (pentafluorophenyl)borate and triphenylphosphoniumtetra (pentafluorophenyl)borate.

A further example of an auxiliary catalyst is an alkylaluminum represented by the following formula XIX:

$(R_3Al)n$ (XIX)

wherein each R independently represents a hydrogen atom, a halogen atom and a $C_1-C_{10}$ alkyl group, and n is 1 or 2. This auxiliary catalyst is effective for stabilizing the catalyst of the present invention and for stabilizing an alkylaluminoxane used as an auxiliary catalyst so that the amount of alkylaluminoxane to be used can be reduced. Examples of Rs include a hydrogen atom, a chlorine atom, a bromine atom, a methyl group, an ethyl group, an n-propyl group, an isopropyl group, an n-butyl group, an isobutyl group, an s-butyl group, a propyl group, a hexyl group, a cyclohexyl group, a heptyl group, an octyl group, a nonyl group, and a decyl group. It is preferred that at least one R represent a methyl group.

In conducting olefin polymerization using the catalyst of the present invention, it is preferred that the catalyst of the present invention be used in an amount such that the concentration of the transition metal of the catalyst is in the range from $10^{-10}$ to $10^{-1}$ mol/liter of the liquid medium, more preferably from $10^{-8}$ to $10^{-3}$ mol/liter of the liquid medium. (When an olefin is polymerized in the gaseous phase, the "liquid medium" means a solvent to be used while when an olefin is polymerized is in the liquid phase, the "liquid medium", means the liquid olefin or a mixture of a solvent to be used and the liquid olefin). When olefin polymerization is conducted by a gas phase polymerization method, the catalyst is used in a form carried on a carrier. In this case, it is preferred that the amount of the transition metal of the catalyst be $10^{-7}$ to $10^{-2}$ gram atom/g of the carrier, more preferably $10^{-5}$ to $10^{-3}$ gram atom/g of the carrier.

When alkylaluminoxane is used as an auxiliary catalyst, it is preferred that alkylaluminoxane be used in an amount such that the atomic ratio of the aluminum contained in the alkylaluminoxane to the transition metal contained in the catalyst is in the range from 1 to $10^6$, more preferably from 1 to $10^4$. When the above-mentioned cation producer is employed as an auxiliary catalyst, it is prefered that the cation producer be used in an amount such that the atomic ratio of the cation in the cation producer to the transition metal contained in the catalyst is in the range from 0.1 to 10, preferably from 0.5 to 2.

In order to increase a bulk density of a polymer to be produced, improve the powder characteristics of the polymer, and control a molecular weight distribution of the polymer, the catalyst of the present invention can be used in a state carried on a carrier. Examples of materials for carriers include an organic material, such as starch or a polymer, a metallic material, such as bismuth, powdery copper or powdery iron, a metal oxide, such as alumina or iron oxide, a metal carbonate, such as magnesium carbonate, a metal chloride, such as magnesium chloride, activated carbon, an inorganic carbide, such as silicon carbide, an inorganic silicon oxide, such as silica, zeolite or diatomite and an ion-exchange resin, such as Amberlite or Nafion. Generally, these carrier materials contain an active hydrogen-containing compound, such as crystal water, adsorbed water or a hydroxyl group, which can react with the catalyst to deactivate the same. Therefore, it is preferred that before introduction into the reaction system, these carrier materials be subjected to appropriate treatment for removing the active hydrogen. For example, in such a treatment, active hydrogen atoms, which are contained in the hydroxy groups of an organic material, in the silanol groups of an inorganic silicon oxide or in the amino groups or hydroxyl groups of an ion-exchange resin, can be removed by contacting carriers containing the active hydrogen atoms with alkylaluminum or alkylaluminoxane (which is used in an amount 0.3 to 5 equivalents (in terms of aluminum atoms) relative to one equivalent of the active hydrogen atom. With respect to carrier materials composed of a metal, a metal oxide, a metal carbonate, a metal chloride, an inorganic carbonate, inorganic silicon oxide and the like, the crystal water and adsorbed water of these carriers can be removed therefrom by sintering these carrier materials at an appropriate temperature. The treatment for removing the active hydrogen from a carrier can be conducted before or after a catalyst is carried on the carrier. At least one of the catalyst of the present invention, the alkylaluminoxane auxiliary catalyst, the cation producer as an auxiliary catalyst and the alkylaluminum auxiliary catalyst can be carried on a carrier in any combination and in any order.

Hereinafter, explanation is made on the polymerization of an olefin using the catalyst of the present invention.

The catalyst of the present invention can be advantageously used for polymerization of various olefins. Examples of olefins which can be polymerized using the catalyst of the present invention include an is α-olefin, such as ethylene, propylene, 1-butene, 1-pentene, 1-hexene, 1-heptene, 1-octene or vinylcyclohexane; a vinyl aromatic hydrocarbon, such as styrene or methylstyrene; an alicyclic olefin, such as cyclopentene, methylcyclopentene, cycloheptene, or cyclooctene; a conjugated diene, such as butadiene, 1,3-pentadiene, 1,3-hexadiene, cyclopentadiene, 1,3-cyclohexadiene or vinyl-1-cyclohexene; an unconjugated diene, such as 1,4-pentadiene, 1,5-hexadiene, 1,4-hexadiene, 2-methyl-1,4-pentadiene, 3-vinylcyclohexene or 4-vinyl-3-norbornene; a polyene having 6 to 20 carbon atoms; acetylene; propyne; butyne; pentyne; and hexyne. Of them, an α-olefin is preferred and ethylene is more preferred. The catalyst of the present invention can also be used for copolymerization between two or more different types of olefins. For example, there can be mentioned copolymerization between ethylene and one or more com bnomers, e.g., an α-olefin, such as propylene, 1-butene or 1-hexene; a vinylaromatic hydrocarbon, such as styrene or methylstyrene; an alicyclic olefin, such as cyclopentene or methylcyclopentene; a conjugated diene, such as butadiene; an unconjugated diene, such as 1,5-hexadiene or 3-vinylcyclohexene; a polyene; and acetylene.

In connection with the above, it is noted that the types of catalysts are not particularly limited with respect to the types of olefins to be polymerized, however, a catalyst of formula I or II, in which ligand $L^1$ is represented by formula V in which m is 1 and ligand $L^2$ is a ligand having a σ-bond or a ligand having a σ-bond and having at least one lone electron pair donative bond (such as halogen, alkyl, alkoxy, silyl, siloxy, amino or phosphino), is particularly advantageous for polymerizing a vinyl aromatic hydrocarbon. For the polymerization of an olefin, there may be employed a customary polymerization method, such as a suspension polymerization method, a solution polymerization method and a gas phase polymerization method.

In a suspension polymerization method, for example, a catalyst is charged, together with a polymerization solvent, in a reaction vessel and then, thereto is added an olefin in an inert atmosphere under a pressure of 1 to 200 kg/cm$^2$G. A polymerization reaction is then allowed to proceed at a temperature of from −50° C. to 120° C. Examples of solvents to be used in the polymerization reaction include aliphatic hydrocarbons, such as propane, butane, pentane, hexane, heptane, octane and nonane; alicyclic hydrocarbons, such as cyclopentane, cyclohexane, methylcyclohexane, ethylcyclohexane, cyclooctane and isopropylcyclohexane; aromatic hydrocarbons, such as benzene, toluene, xylene and t-butylbenzene; perfluoro aliphatic hydrocarbons, such as perfluorooctane and perfluorononane, and mixtures of these hydrocarbons.

In a solution polymerization method, for example, a catalyst is introduced, together with a polymerization solvent, in a reaction vessel and then, thereto is added an olefin in an inert atmosphere under a pressure of from 1 to 200 kg/cm$^2$G. A polymerization reaction is allowed to proceed at a temperature of from 50° C. to 300° C. Examples of solvents to be used in the polymerization reaction include aliphatic hydrocarbons, such as propane, butane, pentane, hexane, heptane, octane and nonane; alicyclic hydrocarbons, such as cyclopentane, cyclohexane, methylcyclohexane, ethylcyclohexane, cyclooctane and isopropylcyclohexane; aromatic hydrocarbons, such as benzene, toluene, xylene and t-butylbenzene; perfluoro aliphatic hydrocarbons, such as perfluorooctane and perfluorononane, and mixtures of these hydrocarbons.

In a gas phase polymerization method, for example, a catalyst is placed in a reaction vessel and an olefin is charged in the reaction vessel in an inert atmosphere under a pressure of from 1 to 50 kg/cm$^2$G. A polymerization reaction is allowed to proceed at a temperature of from −50° C. to 120° C. During the polymerization, frequency of contact between olefin molecules and the catalyst molecules can be increased by employng a mixing apparatus, such as a fluidized bed or a moving bed, or by stirring.

The polymerization may be conducted by a mono-stage polymerization method in which a single reaction stage is employed, or by a multi-stage polymerization method in which a plurality of reaction stages are involved. In the case of the multi-stage polymerization method, when the polymerization reaction is conducted using two or more different sets of reaction conditions, a polymer having a broad molecular weight distribution can be produced. If desired for controlling a molecular weight of a polymer to be produced, customary techniques may be employed, such as controlling of the reaction temperature and an addition of hydrogen to the reaction system.

DETAILED DESCRIPTION OF PREFERRED EMBODIMENTS

The present invention will now be described in greater detail with reference to the following Examples and Comparative Examples which should not be construed as limiting the scope of the present invention.

In the Examples and Comparative Examples, a catalytic activity represents an yield (g) of a polymer formed per gram of a metal contained in a catalyst per hour. Further, MI represents a melt index which is measured at a temperature of 190° C. under a load of 2.16 kg, while HMI represents a melt index measured at 190° C. under a load of 21.6 kg. Both of MI and HMI are measured according to ASTM D-1238. A molecular weight and a molecular weight distribution of a polymer are obtained, from a differential refractive index and viscosity, by gel permeation chromatography (apparatus: 150 CV manufactured and sold by Waters Assoc. Co., U.S.A.). Mw represents a weight average molecular weight, and Mn represents a number average molecular weight.

[Polymerization of ethylene]

EXAMPLE 1

Synthesis of compound for ligand $L^1$

Trisdiphenyloxophosphoranylmethane (HTriso) for $L^1$ is synthesized according to the method described in "Inorganic Chemistry", page 2699 (1986).

Synthesis of catalyst A1

Trisdiphenyloxophosphoranyl-methanidocyclopentadienylzirconium dichloride {TrisoCpZrCl$_2$}, wherein Triso represents a trisdiphenyloxophosphoranylmethanido group, and Cp represents a cyclopentadienyl group, is synthesized as follows.

A 1-liter four-necked flask provided with a reflux column which is connected at a top thereof to a gas buret for measuring an amount of a generated gas, a dropping funnel, a stirrer and a thermometer is purged with nitrogen gas. To the flask is charged 360 mg of a 60% oil dispersion of sodium hydride which has been washed with hexane. Thereto is added 500 ml of dried and distilled tetrahydrofuran and then, stirring is conducted to obtain a suspension. When 4.9 g of HTriso is added to the suspension, 200 ml of hydrogen gas is generated. When the generation of hydrogen gas ceases, 1.9 g of zirconium chloride is added thereto to obtain a mixture. The obtained mixture is stirred at room temperature for 4 hours. Subsequently, 100 ml of a tetrahydrofuran solution of cyclopentadienyl lithium (0.08 mmole/liter) is dropwise added thereto and then, a reaction is allowed to proceed for 4 hours. The reaction mixture is filtered through diatomaceous earth in nitrogen atmosphere to obtain a filtrate. After the filtrate is concentrated 5-fold, hexane is added to the concentrate, so that a white solid is precipitated. The precipitate is separated by filtration and then, recrystallized to obtain a product. Identification of the product as TrisoCpZrCl$_2$ is made by $^1$H-NMR spectroscopy (heavy toluene, 270 MH), which shows signals for the ligand at δ6.55 (S, 5H, Cp group), 6.8–7.2 (m, 27H, phenyl group) and 7.7–8.2 (m, 18H, phenyl group). Infrared (IR) spectrum shows a peak for the ligand at 1,115 (P=O) and 840 (Cp) cm$^{-1}$.

Polymerization reaction

A 3 ml toluene solution containing 0.1 μmole of catalyst A1 (TrisoCpZrCl$_2$) and 0.14 ml (0.4 mmole in terms of the amount of aluminum) of a toluene solution of methylaluminoxane (PMAO; containing 2.92 moles of aluminum/liter of the toluene solution) (manufactured and sold by Tosoh Akzo Corp., Japan) are charged, together with 0.8 liter of dehydrated and deoxygenated toluene, in a 1.6-liter autoclave evacuated and replaced with nitrogen gas. The temperature of the inside of the autoclave is maintained at 80° C. and then, ethylene gas is charged in the autoclave at a pressure of 10 kg/cm$^2$G. A total pressure of the autoclave becomes 10.4 kg/cm$_2$G, including a solvent pressure. A polymerization reaction is allowed to proceed for 1 hour, while the total pressure of the autoclave is maintained constantly by supplying ethylene gas. 9.7 g of a polymer is obtained. It is found that a catalytic activity of A1 is 1,070 kg/g of Zr per hour, the molecular weight of the polymer is 111,400 and the molecular weight distribution is 2.52 in terms of Mw/Mn. As is apparent from the above, the polymer produced using the catalyst A1 has a high molecular weight.

EXAMPLE 2

Synthesis of catalyst A2

Trisdiphenyloxophosphoranyl-methanidoindenylzirconium dichloride {TrisoIndZrCl$_2$} is synthesized as follows.

Substantially the same procedure as described in Example 1 for preparing catalyst A1 is repeated except that a tetrahydrofuran solution of indenyllithium is used instead of the tetrahydrofuran solution of cyclopentadienyllithium. Identification of catalyst A2 is made by $^1$H-NMR spectroscopy (heavy toluene, 270 MH), which shows signals for the ligand at δ6.8–7.7 (m, 34H, indenyl group and phenyl group) and 7.8–8.2 (m, 18H, phenyl group).

Polymerization reaction

Substantially the same polymerization procedure as described in Example 1 is repeated except that a 3 ml toluene solution containing 0.1 μmole of catalyst A2 is used instead of catalyst A1. 4.4 g of a polymer is obtained. It is found that a catalytic activity of catalyst A2 is 484 kg/g of Zr per hour.

EXAMPLE 3

Synthesis of catalyst A3

Trisdiphenyloxophosphoranylmethanidozirconium trichloride {TrisoZrCl$_3$} is synthesized as follows.

In the same apparatus as used in Example 1 for synthesizing catalyst A1 is charged 360 mg of a 60% oil dispersion of sodium hydride which has been washed with hexane. Thereto is added 500 ml of dried and distilled tetrahydrofuran to obtain a suspension. When 4.9 g of HTriso is added to the suspension, 200 ml of hydrogen gas is generated. When the generation of hydrogen gas ceases, 1.9 g of zirconium chloride is added thereto and then, a reaction is allowed to proceed while stirring at room temperature for 4 hours. The reaction mixture is filtered through diatomaceous earth in nitrogen atmosphere to obtain a filtrate. After the filtrate is concentrated 5-fold, hexane is added to the concentrate, so that a white solid is precipitated. The precipitate is separated by filtration and then, recrystallized to obtain a product. Identification of the product as {TrisoZrCl$_3$} is made by $^1$H-NMR spectroscopy (heavy toluene, 270 MH), which shows signals for ligand at δ6.8 (m, 27 H, phenyl group) and 7.7–8.2 (m, 18 H, phenyl group), although high sensitivity is not obtained due to the poor solubility of the product in heavy toluene. IR spectrum shows a peak for the ligand at 1,114 (P=O) cm$^{-1}$.

Polymerization reaction

Substantially the same polymerization procedure as described in Example 1 is repeated except that a 3 ml toluene solution containing 0.5 μmole of catalyst A3 (TrisoZrCl₃) is used instead of catalyst A1. 5.2 g of a polymer is obtained. It is found that a catalytic activity of catalyst A3 is 114 kg/g of Zr per hour.

EXAMPLE 4

Synthesis of catalyst A4

Trisdiphenyloxophosphoranylmethanidozirconium trimethyl {TrisoZrMe₃} is synthesized as follows.

In the same apparatus as used in Example 1 for synthesizing catalyst A1 are charged 10 mmoles of catalyst A3 and 50 ml of diethyl ether cooled at −78° C. Subsequently, 30 ml of 1M diethyl ether solution of methyllithium is added dropwise thereto over a period of 1 hour through a dropping funnel. A formed solid is separated by filtration to obtain a filtrate. The obtained filtrate is concentrated to 10 ml. To the concentrate is added dried pentane to obtain a white precipitate. The precipitate is separated by filtration, followed by drying to obtain a product.

Polymerization reaction

Substantially the same polymerization procedure as described in Example 1 is repeated except that a 3 ml toluene solution containing 0.5 μmole of catalyst A4 (TrisoZrMe₃) is used instead of catalyst A1. 7.8 g of a polymer is obtained. It is found that a catalytic activity of catalyst A4 is 171 kg/g of Zr per hour.

EXAMPLE 5

Synthesis of catalyst A5

Trisdiphenyloxophosphoranylmethanidozirconium tribenzyl {TrisoZr(CH₂Ph)₃} is synthesized as follows.

In the same apparatus as used in Example 1 for synthesizing catalyst A1 are charged 10 mmoles of catalyst A3 and 50 ml of diethyl ether cooled at −78° C. Subsequently, 30 ml of 1M diethyl ether solution of benzylmagnesium chloride, PhCH₂MgCl is dropwise added thereto through a dropping funnel over a period of 1 hour. A formed solid is separated by filtration to obtain a filtrate. The obtained filtrate is concentrated to 10 ml. To the concentrate is added dried pentane to cause crystallization.

Polymerization reaction

Substantially the same polymerization procedure as described in Example 1 is repeated except that a 3 ml toluene solution containing 0.1 μmole of catalyst A5 {TrisoZr(CH₂Ph)₃} is used instead of catalyst A1. 2.1 g of a polymer is obtained. It is found that a catalytic activity of catalyst A5 is 230 kg/g of Zr per hour.

EXAMPLE 6

Synthesis of compound for crosslinked type ligand L²

1,3-propylenebis(4,5-diphenyl-1,3-diphospholyl) dilithium is synthesized according to the method described in "Organometallics", page 459 (1992).

Synthesis of catalyst B1

1,3-propylenebis(4,5-diphenyl-1,3-diphospholyl) zirconium dichloride {Pr(C₃Ph₂P₂)₂ZrCl₂} is synthesized as follows.

A 50 ml tetrahydrofuran solution containing 2 mmoles of ligand L² is charged in a Schlenk's tube and cooled at −78° C. Subsequently, 2 mmoles of zirconium chloride is added thereto to obtain a mixture. The obtained mixture is stirred for 4 hours. The reaction temperature is gradually elevated to room temperature. From the reaction mixture, a solid is obtained. From the obtained solid, tetrahydrofuran (THF) is removed. The THF-free solid is dissolved in a mixed solvent of hexane and toluene to obtain a solution. The obtained solution is filtered through silica gel column and then, the purified solution is concentrated to cause crystallization.

Polymerization reaction

Substantially the same polymerization procedure as described in Example 1 is repeated except that a 1 ml toluene suspension containing 0.2 μmole of catalyst B1 {Pr(C₃Ph₂P₂)₂ZrCl₂} is used instead of catalyst A1. 5 g of a polymer is obtained. It is found that a calytic activity of catalyst B1 is 183 kg/g of Zr per hour.

EXAMPLE 7

Synthesis of catalyst B2

2,3,4,5-tetramethylphospholyllithium {LiC₄Me₄P} is synthesized according to the method described in "Organometallics", page 921 (1988).

Subsequently, (2,3,4,5-tetramethylphospholyl)(trisdiphenyloxophosphoranylmethanido)zirconium dichloride {(C₄Me₄P)(Triso)ZrCl₂} is synthesized as follows.

A 50 ml diethyl ether solution containing 10 mmoles of catalyst A3 is charged in a Schlenk's tube and cooled at −78° C. Subsequently, 10 ml of 10M diethyl ether solution of 2,3,4,5-tetramethylphospholyllithium {LiC₄Me₄P} is dropwise added thereto through a dropping funnel over a period of 1 hour to obtain a reaction mixture. The reaction mixture is further stirred for 8 hours. The resultant mixture is filtered through diatomaceous earth in nitrogen atmosphere to obtain a filtrate. After the filtrate is concentrated 5-fold, hexane is added to the concentrate, so that a slightly yellowish solid is precipitated. The precipitate is separated by filtration and then, recrystallized to obtain a product. Identification of the product as {(C₄Me₄P)(Triso)ZrCl₂} is made by ¹H-NMR spectroscopy (heavy toluene, 270 MH), which shows signals for the ligand at δ1.9 (s, 6 H, a methyl group, 2.1 (m, 6 H, a methyl group), 6.8 (m, 27 H, a phenyl group) and 7.7–8.2 (m, 18 H, a phenyl group), although high sensitivity is not obtained due to the poor solubility of the product in heavy toluene.

Polymerization reaction

Substantially the same polymerization procedure as described in Example 1 is repeated except that a 1 ml toluene suspension containing 1.0 μmole of catalyst B2 {(C₄Me₄P)(Triso)ZrCl₂} and 0.5 ml of a toluene solution of methylaluminoxane (PMAO; containing 1.0 mmole of aluminum/0.5 ml of the toluene solution)(manufactured and sold by Ethyl Corporation, U.S.A.) are used instead of catalyst A1. 31 g of a polymer is obtained. It is found that a catalytic activity of catalyst B2 is 340 kg/g of Zr per hour.

EXAMPLE 8

Synthesis of catalyst B3

Hydrotris(3,5-dimethylpyrazolyl)boratozirconium trichloride {HB(3,5-Me₂pz)₃ZrCl₃}, wherein 3,5-Me₂pz represents a 3,5-dimethylpyrazolyl group, is synthesized according to the method described in Inorganic Chemistry, page 840 (1982).

Subsequently, (2,3,4,5-tetramethylphospholyl)(hydrotris (3,5-dimethylpyrazolyl)borato)zirconium dichloride $\{(C_4Me_4P)(HB(3,5-Me_2pz)_3)ZrCl_2\}$ is synthesized as follows.

A 50 ml diethyl ether solution containing 10 mmoles of hydrotris(3,5-dimethylpyrazolyl)boratozirconium trichloride $\{HB(3,5-Me_2pz)_3ZrCl_3\}$, wherein 3,5-Me$_2$pz represents a 3,5-dimethylpyrazolyl group, is charged in a Schlenk's tube and cooled at −78° C. Subsequently, 10 ml of 10M diethyl ether solution of 2,3,4,5-tetramethylphospholyllithium $\{LiC_4Me_4P\}$ is dropwise added thereto through a dropping funnel over a period of 1 hour to obtain a reaction mixture. The reaction mixture is further stirred for 8 hours. The resultant mixture is filtered through diatomaceous earth in nitrogen atmosphere to obtain a filtrate. After the filtrate is concentrated 5-fold, hexane is added to the concentrate, so that a slightly yellowish solid is precipitated. The precipitate is separated by filtration and then, recrystallized to obtain a product. Identification of the product as $\{(C_4Me_4P)(HB(3,5-Me_2pz)_3)ZrCl_2\}$ is made by $^1$H-NMR spectoscopy (heavy toluene, 270 MH), which shows signals for the ligand at δ1.9 (s, 6 H, methyl group), 2.1 (m, 6 H, methyl group), 2.3 (s, 18 H, methyl group) and 5.8 (m, 3 H, 4-H of pz group), although high sensitivity is not obtained due to the poor solubility of the product in heavy toluene.

Polymerization reaction

Substantially the same polymerization procedure as described in Example 1 is repeated except that a 1 ml toluene suspension containing 1.0 μmole of catalyst B3 $\{(C_4Me_4P)HB(3,5-Me_2pz)ZrCl_2\}$ and 0.5 ml of a toluene solution of methylaluminoxane (PMAO; containing 1.0 mmole of aluminum/0.5 ml of the toluene solution)(manufactured and sold by Ethyl Corporation, U.S.A.) are used instead of catalyst A1. 33 g of a polymer is obtained. It is found that a catalytic activity of catalyst B3 is 362 kg/g of Zr per hour.

EXAMPLE 9

Synthesis of catalyst C1

Hydrotrispyrazolylboratocyclopentadienylzirconium dichloride $\{HB(pz)_3CpZrCl_2\}$, wherein pz represents a pyrazolyl group, and Cp represents a cyclopentadienyl group, is synthesized according to the method described in "J. Chem. Soc. Dalton Trans.", page 603 (1991).

Polymerization reaction

A 3 ml toluene solution containing 1.0 μmole of catalyst C1 $\{HB(pz)_3CpZrCl_2\}$ and 0.7 ml (2.0 mmoles in terms of the amount of aluminum) of a toluene solution of methylaluminoxane (PMAO; containing 2.92 moles of aluminum/liter of the toluene solution) (manufactured and sold by Tosoh Akzo Corp., Japan) are charged, together with 0.8 liter of dehydrated and deoxygenated toluene, in a 1.6-liter autoclave evacuated and replaced with nitrogen gas. The temperature of the inside of the autoclave is maintained at 80° C. and then, ethylene gas is charged in the autoclave at a pressure of 10 kg/cm$^2$G. A total pressure of the autoclave becomes 10.4 kg /cm$^2$G, including a solvent pressure. A polymerization reaction is allowed to proceed for 1 hour, while the total pressure of the autoclave is maintained constantly by supplying ethylene gas. 42 g of a polymer is obtained. It is found that a catalytic activity of catalyst C1 is 4,600 kg/g of Zr per hour, the molecular weight of the polymer is 1,290,000, the molecular weight distribution is 2.56 in terms of Kw/Mn and HMI is 0.29 g/10 min.

EXAMPLE 10

Synthesis of catalyst C2

Hydrotris(3,5-dimethylpyrazolyl) boratocyclopentadienylzirconium dichloride $\{HB(3,5-Me_2pz)_3CpZrCl_2\}$, wherein 3,5-Me$_2$pz represents a 3,5-dimethylpyrazolyl group, is synthesized according to the method described in "Inorganic chemistry", page 2046 (1986).

Polymerization reaction

A 3 ml toluene solution containing 0.1 μmole of catalyst C2 $\{HB(3,5-Me_2pz)_3CpZrCl_2\}$ and 0.035 ml (0.1 mmole in terms of the amount of aluminum) of a toluene solution of methylaluminoxane (PMAO; containing 2.92 moles of aluminum/liter of the toluene solution) (manufactured and sold by Tosoh Akzo Corp., Japan) are charged, together with 0.8 liter of dehydrated and deoxygenated toluene, in a 1.6-liter autoclave evacuated and replaced with nitrogen gas. The temperature of the inside of the autoclave is maintained at 80° C. and then, ethylene gas is charged in the autoclave at a pressure of 10 kg/cm2G. A total pressure of the autoclave becomes 10.4 kg/cm$^2$G, including a solvent pressure. A polymerization reaction is allowed to proceed for 1 hour, while the total pressure of the autoclave is maintained constantly by supplying ethylene gas. 17.2 g of a polymer is obtained. It is found that a catalytic activity of catalyst C2 is 1,890 kg/g of Zr per hour, the molecular weight of the polymer is 1,230,000, the molecular weight distribution is 2.53 in terms of Mw/Mn and HMI is 0.23 g/10 min.

COMPARATIVE EXAMPLE 1

Synthesis of comparative catalyst a

Pyrazolylcyclopentadienylzirconium dichloride $\{pzCpZrCl_2\}$ is synthesized as follows.

To a 100 ml diethyl ether solution containing 0.011 mole of pyrazolyllithium salt is gradually added 0.01 mole of zirconium chloride, followed by stirring for one day. Subsequently, 100 ml of a diethyl ether solution of cyclopentadienelithium salt is added to the mixture and then, stirred for one day. Subsequently, the ether is evaporated under a vacuum and then, pentane is added thereto to precipitate lithium chloride. The precipitate is separated by filtration to obtain a filtrate. The obtained filtrate is filtered two times through sellaite to obtain a catalyst in a solid form.

Polymerization reaction

Substantially the same polymerization procedure as described in Example 9 is repeated except that a 3 ml toluene solution containing 1.0 μmole of comparative catalyst a $\{pzCpZrCl_2\}$ is used instead of catalyst C1. 0.6 g of a polymer is obtained. It is found that a catalytic activity of comparative catalyst a having a monodentate ligand containing a hetero atom is as low as 6.6 kg/g of Zr per hour.

COMARATIVE EXAMPLE 2

Synthesis of comparative catalyst intermediate I1

Hydrotrispyrazolylboratozirconium trichloride $\{HB(pz)_3ZrCl_3\}$ is synthesized according to the method described in "Inorganic Chemistry", page 1065 (1983).

Polymerization reaction

Substantially the same polymerization procedure as described in Example 9 is repeated except that a 3 ml toluene solution containing 1.0 µmole of comparative catalyst intermediate I1 {HB(pz)$_3$ZrCl$_3$} is used instead of catalyst C1. 2.6 g of a polymer is obtained. It is found that a catalytic activity of comparative catalyst intermediate I1 having only a trispyrazolyl ligand is as low as 29 kg/g of Zr per hour.

COMPARATIVE EXAMPLE 3

Synthesis of comparative catalyst intermediate I2

Hydrotris(3,5-dimethylpyrazolyl)boratozirconium trichloride {HB(3,5-Me$_2$pz)$_3$ZrCl$_3$} is synthesized according to the method described in "Inorganic Chemistry", page 840(1982).

Polymerization reaction

Substantially the same polymerization procedure as described in Example 9 is repeated except that a 3 ml toluene solution containing 1.0 µmole of comparative catalyst intermediate I2 {HB(3,5-Me$_2$pz)$_3$ZrCl$_3$} is used instead of catalyst C1. 1.8 g of polymer is obtained. It is found that a catalytic activity of comparative catalyst intermediate I2 having only a trispyrazolyl ligand is as low as 20.1 kg/g of Zr per hour.

EXAMPLE 11

Synthesis of catalyst C$_3$

Hydrotris(3,5-dimethylpyrazolyl)boratoindenylzirconium dichloride {HB(3,5-Me$_2$pz)$_3$IndZrCl$_2$, wherein Ind represents an indenyl group, is synthesized as follows.

A 1-liter four-necked flask provided with a dropping funnel, a stirrer and a thermometer is replaced with nitrogen gas. To the flask are charged 10 mmoles of intermediate product I2 which has been synthesized in Comparative Example 3 and 10 mmoles of indenyllithium (for example, see "Experimental Chemistry", Vol. 18, 4th ed., edited by The Chemical Society of Japan, published by Maruzen Co., Ltd., Japan). The temperature inside the flask is lowered to −78° C. in a nitrogen atmosphere and then, toluene kept at −78° C. is added thereto through a dropping funnel to obtain a suspension. The obtained suspension is stirred for one day, while maintaining the temperature of the suspension under ice-cooled conditions. The reaction mixture is filtered through diatomaceous earth to obtain a filtrate. After the filtrate is concentrated 5-fold, hexane is added to the concentrate, so that a white solid is precipitated. The precipitate is separated by filtration and then, recrystallized to obtain a product. Identification of the product as {HB(3,5-Me$_2$pz)$_3$IndZrCl$_2$ is made by $^1$H-NMR spectroscopy (heavy toluene, 270 MH) which shows signals for the ligand at δ2.25 (S, 18H, Me group), 5.8 (S, 3H, 4-H of pyrazolyl group) and 7.1–7.9 (m, 7H, indenyl group).

Polymerization reaction

Substantially the same polymerization procedure as described in Example 9 is repeated except that a 3 ml toluene solution containing 2.0 µmoles of catalyst C3 {HB(3,5-Me$_2$pz)$_3$IndZrCl$_2$} is used instead of catalyst C1. 35 g of polymer is obtained. It is found that a catalytic activity of C3 is 192 kg/g of Zr per hour.

EXAMPLE 12

Synthesis of catalyst C4

Hydrotris(3,5-dimethylpyrazolyl)borato(pentamethylcyclopentadienyl)zirconium dichloride {HB(3,5-Me$_2$pz)$_3$CpZrCl$_2$}, wherein Cp represents a pentamethylcyclopentadienyl group, is synthesized according to the procedure as described in Example 10.

Identification of C4 is made by $^1$H-NMR spectroscopy (heavy toluene, 270 MH), which shows signals of the ligands at δ2.25 (S, 18H, Me group), 2.45 (S, 15H, Cp group) and 5.8 (S, 3H, 4-H of pz group).

Polymerization reaction

Substantially the same polymerization procedure as described in Example 9 is repeated except that a 3 ml toluene solution containing 1.0 µmole of catalyst C4, (HB(3,5-Me$_2$pz)$_3$CpZrCl$_2$ is used instead of catalyst C1. 53 g of a polymer is obtained. The catalytic activity of catalyst C4 is 593 kg/g of Zr per hour.

EXAMPLE 13

Synthesis of catalyst C5

Hydrotris(3,5-dimethylpyrazolyl)boratocyclopentadienylzirconium dibenzyl {HB(3,5-Me$_2$pz)$_3$CpZr(CH$_2$Ph)$_2$} is synthesized as follows.

In the same apparatus as used in Example 1 for synthesizing catalyst A1 are charged 10 mmoles of catalyst C2 and 50 ml of diethyl ether cooled at −78° C. Subsequently, thereto dropwise added is 30 ml of 1M diethyl ether solution of magnesium benzylchloride, PhCH$_2$MgCl over a period of 1 hour. A formed solid is filtered off to obtain a filtrate. The obtained filtrate is condensed to 10 ml and then, thereto added is dried pentane to cause crystallization.

Polymerization reaction

Substantially the same polymerization procedure as described in Example 10 is repeated except that a 3 ml toluene solution containing 0.1 µmole of catalyst C5, {HB(3,5-Me$_2$pz)$_3$CpZr(CH$_2$Ph)$_2$} is used instead of the catalyst C2. 19 g of a polymer is obtained. The catalytic activity of C5 is 2,080 kg/g of Zr per hour.

EXAMPLE 14

Synthesis of catalyst C6

Hydrotris(3,5-dimethylpyrazolyl)boratecyclopentadienylzirconium dimethoxide {HB(3,5-Me$_2$pz)$_3$CpZr(OMe)$_2$} is synthesized as follows.

In the same apparatus as used in Example 1 for synthesizing catalyst A1 are charged 10 mmoles of catalyst C2 and 50 ml of toluene cooled at −78° C. Subsequently, thereto dropwise added is 30 ml of 1M toluene solution of methoxylithium over a period of 1 hour to obtain a mixture. The obtained mixture is further stirred for 24 hours. A formed solid is filtered off to obtain a filtrate. The obtained filtrate is condensed to 10 ml and then, thereto added is dried hexane to cause crystallization.

Polymerization reaction

Substantially the same polymerization procedure as described in Example 10 is repeated except that a 3 ml toluene solution containing 0.1 µmole of catalyst C6, {HB(3,5-Me$_2$pz)$_3$CpZr(OMe)$_2$} is used instead of catalyst C2. 16 g of a polymer is obtained. The catalytic activity of catalyst C6 is 1,760 kg/g of Zr per hour.

EXAMPLE 15

Synthesis of catalyst C7 n-Butyltris(3,5-dimethylpyrazolyl)boratocyclopentadienylzirconium dichloride {nBu-B(3,5-

Me$_2$pz)$_3$CpZrCl$_2$} is synthesized according to the procedure described in Example 10. n-Butyltris(3,5-dimethylpyrazolyl)boratozirconium trichloride as a starting material is synthesized according to the method described in "Inorganic Chemistry", page 840 (1982). nBu-B(3,5-Me$_2$PZ)$_3$CpZrCl$_2$ is synthesized from the starting material and cyclopentadienyllithium in ice-cooled diethyl ether; Catalyst C7 is obtained through filtration and recrystallization.

Polymerization reaction

Substantially the same polymerization procedure as described in Example 10 is repeated except that a 3 ml toluene solution containing 0.1 μmole of catalyst C7, {nBu-B(3,5-Me$_2$pz)$_3$CpZrCl$_2$} is used instead of the catalyst C2. 22 g of a polymer is obtained. The catalytic activity of catalyst C7 is 2,420 kg/g of Zr per hour.

EXAMPLE 16

Synthesis of catalyst D1

Hydrotrispyrazolylboratocycldpentadienyltitanium dichloride {HB(pz)$_3$CpTiCl$_2$} is synthesized according to the method described in *J. Organometallic Chemistry*, Vol. 102, page 167 (1975).

Polymerization reaction

Substantially the same polymerization procedure as described in Example 10 is repeated except that a 3 ml toluene solution containing 0.5 μmole of catalyst D1, HB(pz)$_3$CpTiCl$_2$ is used instead of catalyst C2. 2.9 g of a polymer is obtained. The catalytic activity of catalyst D1 is 121 kg/g of Ti per hour.

EXAMPLE 17

Synthesis of catalyst E1

Hydrotrispyrazolylboratocyclopentadienylhafnium dichloride {HB(pz)$_3$CpHfCl$_2$} is synthesized according to the method described in *J. Chem. Soc. Dalton Trans.*, page 603 (1991).

Polymerization reaction

Substantially the same polymerization procedure as described in Example 10 is repeated except that a 3 ml toluene suspension containing 0.5 μmole of catalyst E1, {HB(pz)$_3$CpHfCl$_2$} is used instead of catalyst C2. 9.0 g of a polymer is obtained. The catalytic activity of catalyst E1 is 101 kg/g of Hf per hour.
[Polymerization of propylene]

EXAMPLE 18

Polymerization reaction 0.4 liter of dehydrated and deoxygenated liquid propylene is charged in a 1.6-liter autoclave evacuated and replaced with nitrogen gas. Subsequently, 1.4 ml (4.0 mmoles in terms of the amount of aluminum) of a toluene solution of methylaluminoxane (PMAO; containing 2.92 moles of aluminum/liter of the toluene solution) (manufactured and sold by Tosoh Akzo Corp., Japan) is charged in the autoclave, together with 0.1 liter of the liquid propylene. Finally, a 3 ml toluene suspension containing catalyst A1 (TrisoCpZrCl$_2$) (1.0 μmole) is charged, together with 0.1 liter of the liquid propylene in the autoclave. A polymerization reaction is allowed to proceed for 1 hour, while the temperature of the inside of the autoclave is maintained at 50° C. 13.3 g of a jellylike polymer is obtained. It is found that the polymer is an atactic polypropylene, and that the catalytic activity of catalyst A1 is 146 kg/g of Zr per hour.

EXAMPLE 19

Polymerization reaction

Substantially the same polymerization procedure as described in Example 18 is repeated except that a 3 ml toluene solution containing 1.0 μmole of catalyst B1, {Pr(C$_4$Ph$_2$H$_2$P)$_2$ZrCl$_2$} is used instead of catalyst A1. 11.9 g of a polymer is obtained. The catalytic activity of catalyst B1 is 131 kg/g of Zr per hour. The amount of the component which is insoluble in heptane is 82.2% by weight, based on the weight of the polymer. It is found that the polymer is an isotactic polypropylene.

EXAMPLE 20

Polymerization reaction

Substantially the same polymerization procedure as described in Example 18 is repeated except that a 3-ml toluene suspension containing 1.0 μmole of catalyst C1, {HB(pz)$_3$CpZrCl$_2$} is used instead of the catalyst A1. 7.4 g of a jellylike polymer is obtained. The catalytic activity of catalyst C1 is 81.3 kg/g of zr per hour.

EXAMPLE 21

Polymerization reaction

Substantially the same polymerization procedure as described in Example 18 is repeated except that a 3 ml toluene suspension containing 1.0 μmole of catalyst C2, {HB(3,5-Me$_2$pz)$_3$CpZrCl$_2$} is used instead of the catalyst A1. 18.0 g of a jellylike polymer is obtained. The catalytic activity of catalyst C2 is 198 kg/g of Zr per hour.
[Copolymerization of ethylene and 1-hexene]

EXAMPLES 22 TO 33

Copolymerization reaction

In a 1.6-liter autoclave evacuated and replaced with nitrogen gas are charged dehydrated and deoxygenated toluene and 1-hexene so that the total volume of toluene and 1-hexene is 800 ml (The volume of 1-hexene charged is indicated in Table 1). The autoclave is connected at a top thereof to a gas feed line and containers 1 to 3 which have been, respectively, charged with a toluene solution of a catalyst (1 μmole/3 ml) indicated in Table 1 in an amount indicated in Table 1, auxiliary catalyst MMAO also in an amount indicated in Table 1, and methanol. Each of containers 1 to 3 has a valve at a top and a bottom thereof individually, and each of containers 1 and 2 is connected to a toluene tank by means of a pipe through a pump. Then, ethylene gas is introduced into the autoclave through the gas feed line under a pressure of 10 kg/cm$^2$G, while maintaining the internal temperature of the autoclave at 70° C. A total pressure of the autoclave becomes about 11.5 kg/cm$^2$G, including solvent pressure. 50 ml of toluene is fed from the tank to container 2 by means of the pump, and the top and bottom valves of container 2 are opened simultaneously, to thereby introduce auxiliary catalyst MMAO into the autoclave with toluene. Then, 50 ml of toluene is also fed from the tank to container 1 by means of the pump, and the top and bottom valves of container 1 are opened simultaneously, to thereby introduce the catalyst into the autoclave with toluene. Thereafter, a polymerization reaction is allowed to proceed for 1 hour, while the total pressure of the autoclave is maintained constantly by supplying ethylene gas and controlling the secondary pressure of a reducing valve connected to the autoclave. 10 ml of methanol is introduced in the autoclave, to thereby terminate the reaction. The amounts of a monomer and catalyst, reaction conditions, and yield and properties of the obtained copolymer are shown in Table 1.

5, 30 and 60 minutes after initiation of the copolymerization reaction, the rates of absorption of ethylene in Example 26 are 0.014 mole/min, 0.016 mole/min and 0.018 mole/min, respectively. Any lowering in absorption rate is not observed. From the results of Example 33, it is understood that the catalyst of the present invention exhibits high polymerization activity even if the molar ratio of aluminum to zirconium is 100.

In the same apparatus as used in Example 1 for synthesizing catalyst A1 are charged 10 mmoles of the catalyst D1 and 50 ml of diethyl ether cooled at −78° C. Subsequently, thereto dropwise added is 30 ml of 1M diethyl ether solution of methoxylithium over a period of 1 hour to obtain a mixture. The obtained mixture is further stirred for 24 hours. A formed solid is filtered off to obtain a filtrate. The obtained filtrate is condensed to 10 ml and then, thereto added is dried pentane to obtain a white precipitate. The precipitate is separated by filtration, followed by drying to obtain a product.

Synthesis of catalyst D4

Trisdiphenyloxophosphoranylmethanidotitanium trichloride {TrisoTiCl$_3$} is synthesized as follows. Substantially the same procedure as described in Example 3 for synthesizing catalyst A3 is repeated except that 1.6 g of titanium chloride is used instead of zirconium chloride.

Identification of catalyst D4 is made by $^1$H-NMR spectroscopy (heavy toluene, 270 MH), which shows signals of

TABLE 1

| Example No. | 1-hexene amount (ml) | Catalyst Type | Catalyst μmol | MMAO mmol | Polymer obtained (g) | Activity kg/gZrhr | Molecular weight Mw | Mw/Mn | Density (g/cm$^3$) |
|---|---|---|---|---|---|---|---|---|---|
| 22 | 60 | A1 | 0.1 | 0.2 | 9.7 | 1,070 | 821,000 | 2.53 | 0.926 |
| 23 | 120 | A1 | 0.1 | 0.2 | 9.0 | 990 | 664,000 | 2.87 | 0.915 |
| 24 | 60 | A2 | 1.0 | 2.0 | 16.2 | 178 | 1,156,000 | 3.09 | 0.945 |
| 25 | 120 | A2 | 1.0 | 2.0 | 14.4 | 158 | 1,407,009 | 3.01 | 0.938 |
| 26 | 60 | B1 | 0.1 | 0.2 | 5.6 | 620 | 907,000 | 2.82 | 0.926 |
| 27 | 120 | B1 | 0.1 | 0.2 | 5.5 | 600 | 684,000 | 2.80 | 0.915 |
| 28 | 60 | C1 | 0.1 | 0.2 | 26.2 | 2,880 | 880,000 | 2.71 | 0.926 |
| 29 | 120 | C1 | 0.1 | 0.2 | 23.9 | 2,630 | 523,000 | 2.81 | 0.918 |
| 30 | 60 | C2 | 0.1 | 0.2 | 27.7 | 3,040 | 710,000 | 2.88 | 0.918 |
| 31 | 120 | C2 | 0.1 | 0.2 | 25.2 | 2,770 | 504,000 | 2.89 | 0.908 |
| 32 | 60 | C2 | 0.2 | 0.2 | 26.8 | 1475 | 533,000 | 2.90 | 0.920 |
| 33 | 60 | C2 | 1.0 | 0.1 | 5.8 | 64 | 871,000 | 3.08 | 0.921 |

1) Total volume of toluene and 1-hexene is adjust to 800 ml
2) MMAO type 4 (manufactured and sold by Tosoh Akzo Corp. Japan) is used as an auxiliary catalyst, the amount of which is indicated in terms of the amount of aluminum (mmole).

COMPARATIVE EXAMPLE 4

Substantially the same polymerization reaction as described in Example 28 is repeated except that a comparative catalyst b, dicyclopentadienylzirconium dichloride {Cp$_2$ZrCl$_2$} is used instead of the catalyst C1. The absorption rate of ethylene is lowered, i.e., 0.052 mole/min, 0.015 mole/min, and 0.010 mole/min, respectively, 5, 30 and 60 minutes after initiation of the polymerization reaction.

[Polymerization of styrene]

EXAMPLES 34 TO 40

Synthesis of catalyst D2

Hydrotrispyrazolylboratocyclopentadienyltitanium dimethyl {HB(pz)$_3$CpTiMe$_2$} is synthesized as follows.

In the same apparatus as used in Example 1 for synthesizing catalyst A1 are charged 10 mmoles of the catalyst D1 and 50 ml of diethyl ether cooled at −78° C. Subsequently, thereto dropwise added is 30 ml of 1M diethyl ether solution of methyllithium over a period of 1 hour. A formed solid is filtered off to obtain a filtrate. The obtained filtrate is condensed to 10 ml and then, thereto added is dried pentane to obtain a white precipitate. The precipitate is separated by filtration, followed by drying to obtain a product.

Synthesis of catalyst D3

Hydrotrispyrazolylboratocyclopentadienyltitanium dimethoxide {HB(pz)$_3$CpTi(OMe)$_2$} is synthesized as follows.

the ligands at δ6.8–7.7 (m, 27H, a phenyl group) and 7.7–8.2 (m, 18H, a phenyl group). IR spectrum shows a peak for the ligand at 1,115 (P=O) cm$^{-1}$.

Synthesis of catalyst D5

Trisdiphenyloxophosphoranylmethanidotitanium trimethyl {TrisoTiMe$_3$} is synthesized as follows.

In the same apparatus as used in Example 1 for synthesizing catalyst A1 are charged 10 mmoles of catalyst D4 and 50 ml of diethyl ether cooled at −78° C. Subsequently, thereto dropwise added is 30 ml of 1M diethyl ether solution of methyllithium over a period of 1 hour. A formed solid is filtered off to obtain a filtrate. The obtained filtrate is condensed to 10 ml and then, thereto added is dried pentane to obtain a white precipitate. The precipitate is separated by filtration, followed by drying to obtain a product.

Synthesis of catalyst D6

2,3,4,5-tetramethylphospholyllithium {LiC$_4$Me$_4$P} is synthesized according to the method described in "Organometallics", page 921 (1988).

Then, using the synthesized 2,3,4,5-tetramethylphospholyllithium, 2,3,4,5-tetramethylphospholyltitanium trichloride {(C$_4$Me$_4$P)TiCl$_3$} is synthesized as follows. 50 ml of toluene solution containing 10 mmoles of titanium chloride is charged in a Schlenk's tube and cooled at −78° C. Subsequently, 10 ml of 10M diethyl ether solution of 2,3,4,5-tetramethylphospholyllithium is added dropwise thereto over a period of 1 hour through a dropping funnel, to thereby obtain a reaction mixture. The reaction mixture is dried and then, subjected to solvent extraction with 50 ml of diethyl ether to thereby obtain an ether extract. The ether extract is dried and then, subjected to solvent extraction with 50 ml of pentane to thereby obtain a pentane extract. The pentane extract is crystallized at −78° C. Identification of the product as $\{(C_4Me_4P)TiCl_3\}$ is made by $^1$H-NMR spectroscopy (heavy toluene, 270 MH), which shows signals for ligand at δ1.7 (s, 6 H, methyl group) and 1.9 (d, 6 H, methyl group), although high sensitivity is not obtained due to the poor solubility of the product in heavy toluene.

Polymerization reaction of styrene

In a 1.6-liter autoclave evacuated and replaced with nitrogen gas are charged 300 ml of dehydrated and deoxygenated toluene and 300 ml of styrene obtained by vacuum distillation. The autoclave is connected at a top thereof to containers 1 to 3 which have been, respectively, charged with a toluene solution of catalyst (1 μmole/3 ml) indicated in Table 2 in an amount indicated in Table 2, auxiliary catalyst MMAO also in an amount indicated in Table 2, and methanol. Each of containers 1 to 3 has a valve at a top and a bottom thereof, and each of containers 1 and 2 is connected to a toluene tank by means of a pipe through a pump. 50 ml of toluene is fed from the tank to container 2 by means of the pump, and the top and bottom valves of container 2 are opened simultaneously, to thereby introduce auxiliary catalyst MMAO into the autoclave with toluene. Then, 50 ml of toluene is also fed from the tank to container 1 by means of the pump, and the top and bottom valves of container 1 are opened simultaneously, to thereby introduce catalyst indicated in Table 2 into the autoclave with toluene. Thereafter, a polymerization reaction is allowed to proceed for 2 hours. 10 ml of methanol is introduced into the autoclave, to thereby terminate the reaction. Results of Examples 34 to 40 are shown in Table 2.

TABLE 2

| Example No. | Catalyst Type | Catalyst μmol | MMA0 mmol* | Polymer obtained g | kg/gZrhr | MEK extraction residue % | Melting point °C. |
|---|---|---|---|---|---|---|---|
| 34 | D1 | 10.0 | 4.0 | 104.3 | 108.6 | 98 | 273 |
| 35 | D2 | 10.0 | 4.0 | 90.8 | 94.6 | 96 | 264 |
| 36 | D3 | 7.0 | 3.0 | 121.3 | 180.5 | 98 | 271 |
| 37 | D4 | 10.0 | 4.0 | 99.4 | 103.5 | 97 | 270 |
| 38 | D5 | 10.0 | 4.0 | 88.7 | 92.4 | 97 | 279 |
| 39 | D6 | 10.0 | 4.0 | 20.6 | 21.4 | 89 | — |
| 40 | B1 | 10.0 | 4.0 | 109.6 | 60.2 | 89 | — |

*mmole in terms of the amount of aluminium
Note: (1) Melting point of the obtained polymer is measured by DSC.
(2) The obtained polymer is cut to obtain pieces thereof. The obtained pieces are subjected to extraction with methylethyl ketone (MEK) by means of Soxhlet's extractor. The residue is weighed to obtain MEK extraction residue (%), based on the weight of the polymer pieces.
(3) Catalysts D1 and B1 used in Examples 34 and 40 are those obtained in Examples 16 and 6, respectively.

[Addition of hydrogen gas in polymerization reaction system]

EXAMPLES 41 TO 43

760 ml of dehydrated and deoxygenated toluene and 40 ml of dehydrated and deoxygenated toluene are charged in a 1.6-liter autoclave evacuated and replaced with nitrogen gas. The autoclave is connected at a top thereof to a gas feed line which has a quantitative pipe at an intermediate portion thereof, and containers 1 to 3 which have been, respectively, charged with a 3 ml toluene solution containing 0.1 μmole of catalyst C1 $\{HB(pz)_3CpZrCl_2\}$, 0.18 ml (0.5 mmole in terms of the amount of aluminum) of toluene solution of PMAO, and methanol. Each of containers 1 to 3 has a valve at a top and a bottom thereof, and each of containers 1 and 2 is connected to a toluene tank by means of a pipe through a pump. Under atmospheric pressure, hydrogen gas is introduced into the quantitative pipe via the gas feed line to thereby quantitate the hydrogen gas. Then, ethylene gas is introduced into the autoclave through the gas feed line and the quantitative pipe under a pressure of 10 kg/cm$^2$G, together with the quantitated hydrogen gas, while maintaining the internal temperature of the autoclave at 80° C. A total pressure of the autoclave becomes about 10.4 kg/cm$^2$G, including a solvent pressure. 50 ml of toluene is fed from the tank to container 2 by means of the pump, and the top and bottom valves of container 2 are opened simultaneously, to thereby introduce auxiliary catalyst PMAO into the autoclave with toluene. Then, 50 ml of toluene is also fed from the tank to container 1 by means of the pump, and the top and bottom valves of container 1 are opened simultaneously, to thereby introduce catalyst C1 into the autoclave with toluene. Thereafter, a polymerization reaction is allowed to proceed for 1 hour while the total pressure of the autoclave is maintained constantly by supplying ethylene gas. 10 ml of methanol is introduced into the autoclave, to thereby terminate the reaction.

COMPARATIVE EXAMPLES 5 to 7

In each of Comparative Examples 5 to 7, substantially the same procedure as in Examples 41 to 43 is repeated except that comparative catalyst b $\{Cp_2ZrCl_2\}$ is used instead of catalyst C1 and the amount of hydrogen gas to be introduced into the autoclave is changed.

Results of Examples 41 to 43 and Comparative Examples 5 to 7 are shown in Table 3.

TABLE 3

| Example and Comparative Example Nos. | Hydrogen amount (Nml*) | HMI (g/10 min) | Molecular weight (Mw) | Molecular weight distribution (Mw/Mn) |
|---|---|---|---|---|
| Example 41 | 0 | 0.2 | 880400 | 2.80 |
| Example 42 | 75 | 10.5 | 381000 | 3.08 |
| Example 43 | 188 | 60.6 | 169000 | 2.82 |
| Comparative Example 5 | 0 | 0.4 | 515000 | 2.36 |
| Comparative Example 6 | 5 | 2.1 | 387000 | 2.82 |
| Comparative Example 7 | 40 | 359.00 | 94000 | 3.28 |

*Nml (normal milliliter) means a volume (ml) at 0° C. under 1 atm.

As is apparent from the above, when the catalyst of the present invention is used (Examples 41 to 43), the molecular weight of the polymer can be easily controlled by adding hydrogen gas in the polymerization reaction, while when comparative catalyst b (dicyclopentadienylzirconium dichloride) is used (Comparative Examples 5 to 7), the molecular weight of the polymer is markedly decreased by adding a very small amount of hydrogen gas in the polymerization reaction. This means that by the use of comparative catalyst b, molecular weight of a polymer can hardly be controlled.

[Solution polymerization]

EXAMPLE 44

700 ml of dehydrated and deoxygenated toluene and 100 ml of dehydrated and deoxygenated 1-hexene are charged in a 1.6-liter autoclave evacuated and replaced with nitrogen gas. The autoclave is connected at a top thereof to a gas feed line and containers 1 to 3 which have been, respectively, charged with a 3 ml toluene solution containing 2 μmole of catalyst C1 {HB(pz)$_3$CpZrCl$_2$}, 0.5 ml (1.0 mmole in terms of the amount of aluminum) of toluene solution of MMAO, and methanol. Each of containers 1 to 3 has a valve at a top and a bottom thereof, and each of containers 1 and 2 is connected to a toluene tank by means of a pipe through a pump. Ethylene gas is introduced into the autoclave through the gas feed line while maintaining the internal temperature of the autoclave at 110° C. A total pressure of the autoclave becomes about 13 kg/cm$^2$G, including a solvent pressure. 50 ml of toluene is fed from the tank to container 2 by means of the pump, and the top and bottom valves of container 2 are opened simultaneously, to thereby introduce auxiliary catalyst MMAO into the autoclave with toluene. Then, 50 ml of toluene is also fed from the tank to container 1 by means of the pump, and the top and bottom valves of container 1 are opened simultaneously, to thereby introduce catalyst C1 into the autoclave with toluene. Thereafter, a polymerization reaction is allowed to proceed for 30 minutes, while the total pressure of the autoclave is maintained constantly by supplying ethylene gas and controlling the secondary pressure of a reducing valve connected to the autoclave. The secondary pressure of the reducing valve is monitored to measure the absorption rate of the ethylene gas. 10 ml of methanol is introduced into the autoclave, to thereby terminate the reaction. 47.2 g of a polymer is obtained. It is found that a catalytic activity of catalyst C1 is 518 kg/g of Zr per hour, and the absorption rate of ethylene gas 5 minutes after initiation of the reaction are substantially not changed from that of ethylene gas 30 minutes after initiation of the reaction.

[Preliminary polymerization]

EXAMPLE 45

Preparation of suspension F1 of solid components

Under nitrogen atmosphere, a 200-milliliter autoclave is charged with 1 g of silica gel (manufactured and sold by Fuji-Davison Chemical, Ltd., Japan) which has been calcinated at 300° C. for 4 hours under nitrogen atmosphere. The calcinated silica gel is suspended in 43 ml of toluene in the autoclave to thereby obtain a suspension. To the obtained suspension are added 21 mmoles of PMAO (in terms of the amount of aluminum) and 2.0 mmoles of triisobutylaluminum (in terms of the amount of aluminum) as auxiliary catalysts, to thereby obtain a suspension. The obtained suspension is stirred at room temperature for 2 hours and then, decanted to thereby obtain solid components. The obtained solid components are washed with toluene 3 times. The washed solid components are suspended in 10 ml of toluene. The resultant suspension is designated as F1.

Preliminary Polymerization

84 μmoles of catalyst C1 is added to suspension F1, and preliminary polymerization is allowed to proceed at room temperature for 30 minutes. 9 g of a polymer is obtained. It is found that a catalytic activity of catalyst C1 is 2300 g/g of Zr per hour. The obtained polymer is designated as catalyst G1.

Polymerization 760 ml of dehydrated and deoxygenated toluene and 40 ml of dehydrated and deoxygenated 1-hexene are charged in a 1.6-liter autoclave evacuated and replaced with nitrogen gas. The autoclave is connected at a top thereof to a gas feed line and containers 1 to 3 which have been, respectively, charged with a 17 ml toluene solution containing 4.68 μmole of catalyst G1, a 3 ml toluene solution containing 0.5 mmole (in terms of the amount of aluminum) of triisobutylaluminium as an auxiliary catalyst, and methanol. Each of containers 1 to 3 has a valve at a top and a bottom thereof, and each of containers 1 and 2 is connected to a toluene tank by means of a pipe through a pump. Ethylene gas is introduced into the autoclave through the gas feed line under a pressure of 7 kg/cm$^2$G while maintaining the internal temperature of the autoclave at 70° C. A total pressure of the autoclave becomes about 8.5 kg/cm$^2$G, including a solvent pressure. 50 ml of toluene is fed from the tank to container 2 by means of the pump, and the top and bottom valves of container 2 are opened simultaneously, to thereby introduce triisobutylaluminum as an auxiliary catalyst into the autoclave with toluene. Then, 50 ml of toluene is also fed from the tank to container 1 by means of the pump, and the top and bottom valves of container 1 are opened simultaneously, to thereby introduce catalyst G1 into the autoclave with toluene. Thereafter, a polymerization reaction is allowed to proceed for 1 hour while the total pressure of the autoclave is maintained constantly by supplying ethylene gas and controlling the secondary pressure of a reducing valve connected to the autoclave. 10 ml of methanol is introduced into the autoclave, to thereby terminate the reaction. 97 g of a polymer is obtained. It is found that a catalytic activity of catalyst G1 is 227 kg/g of Zr per hour. The bulk density of the polymer is 0.15 g/cm$^3$, and the HMI of the polymer is 3.5 g/10 minutes.

[Stable non-coordinating auxiliary catalyst]

EXAMPLE 46

Polymerization

A 1.6-liter autoclave, which has been evacuated and replaced with nitrogen gas, is provided. The autoclave is connected at a top thereof to containers 1 to 3 which have been, respectively, charged with a 10 ml toluene solution containing 0.01 mmole of triisobutylaluminium as an auxiliary catalyst (in terms of the amount of aluminum), a 3 ml toluene solution containing 0.001 mmole of dimethylaniliniumtetra(pentafluorophenyl)borate as another auxiliary catalyst, and methanol. Each of containers 1 to 3 has a valve at a top and a bottom thereof, and each of containers 1 and 2 is connected to a liquid propylene tank by means of a pipe through a pump. 0.4 liter of liquid propylene is fed from the tank to container 1 by means of the pump, and the top and bottom valves of container 1 are opened simultaneously, to thereby introduce triisobutylaluminium as an auxiliary catalyst into the autoclave with liquid propylene. After the introduction of triisobutylaluminium, a 3 ml toluene solution containing 1.0 μmole of catalyst B1 {Pr(C$_3$Ph$_2$P$_2$)$_2$ZrCl$_2$} is charged in container 1. Then, 0.1 liter of liquid propylene is fed from the tank to container 2 by means of the pump, and the top and bottom valves of container 2 are opened simultaneously, to thereby introduce dimethylaniliniumtetra(pentafluorophenyl)borate as another auxiliary catalyst into the autoclave with liquid propylene. Then, 0.1 liter of liquid propylene is also fed from the tank to container 1 by means of the pump, and the top and bottom valves of container 1 are opened simultaneously, to thereby introduce catalyst B1 into the autoclave with toluene. Thereafter, a polymerization reaction is allowed to proceed for 1 hour while the total pressure of the autoclave is maintained constantly by supplying ethylene gas. 10 ml of methanol is introduced into the autoclave, to thereby terminate the reaction. 9.7 g of a polymer is obtained. It is found that a catalytic activity of catalyst B1 is 107 kg/g of Zr per hour. The amount of the component which is insoluble in heptane is 88.6% by weight, based on the weight of the polymer. It is found that the polymer is an isotactic polypropylene.

Example 47

Polymerization

Substantially the same procedure as in Example 46 is repeated except that catalyst C5 {HB(3,5-Me$_2$pz)$_3$CpZr(CH$_2$Ph)$_2$} is used instead of catalyst B1 {Pr(C$_3$Ph$_2$P$_2$)$_2$ZrCl$_2$}. 6.6 g of a jellylike polymer is obtained. It is found that a catalytic activity of catalyst C5 is 72.6 kg/g of Zr per hour.

We claim:

1. A method for polymerizing an olefin, which comprises subjecting an olefin to a polymerization reaction in the presence of a catalyst and at least one auxiliary catalyst selected from the group consisting of an alkylaluminoxane and a cation producer, said catalyst comprising at least one transition metal compound selected from the group consisting of compounds of formulae I and II:

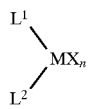
(I)

wherein:

M is a transition metal selected from the group consisting of metals of Groups IIIA including the lanthanide series, IVA, VA, VIA, VIIA and VIII of the Periodic Table of the Elements, X is an anionic ligand, n is an integer represented by the formula n=G-2 in which G is the Group number of the Group of the Periodic Table to which said transition metal belongs, and $L^1$ and $L^2$ are ligands, a combination of which is at least one combination selected from the group consisting of combinations (1), (2) and (3) defined below, wherein a bridge bond is optionally formed between $L^1$ and $L^2$; and

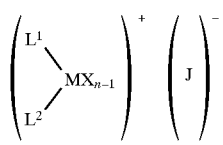
(II)

wherein:

M, X, n, $L^1$ and $L^2$ are as defined for formula (I), and J is an anion;

said combination (1) being a combination of:

ligand $L^1$ which is a group containing at least one phosphorus-containing group and represented by formula III:

(III)

wherein:

A is a carbon atom or a substituted boron atom, wherein said substituted boron atom has a substituent selected from the group consisting of:

a hydrogen atom, a saturated or unsaturated $C_1$–$C_{20}$ aliphatic hydrocarbon group which is unsubstituted or substituted with at least one $C_6$–$C_{14}$ aromatic hydrocarbon group or at least one halogen atom, a $C_6$–$C_{20}$ aromatic hydrocarbon group which is unsubstituted or substituted with at least one $C_1$–$C_{10}$ alkyl group or at least one halogen atom, an oxy group which is substituted with a saturated or unsaturated $C_1$–$C_{20}$ aliphatic hydrocarbon group which is unsubstituted or substituted with at least one $C_6$–$C_{14}$ aromatic hydrocarbon group, or which oxy group is substituted with a $C_6$–$C_{20}$ aromatic hydrocarbon group which is unsubstituted or substituted with at least one $C_1$–$C_{10}$ alkyl group, a thio group which is substituted with a saturated or unsaturated $C_1$–$C_{20}$ aliphatic hydrocarbon group which is unsubstituted or substituted with at least one $C_6$–$C_{14}$ aromatic hydrocarbon group, or which thio group is substituted with a $C_6$–$C_{20}$ aromatic hydrocarbon group which is unsubstituted or substituted with at least one $C_1$–$C_{10}$ alkyl group, a silyl group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom, a siloxy group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom, an amino group which is N,N-disubstituted with two substituents each independently selected from the group consisting of a saturated or unsaturated $C_1$–$C_{20}$ aliphatic hydrocarbon group and a $C_6$–$C_{20}$ aromatic hydrocarbon group, and a phosphino group which is P,P-disubstituted with two substituents each independently selected from the group consisting of a saturated or unsaturated $C_1$–$C_{20}$ aliphatic hydrocarbon group and a $C_6$–$C_{20}$ aromatic hydrocarbon group;

{R$^1$R$^2$(Q=)P} represents a phosphorus-containing group, in which:

P is a trivalent or pentavalent phosphorus atom, each of R$^1$ and R$^2$ is monovalent and independently represents a saturated or unsaturated $C_1$–$C_{20}$ aliphatic hydrocarbon group which is unsubstituted or substituted with at least one $C_6$–$C_{14}$ aromatic hydrocarbon group or at least one halogen atom, or a $C_6$–$C_{20}$ aromatic hydrocarbon group which is unsubstituted or substituted with at least one $C_1$–$C_{10}$ alkyl group or at least one halogen atom, and Q is divalent and represents a divalent atom of O, S or Se, or a lone electron pair; and each of Z$^1$ and Z$^2$ independently represents a phosphorus-containing group of formula {R$^1$R$^2$(Q=)P} as defined above, or a pyrazolyl group represented by formula IV:

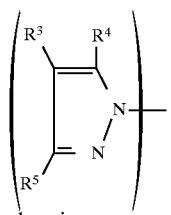

(IV)

wherein:
each of $R^3$, $R^4$ and $R^5$ independently represents:
- a hydrogen atom,
- a saturated or unsaturated $C_1$–$C_{20}$ aliphatic hydrocarbon group which is unsubstituted or substituted with at least one $C_6$–$C_{14}$ aromatic hydrocarbon group or at least one halogen atom,
- a $C_6$–$C_{20}$ aromatic hydrocarbon group which is unsubstituted or substituted with at least one $C_1$–$C_{10}$ alkyl group or at least one halogen atom,
- an oxy group which is substituted with a saturated or unsaturated $C_1$–$C_{20}$ aliphatic hydrocarbon group which is unsubstituted or substituted with at least one $C_6$–$C_{14}$ aromatic hydrocarbon group, or which oxy group is substituted with a $C_6$–$C_{20}$ aromatic hydrocarbon group which is unsubstituted or substituted with at least one $C_1$–$C_{10}$ alkyl group,
- a thio group which is substituted with a saturated or unsaturated $C_1$–$C_{20}$ aliphatic hydrocarbon group which is unsubstituted or substituted with at least one $C_6$–$C_{14}$ aromatic hydrocarbon group, or which thio group is substituted with a $C_6$–$C_{20}$ aromatic hydrocarbon group which is unsubstituted or substituted with at least one $C_1$–$C_{10}$ alkyl group, a silyl group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom,
- a siloxy group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom,
- an amino group which is N,N-disubstituted with two substituents each independently selected from the group consisting of a saturated or unsaturated $C_1$–$C_{20}$ aliphatic hydrocarbon group and a $C_6$–$C_{20}$ aromatic hydrocarbon group, and
- a phosphino group which is P,P-disubstituted with two substituents each independently selected from the group consisting of a saturated or unsaturated $C_1$–$C_{20}$ aliphatic hydrocarbon group and a $C_6$–$C_{20}$ aromatic hydrocarbon group, wherein a bridge bond is optionally formed between $R^3$ and $R^4$ or between $R^3$ and $R^5$, and
ligand $L^2$ which is coordinated to the metal and which is selected from the group consisting of a ligand having a σ-bond and a ligand having a σ-bond and a bond selected from the group consisting of at least one π-bond and at least one lone electron pair donative bond;
said combination (2) being a combination of:
ligand $L^1$ which is a 5-membered heterocyclic ligand represented by formula V:

$$\{E_m(CR^6)_{5-m}\}^- \quad (V)$$

wherein:

each $R^6$ independently represents:
- a hydrogen atom,
- a saturated or unsaturated $C_1$–$C_{20}$ aliphatic hydrocarbon group which is unsubstituted or substituted with at least one $C_6$–$C_{14}$ aromatic hydrocarbon group or at least one halogen atom,
- a $C_6$–$C_{20}$ aromatic hydrocarbon group which is unsubstituted or substituted with at least one $C_1$–$C_{10}$ alkyl group or at least one halogen atom,
- an oxy group which is substituted with a saturated or unsaturated $C_1$–$C_{20}$ aliphatic hydrocarbon group which is unsubstituted or substituted with at least one $C_6$–$C_{14}$ aromatic hydrocarbon group, or which oxy group is substituted with a $C_6$–$C_{20}$ aromatic hydrocarbon group which is unsubstituted or substituted with at least one $C_1$–$C_{10}$ alkyl group,
- a thio group which is substituted with a saturated or unsaturated $C_1$–$C_{20}$ aliphatic hydrocarbon group which is unsubstituted or substituted with at least one $C_6$–$C_{14}$ aromatic hydrocarbon group, or which thio group is substituted with a $C_6$–$C_{20}$ aromatic hydrocarbon group which is unsubstituted or substituted with at least one $C_1$–$C_{10}$ alkyl group,
- a silyl group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom,
- a siloxy group which is unsubstituted or substituted with at least one saturated or unsaturated $C_1$–$C_{20}$ aliphatic hydrocarbon group, at least one $C_6$–$C_{20}$ aromatic hydrocarbon group or at least one halogen atom,
- an amino group which is N,N-disubstituted with two substituents each independently selected from the group consisting of a saturated or unsaturated $C_1$–$C_{20}$ aliphatic hydrocarbon group and a $C_6$–$C_{20}$ aromatic hydrocarbon group,
- and a phosphino group which is P,P-disubstituted with two substituents each independently selected from the group consisting of a saturated or unsaturated $C_1$–$C_{20}$ aliphatic hydrocarbon group and a $C_6$–$C_{20}$ aromatic hydrocarbon group, m is an integer of from 1 to 4,
each E independently represents a trivalent atom selected from the group consisting of nitrogen, phosphorus, arsenic, antimony and bismuth atoms,
wherein a bridge bond is optionally formed between neighboring $R^6$ and $R^6$, and
ligand $L^2$ which is coordinated to the metal and which is selected from the group consisting of a ligand having a σ-bond and a ligand having a σ-bond and a bond selected from the group consisting of at least one π-bond and at least one lone electron pair donative bond, with the proviso that when m of formula V is 1, $L^2$ is a ligand having a σ-bond, or a ligand having a σ-bond and at least one lone electron pair donative bond;
said combination (3) being a combination of:
ligand $L^1$ which is a trispyrazolyl tridentate ligand represented by formula VI:

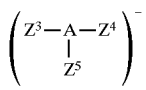 (VI)

wherein:
A is as defined above for formula III; and
each of $Z^3$, $Z^4$ and $Z^5$ independently represents a pyrazolyl group represented by formula IV as defined above, and
ligand $L^2$ which is coordinated to the metal and which is an alkapolyenyl ligand having a σ-bond and two or more π-bonds;

said alkylaluminoxane being represented by one of the following formulae XVI and XVII:

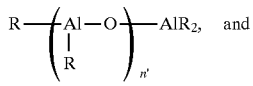 (XVI)

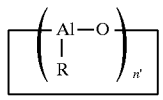 (XVII)

wherein each R independently represents a hydrogen atom, a halogen atom or a $C_1$–$C_{10}$ alkyl group, and n' is an integer of from 1 to 40; and said cation producer being represented by the following formula XVIII:

 (XVIII)

wherein $(On)^+$ represents a metal cation or an onium; and $(An)^-$ represents an anion which is stable under the reaction conditions for olefin polymerization and has no or poor coordinating properties.

2. The method according to claim 1, wherein said transition metal of each of formulae I and II is selected from Group IVA of the Periodic Table.

3. The method according to claim 1, wherein the combination of said ligands $L^1$ and $L^2$ is said combination (1).

4. The method according to claim 3, wherein each of $Z^1$ and $Z^2$ of formula III independently represents a phosphorus-containing group of formula $\{R^1R^2(Q=)P\}$ as defined for formula III.

5. The method according to claim 4, wherein said ligand $L^1$ represented by formula III is tris (diphenyloxophosphoranyl)methanide.

6. The method according to claim 1, wherein the combination of said ligands $L^1$ and $L^2$ is said combination (2).

7. The method according to claim 6, wherein said E of formula V is a phosphorus atom.

8. The method according to claim 6, wherein said combination (2) is 1,3-propylenebis(4,5-di-phenyl-1,3-diphospholyl).

9. The method according to claim 6, wherein said ligand $L^1$ is represented by formula V in which m is 1 and said ligand $L^2$ is a ligand having a σ-bond or a ligand having a σ-bond and at least one lone electron pair donative bond.

10. The method according to claim 1, wherein the combination of said ligands $L^1$ and $L^2$ is said combination (3), wherein said ligand $L^2$ is an alkadienyl.

11. The method according to claim 10, wherein said ligand $L^1$ represented by formula VI is hydrotris(3,5-dimethylpyrazolyl)borate.

12. The method according to claim 10, wherein said ligand $L^1$ represented by formula VI is hydrotris(pyrazolyl)borate.

* * * * *